US005283663A

United States Patent [19]

Kawasaki et al.

[11] Patent Number: 5,283,663

[45] Date of Patent: Feb. 1, 1994

[54] DATA COMMUNICATION METHOD BETWEEN CIRCUITS

[75] Inventors: Masahiro Kawasaki, Tokyo; Teruhiko Naruo, Kyoto; Yutaka Ohsawa; Isamu Hashimoto, both of Tokyo, all of Japan

[73] Assignee: Asahi Kogaku Kogyo Kabushiki Kaisha, Tokyo, Japan

[21] Appl. No.: 568,516

[22] Filed: Aug. 16, 1990

[30] Foreign Application Priority Data

Aug. 17, 1989 [JP] Japan .................................. 1-212008
Sep. 18, 1989 [JP] Japan .................................. 1-241459

[51] Int. Cl.[5] ............................................... H04N 1/41
[52] U.S. Cl. ................................. 358/426; 358/468
[58] Field of Search ...................... 358/426, 427, 261.1, 358/261.2, 261.3, 262.1, 431, 432, 468; 359/154; H04N 1/41

[56] References Cited

U.S. PATENT DOCUMENTS

| | | | |
|---|---|---|---|
| 3,705,986 | 12/1972 | Sanders et al. | 250/199 |
| 3,899,429 | 8/1975 | Ueno et al. | 359/154 |
| 4,014,002 | 3/1977 | Tucker | 340/168 B |
| 4,227,045 | 10/1980 | Chelcun et al. | 178/66.1 |
| 4,320,518 | 3/1982 | Ichiyanagi | 340/782 |
| 4,360,255 | 11/1982 | Kawasaki | 354/289 |
| 4,558,939 | 12/1985 | Taniguchi et al. | 354/416 |
| 4,573,786 | 3/1986 | Taniguchi et al. | 354/416 |
| 4,686,578 | 8/1987 | Asano | 358/426 |

FOREIGN PATENT DOCUMENTS

| | | | |
|---|---|---|---|
| 3611784 | 1/1987 | Fed. Rep. of Germany | H04L 25/00 |
| 3643766 | 7/1988 | Fed. Rep. of Germany | H04L 25/00 |
| 1427811 | 3/1976 | United Kingdom | G06K 7/14 |
| 2016245 | 9/1979 | United Kingdom | H03K 13/00 |
| 1575037 | 9/1980 | United Kingdom | G08C 19/16 |
| 2191322 | 12/1987 | United Kingdom | G08C 23/00 |

OTHER PUBLICATIONS

K. Steinbuch, *Taschenbuch der Nachrichtenverabeitung*, 1967, pp. 861-865, Springer-Verlag, Berlin, Germany.
French Search Report and Annex.
Copy of the United Kingdom Search Report.
W. Kugler; "Datenubertragung mit Infrarotlicht"; Elektronik; Nov. 24-25, 1988 pp. 82-84, 86-88, 90.

*Primary Examiner*—Edward L. Coles, Sr.
*Assistant Examiner*—Jerome Grant
*Attorney, Agent, or Firm*—Sandler Greenblum Bernstein

[57] ABSTRACT

A method is disclosed for performing data communication between a pair of circuits. The data communication is established by serially transmitting information which includes pulse signals. In executing the method, a reference time is determined as an instant of a first level change in a first direction of a pulse signal output from one of hte circuits to the other. A judgement is made as to whether a first bit of data is a "1" or a "0" in accordance with a time period extending from the reference time to an instant of a subsequent level change in the first direction following the reference time. The instant of the subsequent level change in the first direction is determined as a reference time relative to the next bit of data in the pulse signal. The data of a predetermined number of bits is continuously transmitted by repeatedly establishing reference times and judging the value of a bit based on the time period which extends from the reference time to a subsequent level change.

18 Claims, 51 Drawing Sheets

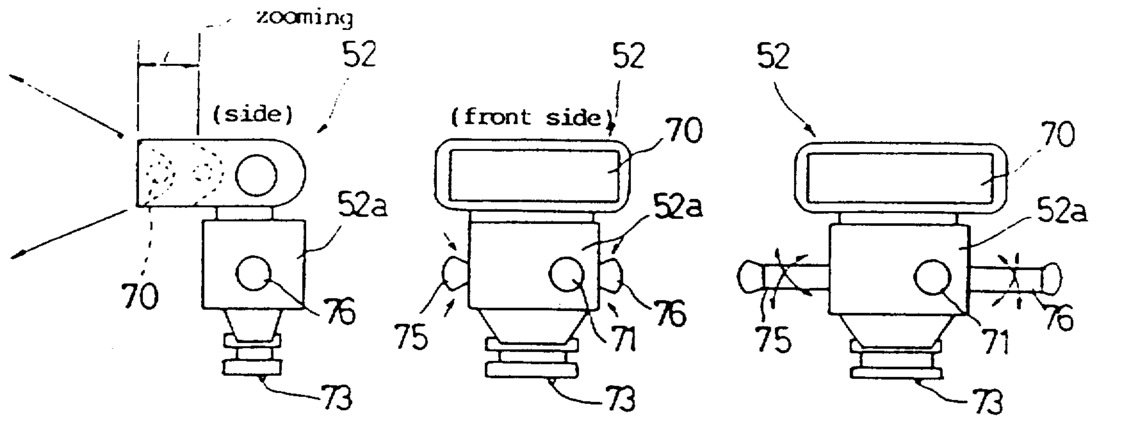
Fig. 14A
Fig. 14B
Fig. 14C
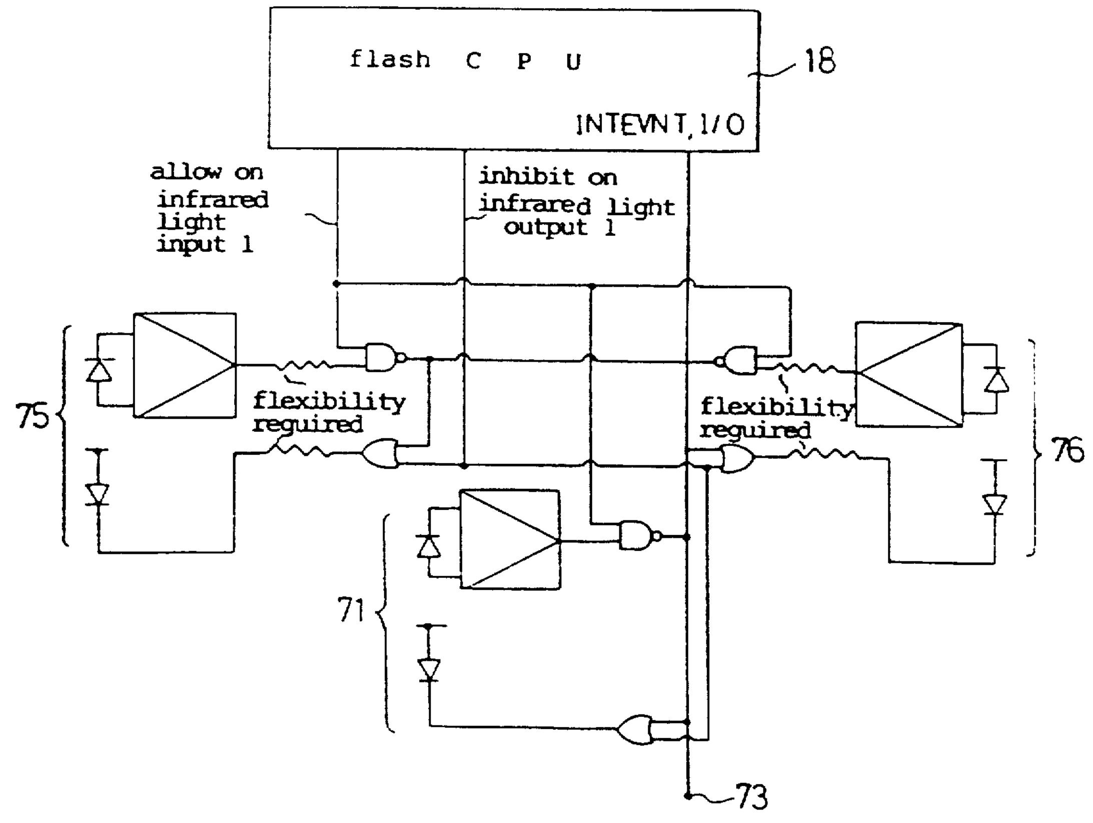
Fig. 15

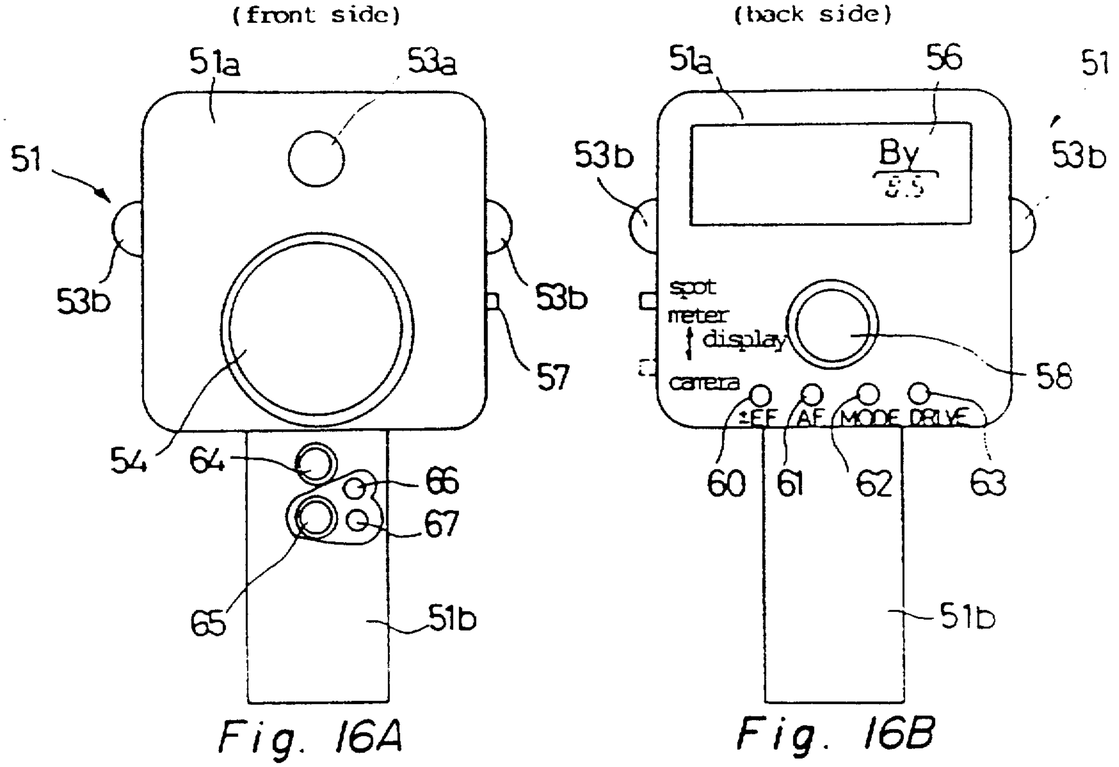
Fig. 16A
Fig. 16B
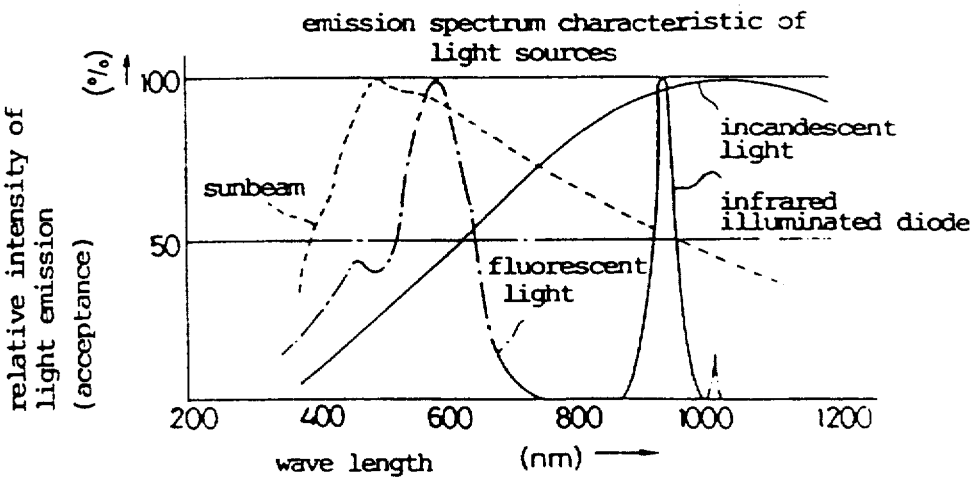
Fig. 18

DATA COMMUNICATION METHOD BETWEEN CIRCUITS

BACKGROUND OF THE INVENTION

1. Field of the Invention

This invention relates to a data communication method, specifically to a data communication method suitable for use in a camera.

2. Description of Related Art

Due to the recent advancement of automatization of cameras, cameras provided with an auto-focus (AF) system and an auto-exposure (AE) system have increasingly been produced. Nowadays, however, higher function is demanded for a camera. For example, shortening focalizing time or increasing accuracy of focalizing are demanded. Further, various complex kinds of programmed exposure modes, such as a shutter speed priority mode for telephoto lens, an object depth priority mode for wide angle lens, etc., and display apparatuses of a larger size enabling a user to recognize at a glance various photograph information, such as number of frames of film to be photographed, programme mode, etc. are demanded. Further, in order to increase accuracy of focalizing for AF (auto-focus) devices, an increase in the number of CCD's (Charge Coupled Devices), an increase in lens information, and higher calculation processing are required. Under these circumstances, difficulties have been experienced in performing various functions of memorizing, calculating or processing data and controlling a system by means of a single microcomputer.

In order to eliminate the above problems, it will be possible to provide plural microcomputers so as to share the above functions with them. For example, it is possible to provide a main microcomputer, together with one or more of sub-microcomputers, thus entrusting the main microcomputer with a system control function for generally controlling sequential operation of a camera and also controlling a distance measurement and calculation function. In the meantime the main microcomputer may entrust the one or more of sub-microcomputers with a photometric calculation function, a data input control, a data-memorizing function, a display control function, etc. Functions of calculations, control and memorizing may be shared with the plural microcomputers so as to increase processing efficiency.

The above system however requires a large amount of data transmission between the main microcomputer and the sub-microcomputers, and hence it is necessary to allot several communication lines for data communication to the main microcomputer and each of the sub-microcomputers. Furthermore, in order to achieve accurate data transmission, it is necessary to employ a control line such as a communication request line, busy line, or the like, or it may also be necessary to employ a synchronous clock or a system clock for an asynchronous communication with a higher accuracy. Furthermore, a signal for control line communication other than serial transmission lines is required in order to perform serial data communication between the main microcomputer and sub-microcomputers, thus requiring at least three communication lines for performing data communication. Accordingly, unnecessary or excessive use of ports for information processing might occur.

When the user desires to photograph with plural light sources, it is necessary to connect the camera and flash with a cable for exclusive use of plural light sources. This results in time-consuming setting and thus inconvenience. There is another type of system, particularly intended for photographing wild birds, in which such a connection cable is obviated and infrared light is output from an external accessary for remote control, thus releasing the camera from the confines of a cable-type system. In such a type of system, however, only an operation of release is permitted, and thus it is not possible to set up photograph mode and/or exposure rectification from a position remote from the camera body, nor to permit monitoring of number of photographable frames of film and/or brightness of an object.

SUMMARY OF THE INVENTION

A main object of the invention is to provide a data communication method which permits accurate data communication between circuits while reducing the number of communication lines between the circuits.

Another object of the invention is to provide a data communication system which permits, without the use of communication lines, rapid and accurate communication of numerous information between circuits.

In order to achieve the above objects, the present invention provides a method for performing data communication between circuits. More concretely, a pulse signal of serially transmitted information is transmitted between two circuits. The time at which a first level change occurs in one direction of a pulse signal output from one of the circuits to the other is determined as a reference time. Then, whether the data bit is "1" or "0" is judged in accordance with the time it takes from the first level change to a second level change in one direction following said reference time, and setting the time of occurrence of the second level change as a reference time relative to the next bit of the pulse signal, whereby data of a predetermined number of bits is continuously transmitted.

With the above construction of the present invention, accurate data communication may be performed when performing serial data transmission between circuits by means of communication lines. However, when performing serial transmission between circuits through infrared light, it is unnecessary to employ data cables, thus saving the trouble of connecting cables and/or setting equipments.

In accordance with one embodiment of the invention, a data communication system is provided, wherein the two circuits are connected by a single communication line, and wherein the data communication is performed in accordance with a format including a first predetermined time period, a second predetermined time period and a third predetermined time period. The first predetermined time period is defined as a time period from a time of detection of a first change-down or change-up of a signal level which is being output to the communication line to a time of detection of a second change-down or change-up of the signal level following said first change-down or change-up. The second predetermined time period is defined as a time period within said first predetermined time period in which data indicating a state of "1" or "0" is directed to said communication line. The third predetermined time period is defined as a time period following said second predetermined time period in which a level of the communication line is held at "0" or "1".

In accordance with one embodiment of the invention, a data communication system is provided, wherein the two circuits are connected by a single communication line, and wherein a time period from a first change-down or change-up of a signal level being output to the communication line to a second change-down or change-up of the signal level is determined beforehand in accordance with whether data indicating a "0" or "1" is to be output.

In accordance with a further embodiment of the invention, a data communication system is provided, wherein the two circuits are connected by a single communication line, and wherein the data communication is performed in accordance with the following format: The time point at which a first change-down or change-up of the signal level output to the communication line occurs is defined as a reference time. Subsequent change-downs or change-ups are output at intervals of a second predetermined time from reference time in case of outputting "0" data, whereas subsequent change-downs or change-ups are output at intervals of a third predetermined time different from the second predetermined time in case of outputting "1" data.

In accordance with still another embodiment of the invention, a data communication system is provided, wherein each of the two circuits includes a light emitting element for emitting infrared light, a light receiving element for receiving infrared light, a control circuit for controlling the light emitting element, and a processing circuit for processing signals received by the light receiving element. The above-mentioned reference time is determined when a first change-over from "OFF" to "ON", or vice versa, of infrared light output from one of the two circuits to the other occurs. Thus, whether a particular bit of data is "1" or "0" is determined based on the time it takes from the reference time for a second change-over (i.e., from "OFF" to "ON", or vice versa) to occur. The second change-over from "OFF" to "ON", or vice versa, is then used as a reference time for the next bit, whereby data of a predetermined number of bits is continuously transmitted.

In accordance with one embodiment of the invention, a data communication system is provided, wherein the data communication is performed in accordance with a format including a first predetermined time period, a second predetermined time period and a third predetermined time period. The first predetermined time period is defined as a time period extending from a detection of a first change-over (i.e., from "OFF" to "ON", or vice versa) of infrared light to be output to a detection of a second change-over (i.e., from "OFF" to "ON", or vice versa). The second predetermined time period is defined as a time period within said first predetermined time period in which data bits of "1" or "0" are communicated via infrared light. The third predetermined time period following the second predetermined time period is defined as a time period in which a level of the infrared light is held at "0" or "1".

In accordance with one embodiment of the invention, a data communication system is provided, wherein a time period extending from a first change-over of said infrared light to be output to a second change-over of said infrared light is predetermined in accordance with "0" or "1" bits of data to be output.

In accordance with a further embodiment of the invention, a data communication system is provided, wherein the data communication is performed using a format in which a point in time at which a first a change-over of infrared light (i.e., from "OFF" to "ON", or vice versa) is defined as a reference time. Subsequent change-overs (from "OFF" to "ON", or vice versa) are output at intervals of a second predetermined time from the reference time for outputting "0" data bits, whereas subsequent change-overs are output between intervals of a third predetermined time different from the second predetermined time for outputting "1" data bits.

BRIEF DESCRIPTION OF DRAWINGS

FIG. 14A is a side elevational view of a flash device;

FIG. 14B is a front view of the flash device;

FIG. 14C is a front view of the flash device showing the left-hand and right-hand infrared light transmission and receiving windows protruding respectively toward left-hand side and right-hand side;

FIG. 15 illustrates an electric control circuit contained in the flash device;

FIG. 16A illustrates a front view of a spot meter;

FIG. 16B illustrates a rear view of the spot meter;

FIG. 18 illustrates the illumination spectrum characteristics of various light sources;

DETAILED DESCRIPTION

The embodiments according to the present invention will be explained hereinbelow with reference to the accompanying drawings.

Figure 13:
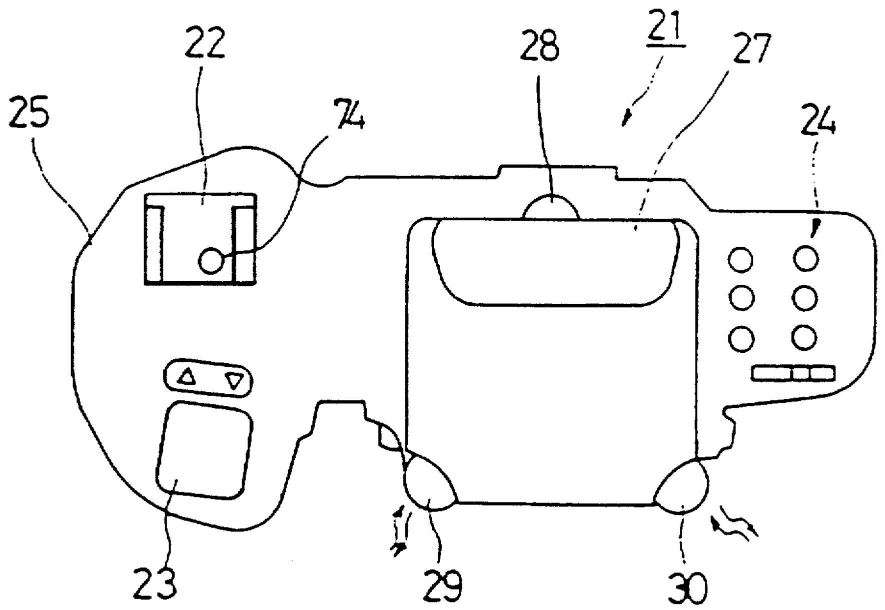
FIG. 13 is a diagrammatic plan view of a camera.

FIG. 13 is a diagrammatic plan view of a camera 21 to which the present invention is applied.

A camera body 25 of the camera 21 has a hot shoe 22, a release button 23 and an operation switch portion 24. The camera body is also provided with an ISO switch, an AF switch, a "±EF switch", a drive switch, a flash switch and a mode switch. Centrally of a pentaprism portion, there are provided an LCD indicator 27 and a window 28 for transmitting and receiving infrared lights which are arranged to face toward an operator of the camera, and windows 29, 30 for transmitting and receiving infrared lights which are arranged to face toward front.

Figure 12:
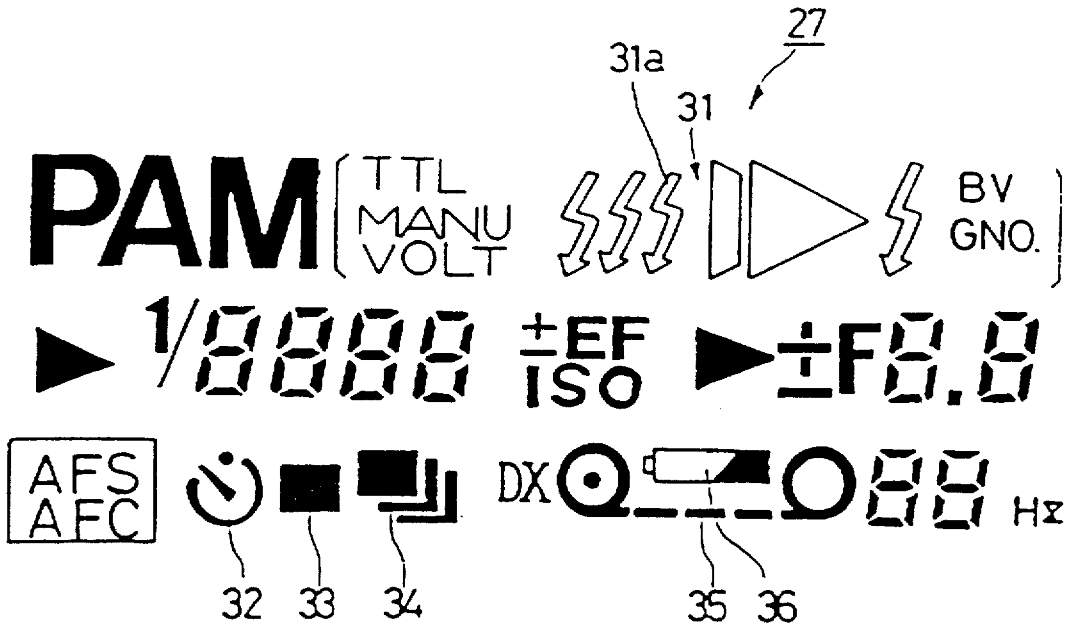
FIG. 12 illustrates, in detail, an LCD display of a camera.

The items to be indicated by the LCD indicator 27 will be explained in detail below with reference to FIG. 12.

On a display, from the left to the right, "P", "A", and "M" are indicated. The "P" is an abbreviation for "PROGRAM", while the "A" indicates a mode of "ES" or "EE". The "M" indicates a mode of "MANUAL" or "BULB".

At the right side of these indications, a pair of brackets is indicated. Within the brackets, various information regarding an external flash is indicated. That is to say, "TTL" is displayed at the time of TTL flashing, "MANU" is displayed at the time of manual flashing, and "VOLT" represents a charge voltage indication when the external flash is being charged. In addition, a mark 31 when displayed represents either a first blind flashing indication ⚡▸, a multi-flashing indication ⚡⚡⚡▸ and a second blind flashing indication ▸⚡, respectively. A mark 31*a*, a kind of mark 31, will flash on and off until after the flash has fully been charged, while an indication of mark 31*a* will be turned off when there is no external flash.

"▶" is displayed at the portion below the above indications and at the left-hand side of the display. This indicates that the operation of the "1/8888" portion of the display at the right-hand side thereof is possible. In this display, each portion resembling an "8" represents a seven-segment indicator. Consequently, the "8888" in FIG. 12 represents four seven-segment indicators, and the "88" shown below represents two seven-segment indicators.

In case of shutter speed, the "1/8888" portion of the display, is capable of indicating fractions ranging from 1/8000 to ½, "1–30" or "bulb." When a numerical value is displayed in the 1/8888 portion together with "VOLT", it indicates a charging voltage of the external flash, and when a numerical value is displayed together with "MANU", it indicates an amount of manual flashing of the external flash.

"±EF" and "ISO" are located in the indicator 27 at the right-hand side of and adjacent to the "1/8888" portion. It is possible to indicate ISO data by simultaneously displaying characters in the "1/8888" portion and "ISO".

Located below the above indications are: a symbol 32 which represents a mode of a self-timer, symbol 33 which represents a mode of single photography, and symbol 34 which represents a mode of continuous photography. "DX" is located at the right-hand side of these symbols, "DX", when displayed, indicating that "DX" exists.

At the right-hand side of the "DX", symbols 35 are located for indicating loading. These symbols will sequentially be turned on upon loading of photographic film to thereby indicate a state of the film being continuously wound up. A battery mark 36 located at the right-hand side of the symbol 36 indicates the time of battery check.

Another character display portion "88" is located at the right-hand side of the battery mark 36. This portion is utilized together with a number of frames of the film to be photographed and "Hz" to indicate a multi-flashing interval value of the flash.

Figure 1:
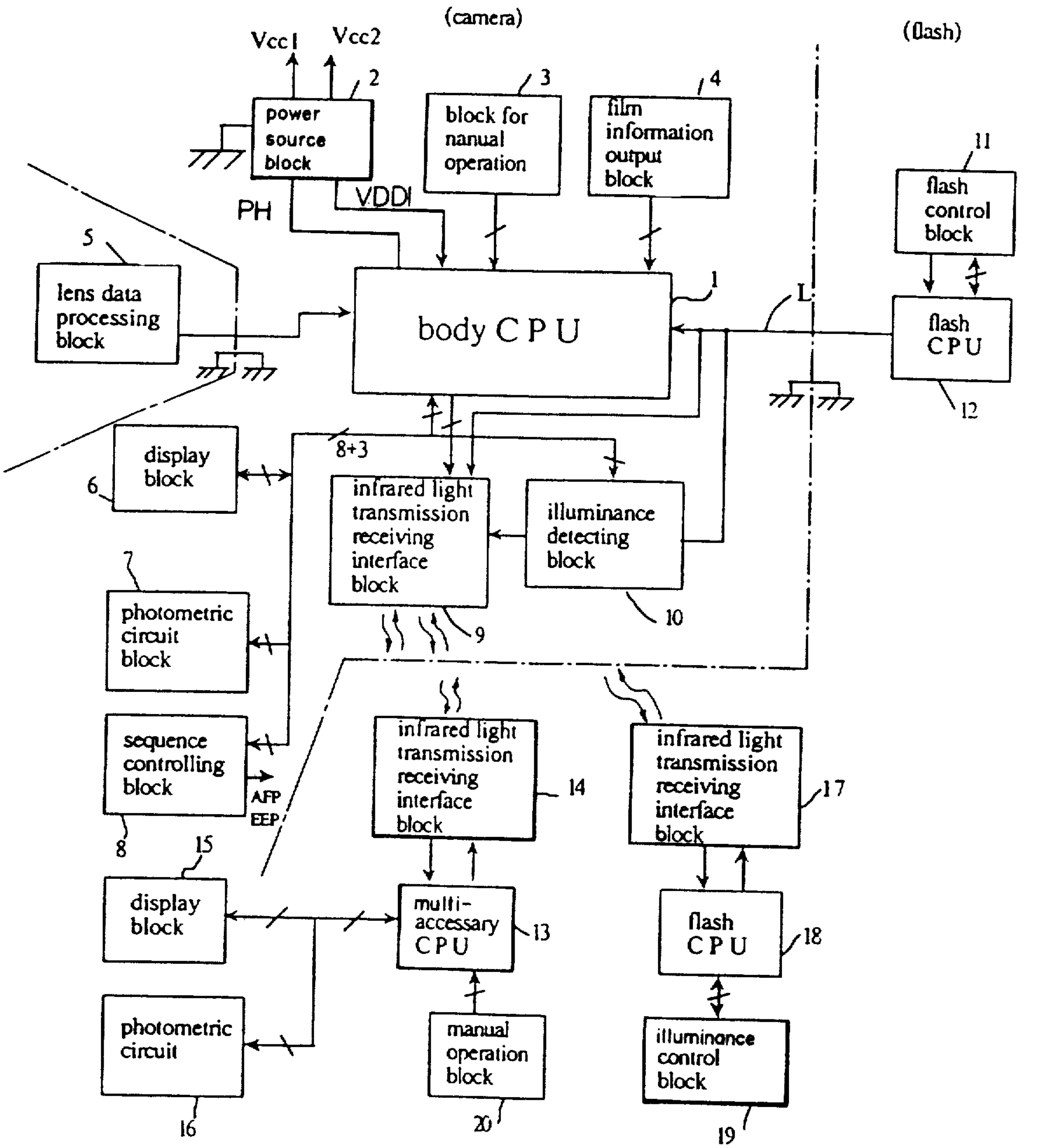
FIG. 1 is a block diagram of a camera and its peripheral equipment to which a data communication system of the present invention is applied.

A control block diagram according to the invention is shown in FIG. 1. Reference numeral 1 designates a body CPU mounted on the camera body 25 (FIG. 13). Reference numeral 12 designates a flash CPU connected to a flash control block 11 installed in a flash device mounted on the camera.

A block for controlling a power source 2, a block for manual operation 3 and a film information output block 4 for outputting data regarding ISO sensitivity of film and a number of photographable frames of the film are connected to the body CPU. Further, the body CPU is connected by a lens data processing block 5 disposed in the lens, a display block 6, a photometric circuit block 7, a sequence controlling block 8, an interface block 9, for transmitting and receiving infrared lights, and an illuminance detecting block 10.

A multi-accessary CPU 13 is mounted on a spot meter 51 (refer to FIGS. 16A and 16B). The multi-accessary CPU 13 is connected with an interface block 14, for transmitting and receiving infrared lights, a photometric circuit 16, and a manual operation block 20. The multi-accessary CPU 13 performs a control for externally transmitting a luminance signal of an object to be photographed to the camera by means of infrared light. CPU 13 further performs a control for release of the camera and for receiving a signal representing a number of photographable frames of film so as to display the number of photographable frames.

A flash CPU 18 is mounted on a flash device 52 (refer to FIGS. 14A, 14B and 14C). The flash CPU 18 is connected with an interface block 17, for transmitting and receiving infrared lights, and an illuminance control block 19.

Operation or function of the above-mentioned portion will be explained hereinbelow.

The power source control block 2 normally supplies the body CPU 1 with a suitable value of voltage requisite for operation of the body CPU 1. The control block 2 also generates a suitable value of electric power necessary for each block of the system and supplies the same to each block in accordance with a PH signal which is output by the body CPU 1 according to a manual operation signal from the manual operation block 3.

The lens data processing block 5 processes the data regarding the aperture number F peculiar to the lens, focal length, kind of zoom, position of the lens, and position of the zoom and aperture, so as to communicate requisite data to the body CPU 1.

The manual operation block 3 includes a photometric switch, a release switch, a REW (rewind) switch, a mode key, a flash key, an ISO key, ±EF key, an up-key and a down-key, and is adapted to give a signal to the body CPU 1 in accordance with a user's manual operation for predetermined actuation of the body CPU 1.

The film information output block 4 outputs data to the body CPU 1 on the basis of DX code recorded in the film.

The display block 6 gives an indication of an LCD display in accordance with: the manual operation of the manual operation block 3, the signal output from the body CPU 1, and the information from the sequence control block 8.

The sequence control block 8 performs processing for zooming, adjustment of focusing, exposure winding, rewinding and opening, and closing a back cover.

The illuminance detecting block 10 receives a signal from the body CPU 1 and then begins integrational processing of a measured quantity of light from the object to be photographed in synchronization with initiation of the exposure. The illuminance detecting block 10 also outputs an illuminance stoppage signal to the flash CPU 12 and the interface block 9, for transmitting and receiving infrared light (via a wired OR), when the integrated quantity of light reaches a predetermined level.

The flash CPU 12 is connected to the body CPU 1 by means of a single communication line L and is adapted to make communication, such as auxiliary light emitting/illuminating mode, manual illuminance, control time for manual illuminance, protection of illuminance, angle of view, zoom control, G number and completion of charging.

The illumination (flash) control block 11 is connected to the flash CPU 12 and body CPU 1 so as to effect zooming and controllable stoppage of illuminance.

Figure 19:
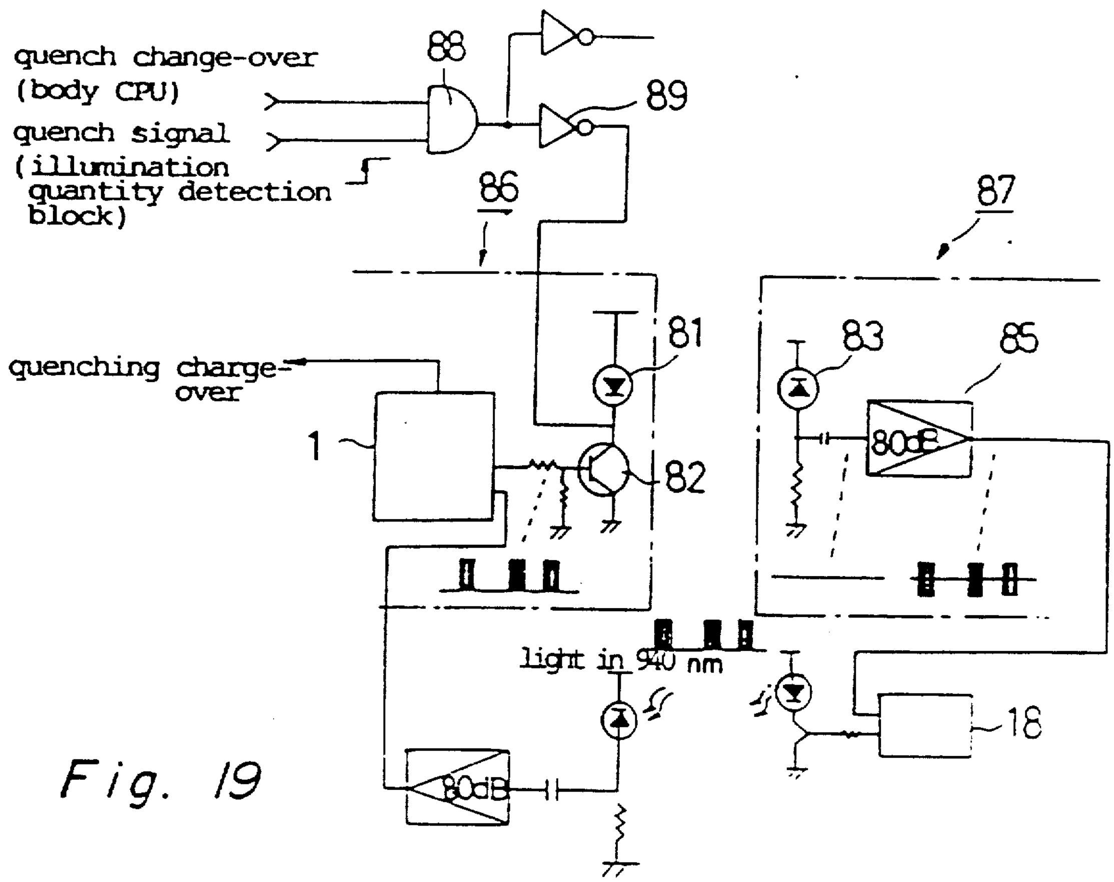
FIG. 19 shows the circuit of a transmission part and a receiving part for use in a data communication system according to one embodiment of the invention.

The transmitter 86 and receiver 87 of each of the interface blocks for transmitting and receiving infrared lights 9, 14 and 17 are constructed for example as shown in FIG. 19. That is, the transmitter 86 is constituted by a circuit including the CPU 1, an infrared illuminant LED 81, an NPN transistor 82, etc. The receiver 87 is constituted by a circuit including photodiode 83, amplifying circuit 85, etc. And gate 88 is connected to the cathode side of the infrared illuminant LED 81 by a wired-OR via an inverter 89. The AND gate 88 makes a logical product of a quench change-over signal from the body CPU 1 and a quench signal from the illuminance detecting block 10 and outputs the logical sum.

Figure 20:
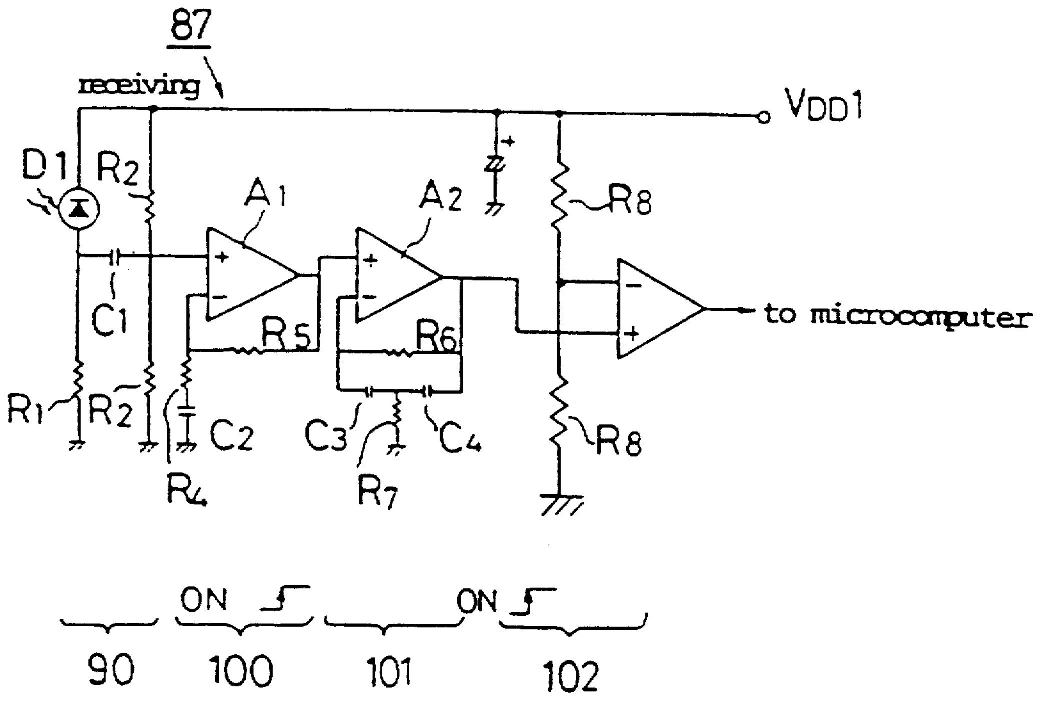
FIG. 20 illustrates in detail a circuit of the receiving part.

Further detail of the receiver 87 is shown in FIG. 20. The receiver 87 includes an input stage 90, a pre-stage amplifying circuit 100, a post-stage amplifying circuit 101 and a digital signal detecting circuit 102. The input stage 90 extracts and removes a DC component from the signal input into the light-receiving element D1. The pre-stage amplifying circuit 100 amplifies the an AC component in the signal from the input stage 90. The post-stage amplifying circuit further amplifies the signal from the pre-stage amplifying circuit by means of a band-pass filter. The digital signal detecting circuit 102 converts the output from the post-stage amplifying circuit 101 into a digital signal and outputs the same to, for example, the flash CPU 18.

Figure 21:
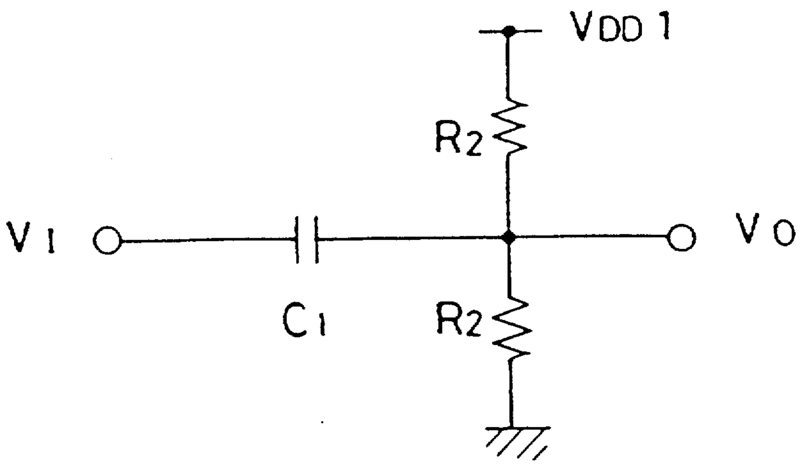
FIG. 21 diagrammatically illustrates a circuit of an input stage of the receiving part in an interface block for transmitting and receiving infrared light.

The operation of each of the above portions will be explained hereinbelow. When infrared light is input into the light-receiving element (photodiode 83), a corresponding quantity of photocurrent is generated. Assuming a voltage of V1 is given to a resistor R1 connected at one end to GND (ground) and an output from the input stage 90 is V0 (refer to FIG. 21), the following equation is obtained:

$$\frac{V_o}{V_I} = \frac{\frac{R_2}{2}}{\frac{1}{j\omega C_1} + \frac{R_2}{2}} \tag{1}$$

$$= \frac{\frac{2j\omega C_1 R_2}{2}}{\frac{2j\omega C_1}{j\omega C_1} + \frac{2j\omega C_1 R_2}{2}}$$

$$= \frac{j\omega C_1 R_2}{\;} = \frac{\frac{j\omega C_1 R_2}{2}}{1 + \frac{j\omega C_1 R_2}{2}}$$

Equation (1) is a high-pass filter in which:

$$\frac{V_o}{V_I} = 0 \text{ and } \quad V_o = \frac{1}{2} V_{DD1} \ (\omega \rightarrow 0)$$

-continued $$\frac{V_o}{V_I}=1 \quad (\omega\to\infty)$$

The cut-off frequency fc will be given by:

$$fc=\frac{\omega_c}{2\pi}=\frac{1}{\pi C_1R_2} \tag{2}$$

Figure 22:
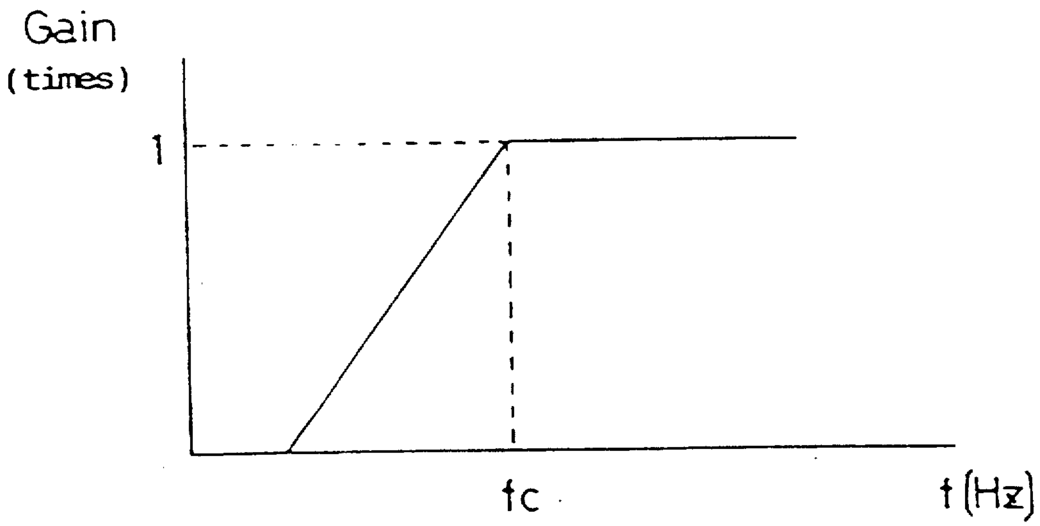
FIG. 22 illustrates the frequency characteristics of the input stage.

Thus, frequency characteristic of the input-stage 90 will be such as shown in FIG. 22.

Figure 23:
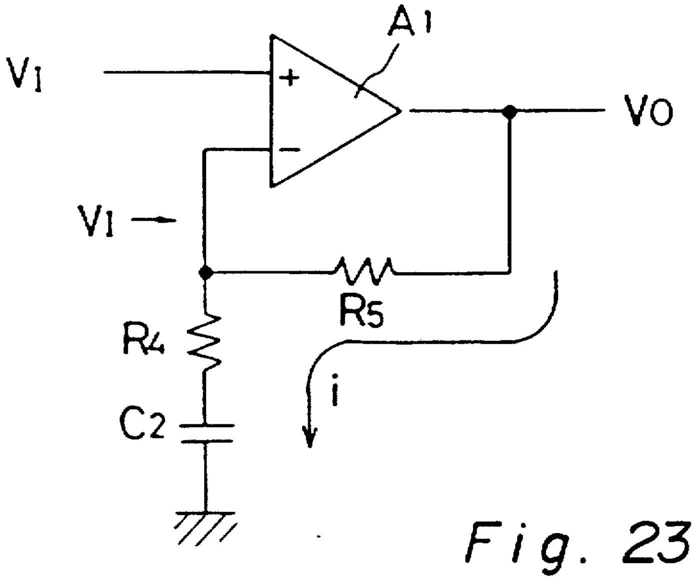
FIG. 23 diagrammatically illustrates a pre-stage amplifying circuit of the interface block for transmitting and receiving infrared light.

The pre-stage amplifying circuit 100 will be explained hereinbelow with reference to FIG. 23.

The input terminal of an operand amplifier Al is imaginary short and the input impedance thereof is ∞. Thus, gain |A| will be given as follows:

$$|A|=\frac{V_o}{V_I}=\frac{1}{V_I}\left\{i\times\left(R_5+R_4+\frac{1}{j\omega C_2}\right)\right\} \tag{3}$$

$$=\frac{1}{V_I}\left\{\frac{V_I}{R_4+\frac{1}{j\omega C_2}}\left(R_5+R_4+\frac{1}{j\omega C_2}\right)\right\}$$

$$=\frac{1}{\frac{j\omega C_2R_4+1}{j\omega C_2}}\left(\frac{j\omega C_2(R_4+R_5)+1}{j\omega C_2}\right)$$

$$=\frac{1+j\omega C_2(R_4+R_5)}{1+j\omega C_2R_4}$$

Zero point $\omega_1$, pole $\omega_2$ and gain $|A|$ will be shown as follows:

$$\omega_1C_2(R_4+R_5)=1 \tag{4}$$

$$\therefore f_1=\frac{1}{2\pi C_2(R_4+R_5)}$$

$$\omega_2C_2R_4=1 \tag{5}$$

$$\therefore f_2=\frac{1}{2\pi C_2R_4}$$

$$|A| = \left|\frac{V_o}{V_I}\right| \quad \omega\to\infty \tag{6}$$

$$= 1+\frac{R_5}{R_4}\approx\frac{R_5}{R_4}$$

Figure 24:
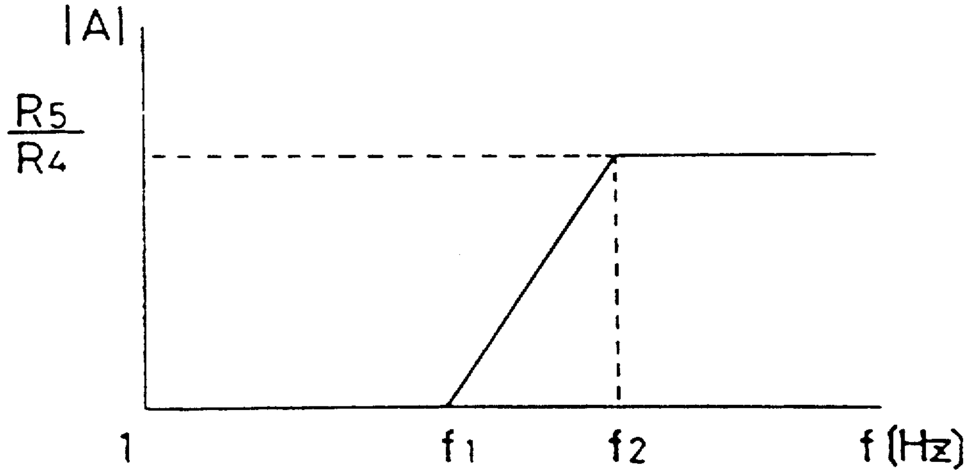
FIG. 24 illustrates the frequency characteristics of the pre-stage amplifying circuit.

Thus, the frequency characteristic of the pre-stage amplifying circuit 100 will be such as shown in FIG. 24.

Figure 25:
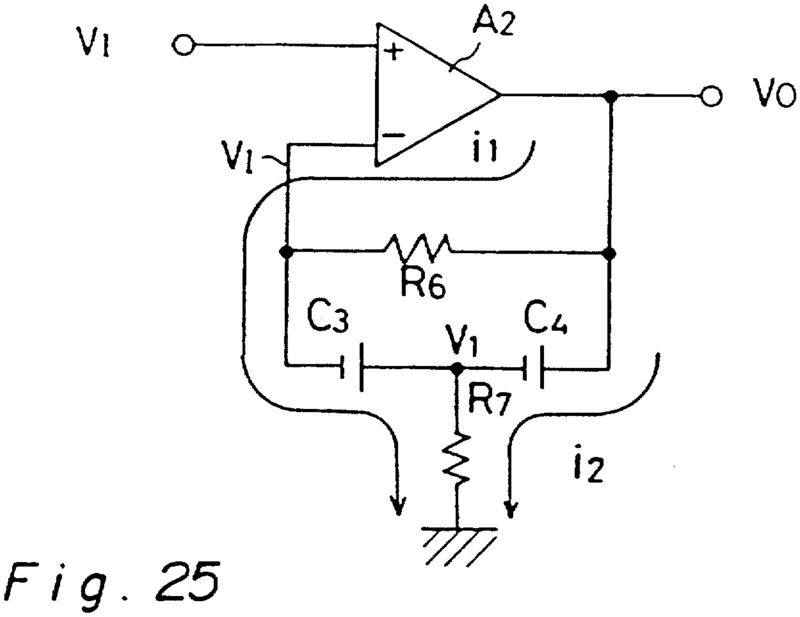
FIG. 25 diagrammatically illustrates a post-stage amplifying circuit of the interface block for transmitting and receiving infrared light.

A post-stage amplifying circuit 101 will be explained hereinbelow with reference to FIG. 25.

The input terminal of the operation amplifier A2 is imaginary short and the input impedance thereof is ∞. Thus, assuming an electrical potential at a connection point between capacitors C3 and C4 is V1, the following equations will be obtained:

$$i_1+i_2=SC_3(V_I-V_1)+SC_4(V_0-V_1)=\frac{V_1}{R_7} \tag{7}$$

$$i_1=SC_3(V_I-V_1)=(V_0-V_I)\frac{1}{R_6} \tag{8}$$

Since S=jω, a frequency characteristic can be analyzed by applying thereto a known formula of Laplace transformation: Transforming equation (8), $$V_1=\frac{1}{SC_3}\left(SC_3V_1-\frac{V_0-V_I}{R_6}\right) \tag{9}$$

Eliminating V1 from equations (7), (8) and (9), $$\frac{V_0-V_I}{R_6}+SC_4\left\{V_0-\frac{1}{SC_3}\left(SC_3V_I-\frac{V_0-V_I}{R_6}\right)\right\}=\frac{1}{SC_3R_7}\left(SC_3V_I-\frac{V_0-V_I}{R_6}\right)$$

Arranging the above equation with respect to the terms of Vo and VI, $$\left(\frac{1}{R_6}+SC_4+\frac{C_4}{C_3R_6}+\frac{1}{SC_3R_7R_6}\right)V_0=\left(\frac{1}{R_6}+SC_4+\frac{C_4}{C_3R_6}+\frac{1}{R_7}+\frac{1}{SC_3R_6R_7}\right)V_I$$

Multiplying both sides by $SC_3R_6R_7$, $$(SC_3R_7+S^2C_3C_4R_6R_7+SC_4R_7+1)\,V_0=(SC_3R_7+S^2C_3C_4R_6R_7+SC_4R_7+SC_3R_6+1)\,V_I \tag{10}$$

Gain $A$ will be obtained from equation (10) as follows:

$$A=\frac{V_o}{V_1}=\frac{S^2C_3C_4R_6R_7+S(C_3R_7+C_4R_7+C_3R_6)+1}{S^2C_3C_4R_6R_7+S(C_3+C_4)R_7+1} \tag{11}$$

$$=\frac{\{S^2C_3C_4R_6R_7+S(C_3+C_4)R_7+1\}+SC_3R_6}{S^2C_3C_4R_6R_7+S(C_3+C_4)R_7+1}$$

$$=1+\frac{\frac{1}{C_4R_7}S}{S^2+\frac{C_3+C_4}{C_3C_4R_6}S+\frac{1}{C_3C_4R_6R_7}}$$

Since the second item of equation (11) represents a band-pass filter equation, the following equation can be applied thereto:

$$\frac{\frac{1}{C_4R_7}S}{S^2+\frac{C_3+C_4}{C_3C_4R_6}+\frac{1}{C_3C_4R_6R_7}}=\frac{A_o\alpha\omega_oS}{S^2+\alpha\omega_oS+\omega_o^2}$$

Thus following result will be obtained, assuming $C_3=C_4$:

$$\omega_o^2=\frac{1}{C_3C_4R_6R_7}=\frac{1}{2C_3R_6R_7}$$

$$\alpha=(C_3+C_4)R_7\omega_o=2C_3R_7\omega_o=\frac{1}{Q}$$

α; attenuation constant $$|A_o|=\frac{C_3R_6}{(C_3+C_4)R_7}=\frac{R_6}{2R_7}$$

(gain at the central frequency)

Thus, the following result will be obtained:

$$f_o = \frac{1}{2\pi}\sqrt{\frac{1}{C_3C_4R_6R_7}} = \frac{1}{2\pi}\sqrt{\frac{1}{2C_3R_6R_7}}$$

$$B = \frac{f_o}{Q} = \frac{1}{\pi}C_3R_7\omega_o^2 \quad B\text{: band width}$$

Figure 26:
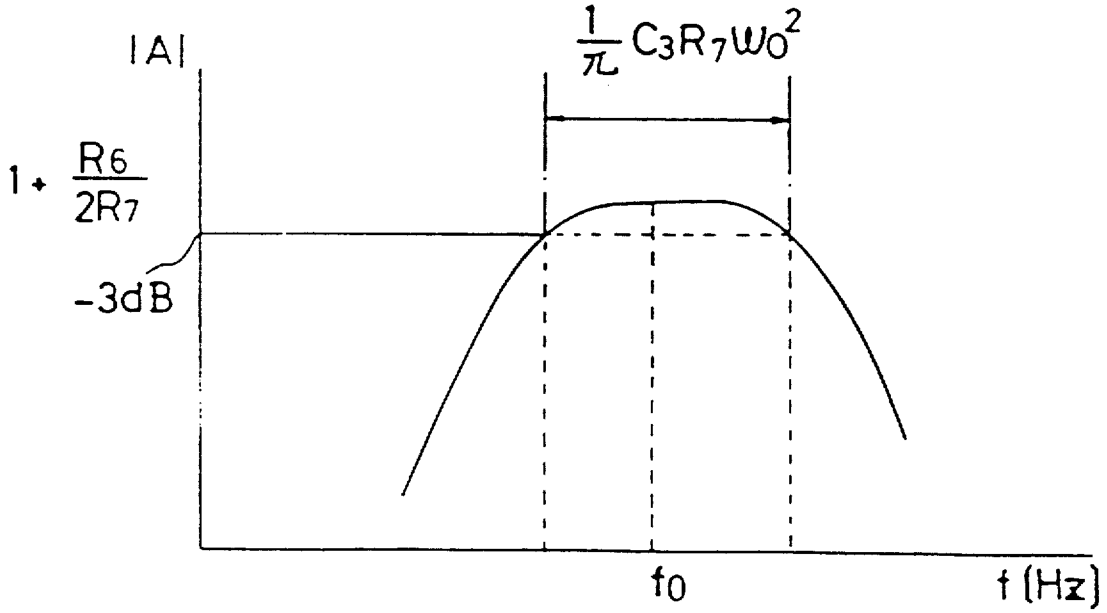
FIG. 26 illustrates the frequency characteristics of the post-stage amplifying circuit.

Thus, the frequency characteristics of the post-stage amplifying circuit will be such as shown in FIG. 26.

Accordingly, it is possible to reduce external influence of infrared lights of different frequency from sunbeam, fluorescent light, incandescent light, flash light, etc. by inputting the signal into the above band-pass amplifier, while modifying the design signal such that a central frequency thereof is f0 and such that the design signal falls within the band width B by means of "duty modulation system", "pulse width modulation system", "bit level time position fixing system", or the like (refer to FIG. 18).

Referring back to FIG. 20, the digital signal detecting circuit 102 compares a signal from the post-stage amplifying circuit 101 with the ½ ($V_{DD1}$) level so as to convert the signal into a digital level either of "1" or "0" and output the converted signal.

As shown in FIGS. 16A and 16B, a spot meter 51 mounted with the accessary CPU 13 is provided on the front surface of the body 51*a* with a photometric lens 54 and a window 53*a* for transmitting and receiving infrared light. Windows 53*b*, 53*b*, for transmitting and receiving infrared light, are provided on either side surface of the body 51*a*. A change-over switch 57 for switching indications regarding the function of the spot meter 51 and the camera 21 is located somewhat below the window 53*b* for transmitting and receiving infrared light. An LCD indicator 56 and a finder 58 are located on the rearward face of the body 51*a*. A ±EF switch, an AF switch 61, a mode switch 62 and a drive switch 63 are located at a position below the finder 58.

A grip portion 51*b* is located at a position below the body 51*a*. A release switch 64, a photometric switch 65, an up-switch 66 and a down switch 67 are located on the front surface of the body 51*a*.

Referring to FIGS. 14A, 14B and 14C, a flash device 52 mounted with the flash CPU 18 is so constructed as to permit forward and reverse slidable movement of a flash portion 70. Af infrared light transmitting and receiving window 71 is located on the front surface of the body 52*a*, while right and left windows 75, 76 for transmitting and receiving infrared light are located on either side of the body 52*a*. When the right and left window 75, 76 are pulled toward the righthand and lefthand side, respectively, they represent their respective protruded positions as shown in FIG. 14C.

A pin terminal 73 is located at the lowermost position of the body 52*a*. When the flash 52 is mounted to the camera 21 (FIG. 13), the pin terminal 73 pressingly engages with a terminal 74 (FIG. 13) on the hot shoe 22 (refer to FIG. 13) so as to electrically connect the flash CPU 12 and body CPU 1. Due to this construction, it is possible to transmit various data via a single terminal (i.e. the communication line in FIG. 1) to the CPU 12 from the body CPU 1, or vice versa. FIG. 15 illustrates an example of a circuit in case a plurality of interface blocks for transmitting and receiving infrared light as mentioned above are mounted to the flash device 52.

A communication system for transmitting and receiving data which is common as between the body CPU 1 and flash CPU 12, the body CPU 1 and flash CPU 18, and the body CPU 1 and accessary CPU 13 will be explained hereinbelow with reference to time charts shown in FIGS. 2 through 4 and FIGS. 5 through 11. In this connection, it is to be understood (referring to FIG. 1) that the data transmitting and receiving between the body CPU and flash CPU 12 is performed using the communication line L as a signal transmission means. Transmission and receiving between the body CPU 1 and flash CPU 18, the body CPU 1 and multi-accessary CPU 13 is performed by means of infrared light, which is a signal transmission means in this case, using a transmission and receiving circuit as shown in FIGS. 19 and 20. In case communication is performed by means of the communication line L, transmission and receiving of a pulse signal containing bit information are performed using a serial transmission signal comprised of "high" and "low" signal levels. In case communication is performed by means of infrared light, transmission and receiving of bit information are performed using a signal comprised of an infrared signal comprised of "ON" and "OFF" levels or states.

Figure 6:
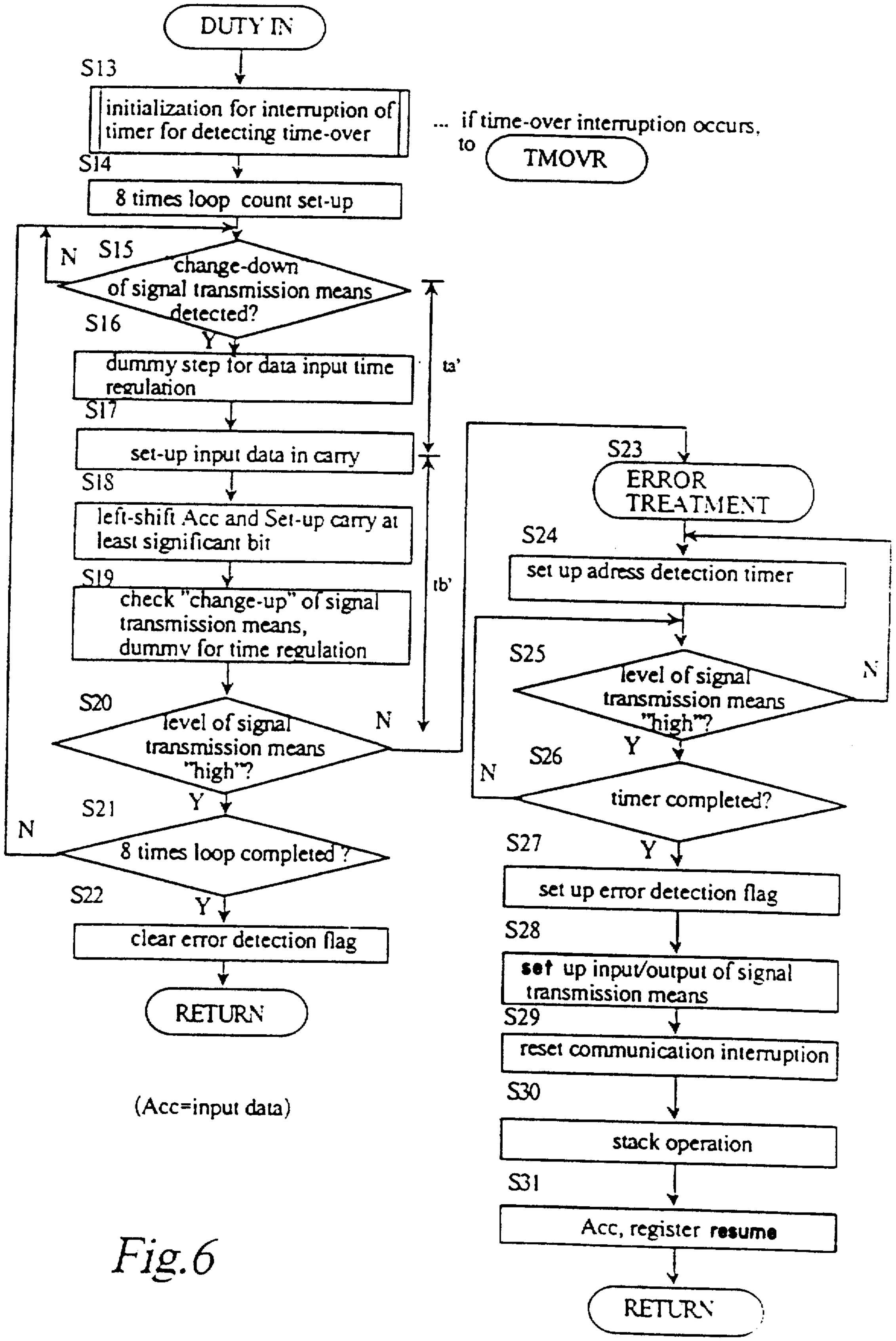
FIG. 6 illustrates a flow chart regarding operation of a "duty in" label.
Figure 7:
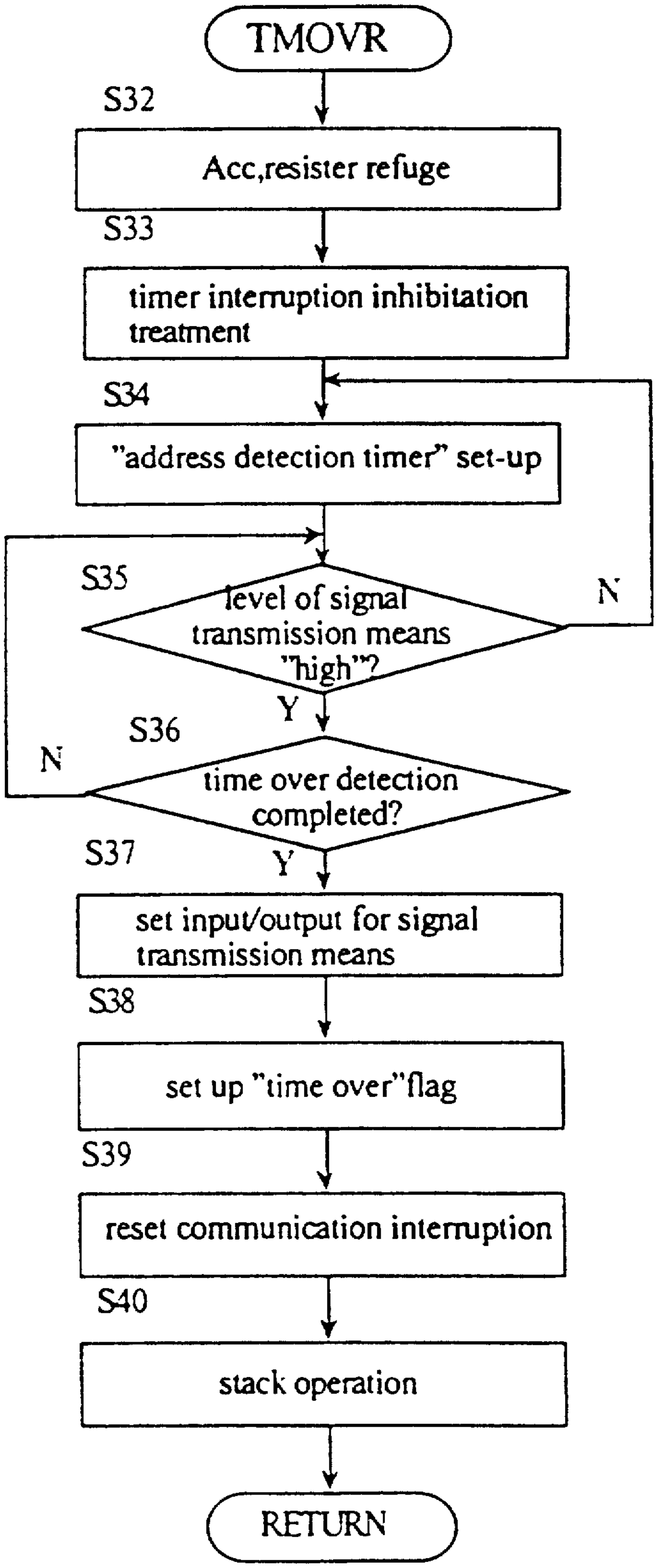
FIG. 7 illustrates a flow chart regarding operation of a "time over" label.

A "duty modulation system" for modulating "duty ratio of a pulse" will be explained below with reference to the time chart in FIG. 2 and the flow charts in FIGS. 5 through 7.

Figure 2:
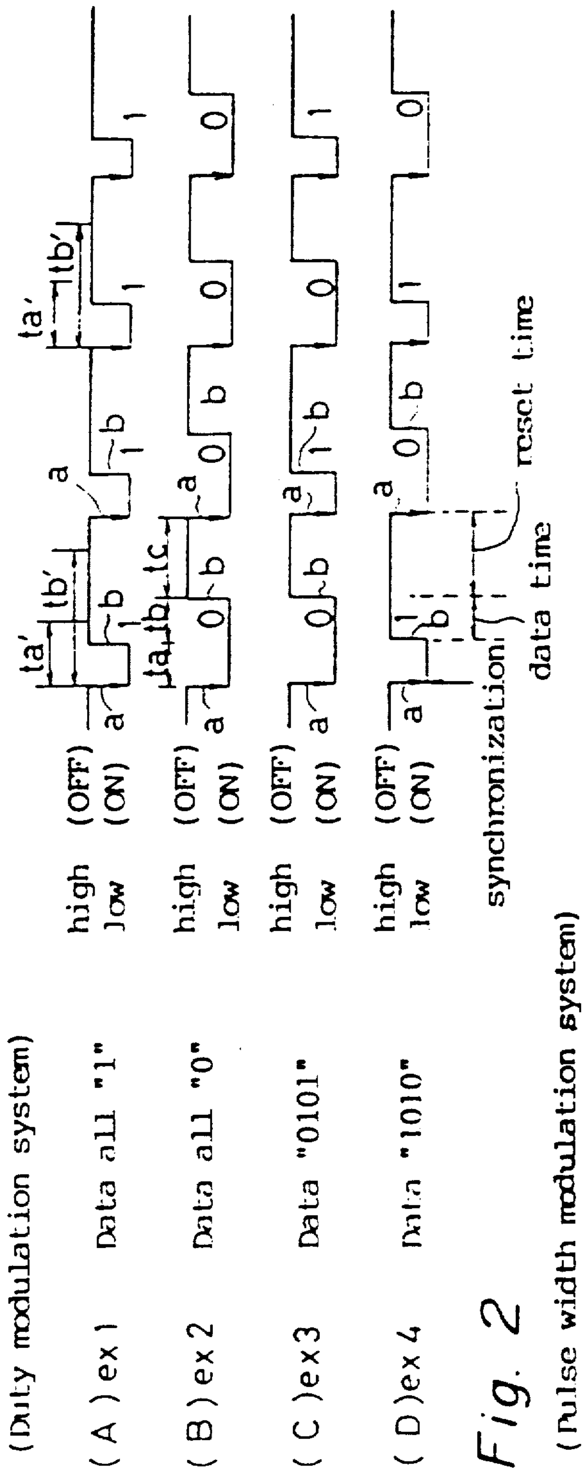
FIG. 2 illustrates a plurality of time charts (A)-(D) each showing pulse variation under a "duty modulation system"

FIG. 2 (A) shows a case in which all of the communication data bits are "1's", whereas FIG. 2 (B) shows a case in which all of the communication data bits are "0's". FIG. 2 (C) shows a case in which all of the communication data comprises continuous bits "0, 1, 0, 1", whereas FIG. 2 (D) shows a case in which all of the communication data comprises continuous bits "1, 0, 1, 0".

Figure 5:
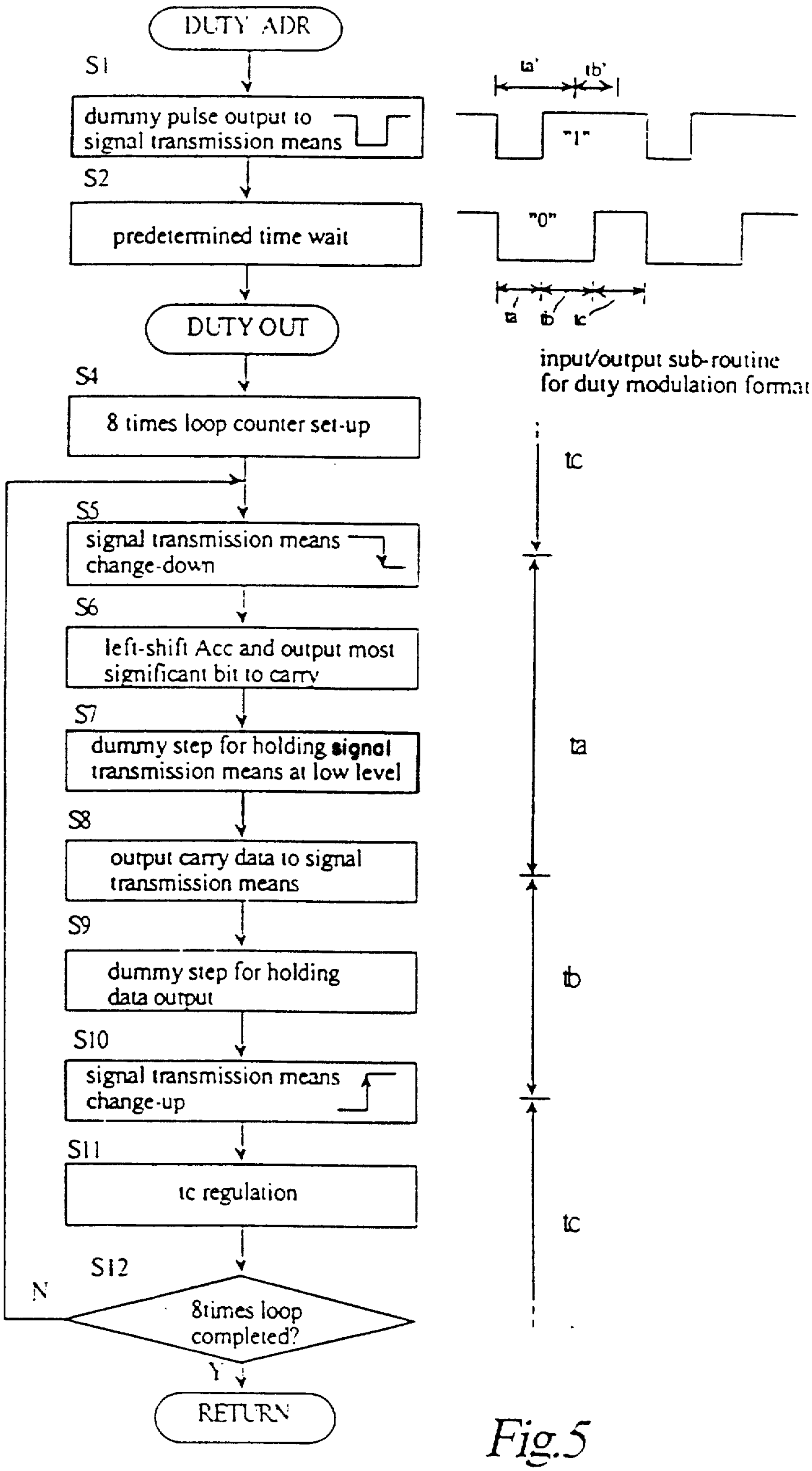
FIG. 5 illustrates a flow chart regarding operation of a "duty address" label and a "duty out" label.

In FIG. 5, the label of "DUTY ADR (duty address)" is called when an output signal is output. When it is intended to receive communication from body CPU 1 and as the flash CPU 12, for example, is so constructed as to simply await an input signal, no other processing could be performed. Accordingly, the flash CPU 12 is so constructed as to add to one pulse at the time of initiation of the communication and so as to skip over to an interrupt processing, whereby normal processing will be performed, except when the communication is actually being made.

First, one dummy pulse is given to the signal transmission means so that the receiver side jumps to a communication interruption process, whereby a wait of a predetermined period of time (with leeway) is performed before the receiver side awaits input processing (step S1, S2).

In process of "DUTY OUT" label, the output data stored in ACC (accumulator) is output one bit at a time from MSB (most significant bit) in accordance with the format of the duty modulation system.

In step 4, a loop count for 8 times is set and the signal which had been output to the signal transmission means is changed from "high (OFF)" down to "low(ON)" ("a" in FIGS. 2(A), (B), (C), and (D)) (step S5). At step S6, the accumulator is shifted to the left, and the most significant bit is output to a carry. At step S7, a dummy step for maintaining the signal level at "low (ON)" is output, and at step S8 carry data are output to the signal transmission means The processing in steps S5–S8 corresponds to the time ta as shown in FIG. 2 (B) which represents output data being transmitted.

In steps S9 and S10, a dummy step for regulating data output hold time is performed and the signal level is changed up to "high (OFF)" ("b" in FIG. 2(B)). Steps S8–S10 correspond to time tb when considering, for example, FIG. 2 (B) as being transmission output data.

In steps S11 and S12, regulation for the time tc from step S10 and to step S5 is performed, and judgement is made whether or not 8-count has been made in the loop counter. If 8-count has not been made in the loop, the process is returned to step S5 so as to repeat the process of steps S5–S11. If 8-count has been made in the loop, the process with simply return.

"DUTY IN" process, which is made when the flash CPU 12, 18 or multi-accessary CPU 13 receives data transmitted from the body CPU 1, will be explained in accordance with the flow chart in FIG. 6.

First, in step S13, an initial setting of timer interruption for detecting time-over is performed. If the signal is interrupted during communication, a routine of "TM OVR" (time over) (of FIG. 7, which will be explained later) will be performed.

In step S14, setting for 8 loop count is made and the process proceeds to step S15.

In step 15, judgment is made whether or not "change down" of the signal level exists. If no "change down" is detected, the step S15 will be repeated, whereas, if "change down" is detected, the process will proceed to step S16.

In steps S16, S17, a "dummy step" for regulation of the data input time is performed and the input data are set in the carry. Steps S15–S17 correspond to ta' when considering, for example, FIG. 2 (A) as being the input data.

In step S18, a left-shift is made to the input data of the accumulator, and carry set from the least significant bit is made.

In step S19, a dummy step for time regulation for the next process in which judgement, at predetermined timing, whether or not "change up" of signal transmission means exists is performed.

In step 20, judgement is made whether or not the signal level being transmitted is "high (OFF)". If the signal level is "high (OFF)", the process will proceed to step S21, otherwise the process will proceed to the "error treatment" routine (S23) beginning with the label "ERROR".

The steps S17–S20 correspond to tb' when considering FIG. 2(A) as being the receiving data. The relationship between the above ta and tb is represented as:

$$ta' = ta + \tfrac{1}{2}tb$$

The relationship between tb' and the above ta, tb and tc is represented as:

$$tb' = ta + tb + \tfrac{1}{2}tc$$

In step S21, judgement is made whether or not 8-count loop has completed. If it is completed, the process will proceed to step S22 so as to clear "error detection flag" and is returned. If it is not completed, the process will return to step S15 to repeat the processing.

The above "error treatment" routine is intended to avoid any malfunction which otherwise occurs due to influence of light scattering or noise pulse. For example, in the circuits of FIGS. 19 and 20, although influence of scattering infrared light is treated by means of hardware, it is further intended to avoid such malfunction by means of software. That is to say, continuing to check for the level of the signal transmission means until after a noise pulse has not been detected for a predetermined time period reduces possibility of causing transmission error which might occur if the process immediately proceeded to retransmission.

Accordingly, in step S24, a "timer for detecting address" is set and judgement is made whether or not the transmission level is "high (OFF)" (step S25). If "high (OFF)", the process will proceed to step S26, whereas, if other then "high", the process will return to step S24.

In step 26, count-down is made to the above "timer for detecting address," and judgement is made as to whether the result is zero. If count operation of the "address detecting timer" has been completed, the process will proceed to step S27; otherwise it will proceed to step S25.

In step 27, an "error detecting flag" is set, setting for input/output of the communication data is performed (step S28), and resetting of "communication interruption" for the next communication is performed (step S29). Further, a "stack operation" is performed (step S30) and the accumulator and register are returned (step S31) for returning of the process.

The "TM OVR (time over)" routine will explained with reference to FIG. 7.

First, "accumulator/register refuge treatment" and "timer interruption inhibition treatment" are performed, together with setting of an "address detection timer" (steps S32–S34), thus advancing the process to step S35.

In step 35, judgement is made as to whether the level of the transmission/receiving data is "high (OFF)". If "high (OFF)", the process will proceed to step S36, otherwise it returns to step S34.

In step 36, count-down is made by "time over detection timer" so as to judge if the result is zero. If counting of the "time over detection timer" has been completed, the process will proceed to step S37, otherwise it returns to step S35.

In step 37, input/output for the signal transmission means is set, together with a "flag for time over" (step S38). Resetting of communication interruption for the next communication is made and then a "stack operation" is performed (step S40). Thereafter, the process is returned.

Figure 3:
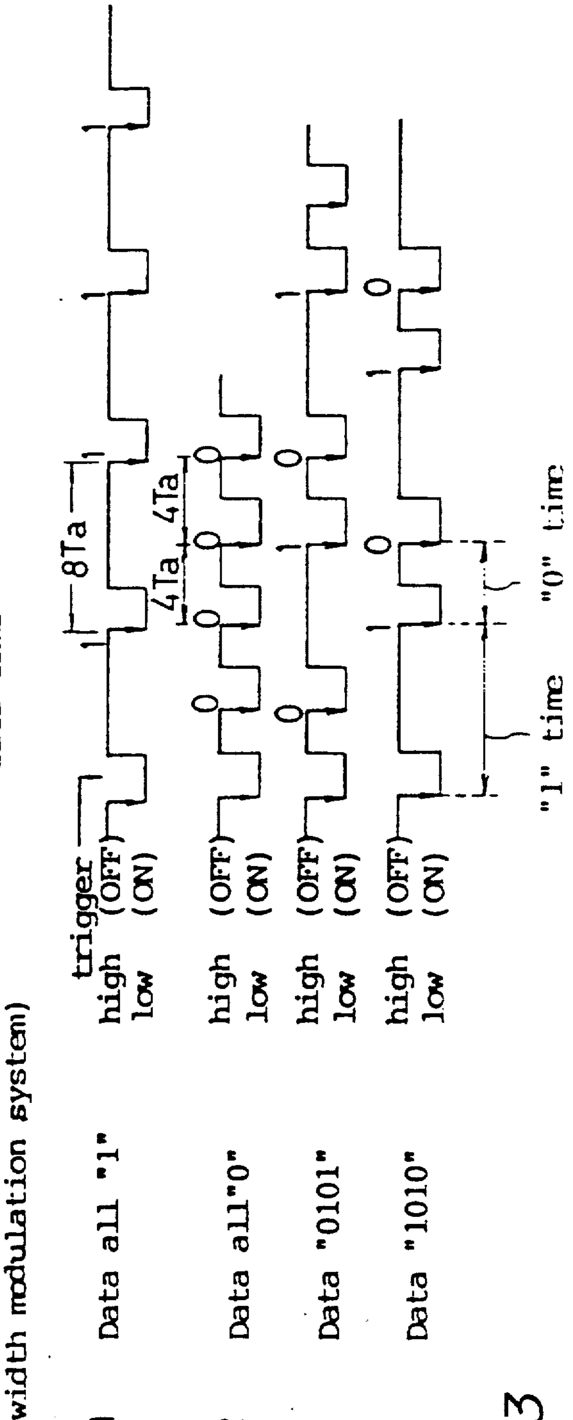
FIG. 3 illustrates a plurality of time charts (A)-(D) each showing pulse variation under a "pulse width modulation system"
Figure 8:
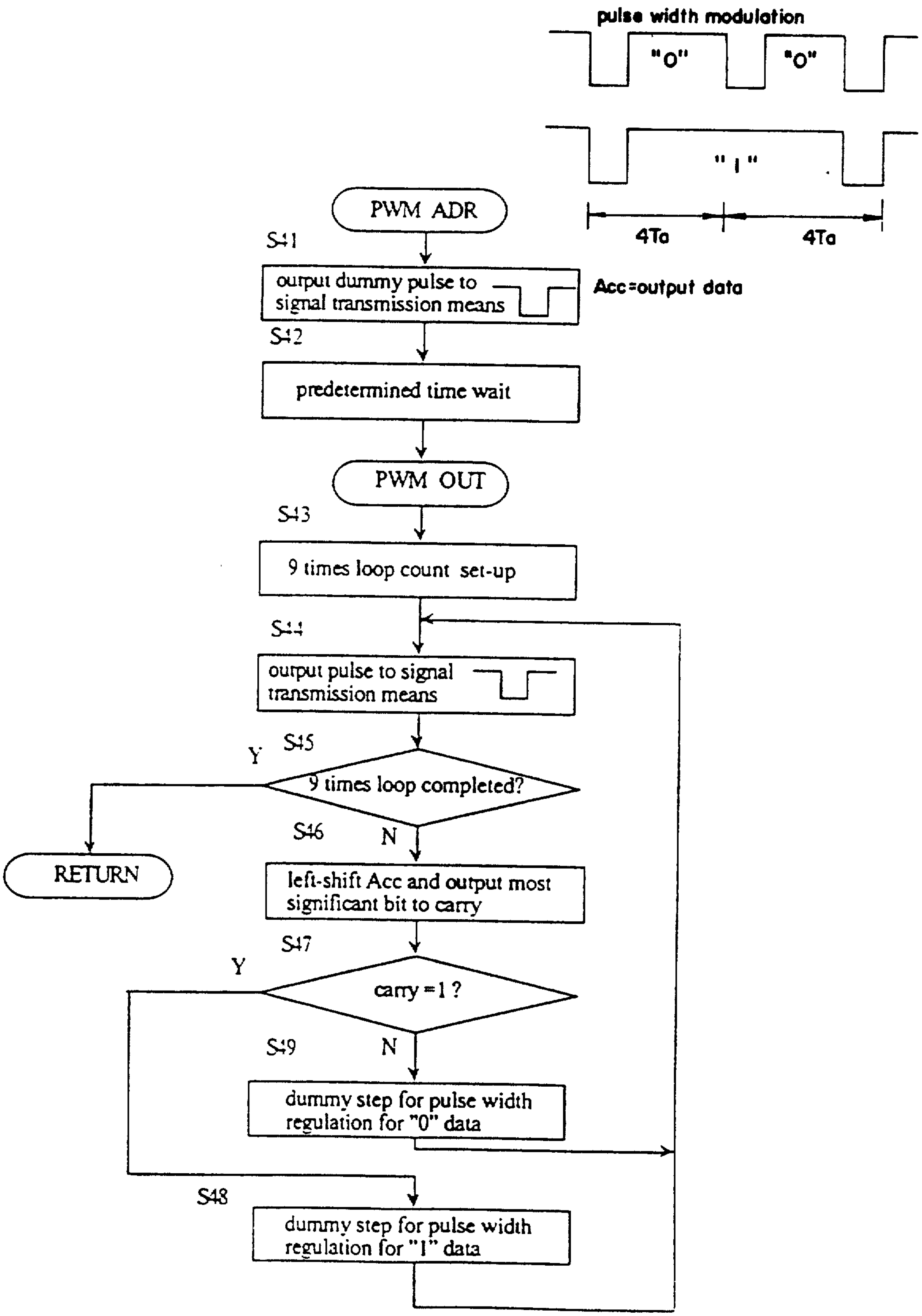
FIG. 8 illustrates a flow chart regarding operation of a "pulse width modulation address" label and a "pulse width modulation out" label.

A "pulse width modulation system" for modulation of "pulse width" will be explained hereinbelow with reference to the time chart of FIG. 3 and flow charts of FIGS. 8 and 9.

In the process beginning with label "PWM ADR" (pulse width modulation address), when one dummy pulse is output from, for example, the body CPU 1 to the signal transmission means, a receiver side (for example, flash CPU 18) proceeds to treat input data as a communication interrupter (step S41). Since it takes a substantial period of time before the process proceeds to the input treatment, a predetermined wait time is made in step S42, and thereafter the process proceeds to a treatment beginning with label "PWM OUT" (pulse width modulation out).

In step S43, setting of 9 times loop count and output of one pulse to the signal transmission means are performed (step S44), and then the process will proceed to step S45.

In step S45, judgement is made whether or not the 9 times loop has been completed. If completed, the process will be returned, otherwise it will proceed to step S46. Left-shift is made to the "output data" established in the accumulator so as to first output the most significant bit to the carry. Then, the process will proceed to step S47.

In step S47, the carry is checked. If the carry is "1", the process will proceed to step S48, and performs a "dummy step" for adjustment of the pulse interval for "1" data. Then it returns to step S44. If the carry is "0", the process will proceed to step S49, and performs a "dummy step" for adjustment of the pulse interval for "0" data, then returning to step S44.

Figure 9A:
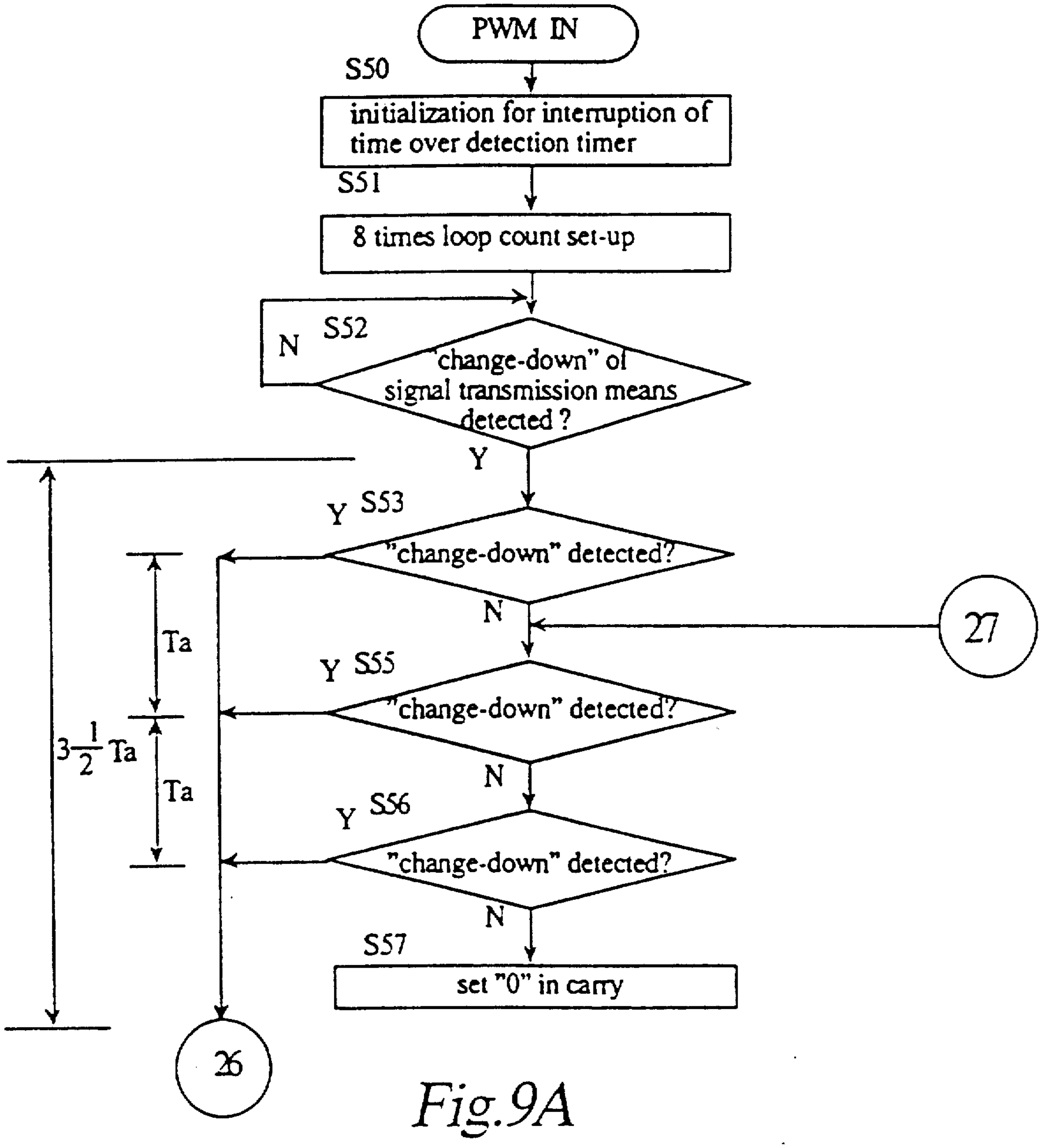
FIGS. 9A through 9C each illustrates a flow chart regarding operation of a "pulse width modulation in" label.
Figure 9B:
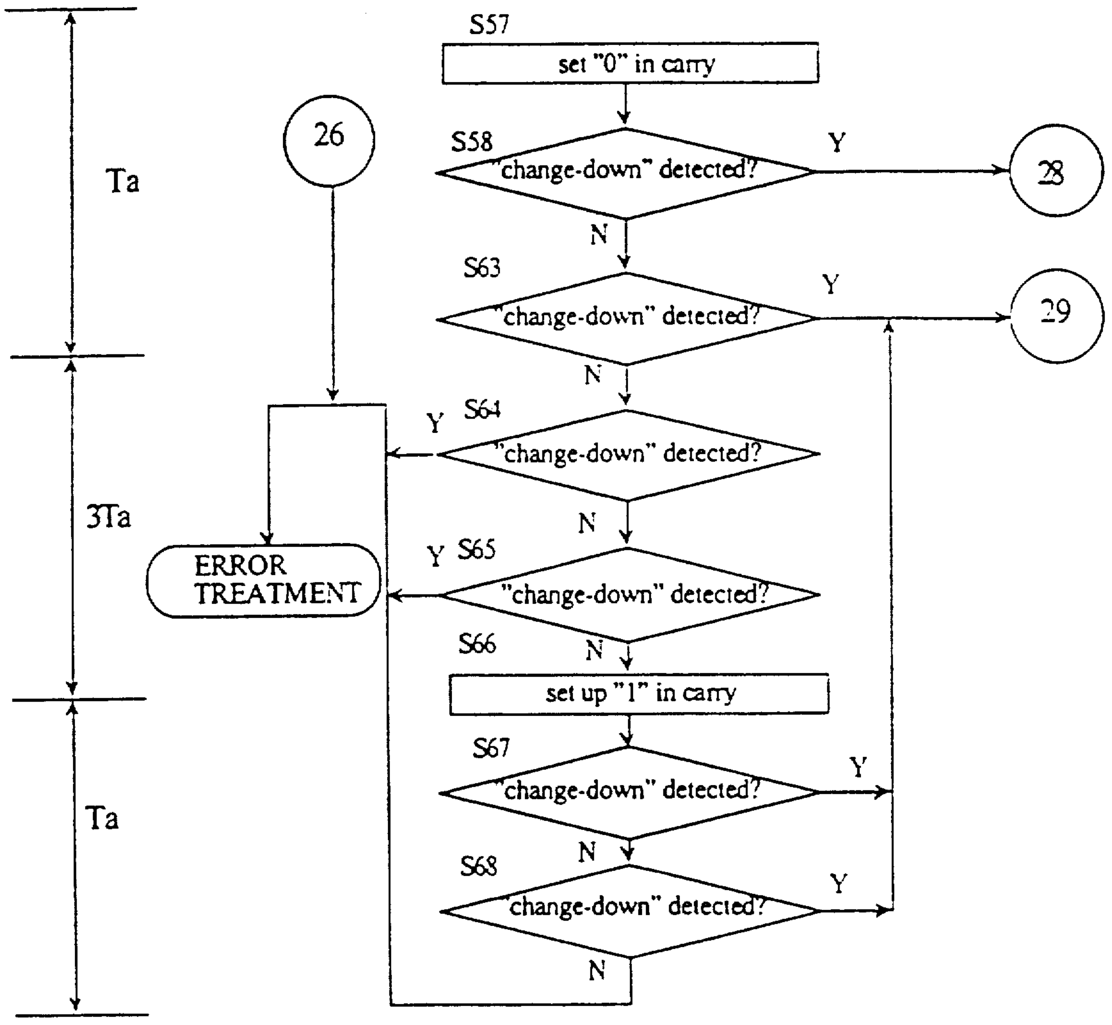
Figure 9C:
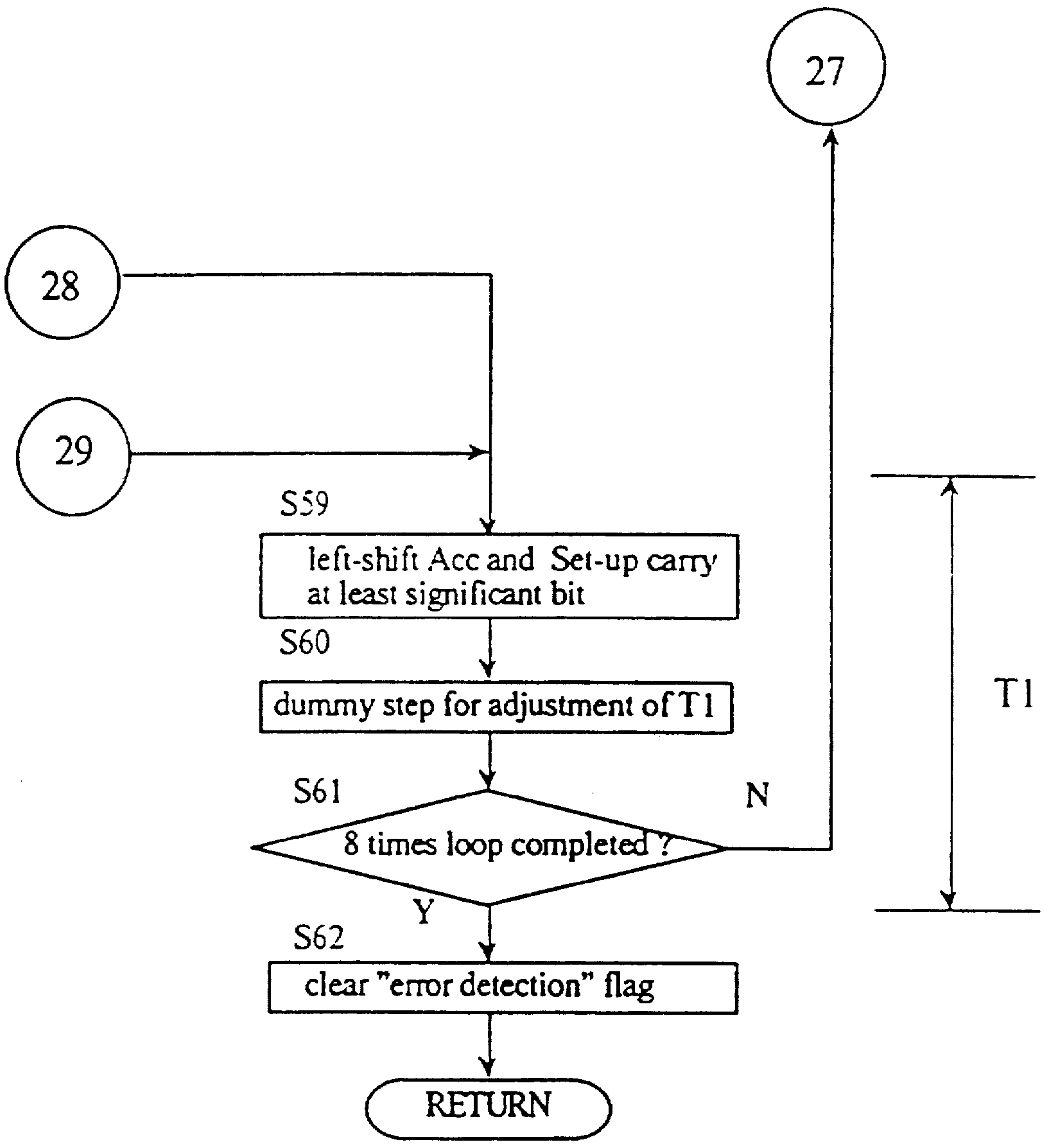

The "PWM IN" (pulse width modulation in) routine, for the case of receiving communication data output from, for example, the body CPU 1, will be explained hereinbelow with reference to FIG. 9A through FIG. 9C.

First, in step S50, "timer interruption treatment" for detecting time-over is initialized and a counter of 8 times loop is set (step S51). Then, the process will proceed to step S52.

In step S52, judgement is made as to whether "change-down" of the signal transmission means exists. If "change-down" is detected, the process will proceed to step S53, otherwise step S53 will be repeated.

If "change-down" similar to that of step 52 is detected in step 53, the process will proceed to a treatment beginning with label "ERROR TREATMENT", otherwise to step S55. In steps S55 and S56, a judgement similar to that of step S53 is made. If "change-down" is detected in step S55, the process will proceed to step S54, otherwise to step S56. If "change-down" is detected in step S56, the process will proceed to "ERROR TREATMENT", otherwise to step S57.

In step S57, a time of 3 and ½ ta has passed since the first "change-down" was detected in step S53. Accordingly, the carry is set at "0", and the process will proceed to step S58.

In step S58, judgement is made a to whether a "change-down" of the signal transmission means exists. If detected, the process will proceed to step S59, otherwise to step S63.

In step S63, if "change-down" is detected, the process will proceed to step S59; otherwise it proceeds to step S64.

In steps S64 and S65, judgement is made as to whether "change-down" of the signal transmission means exists in a manner similar to the above. If "change-down" is detected, the process will proceed to step S54 where the "ERROR TREATMENT" routine is performed. If no "change-down" is detected, step S64 will proceed to step S65, and similarly step S65 will proceed to step S66.

In step S66, a time of "3 and ½ Ta+Ta+3Ta" has passed since the previous "change-down" was detected. Accordingly, the carry is set at "1", and then the process will proceed to step S67. In this connection, it should be noted that the time Ta is merely a convenient unit of time for detecting "1" and "0" data bits in a "pulse width modulation system". Accordingly, in the embodiment shown in FIG. 3, 8Ta from the previous "change-down" to the next is set for "1" data bits, while 4Ta from the previous "change-down" to the next is set for "0" data bits.

In step S67, judgement is made as to whether a "change-down" of the signal transmission means exists. If a "change-down" is detected, the process will proceed to step S59, otherwise to step S68.

In step S68, a judgment similar to the above is made. If a "change-down" is detected, the process will proceed to step S59, otherwise "ERROR TREATMENT" will be performed.

In step S59, a left-shift is made to the data of the accumulator and the input data stored in the carry will be input from the least significant bit in sequence.

In step S60, a "dummy step for adjustment of Tl" is performed and then the process will proceed to step S61.

In step S61, judgement is made to whether an 8 times loop has been completed. If completed, the process will proceed to step S62 so as to clear an "error detection flag." The process then returns. If not completed, the process will return to step S55, and again judgement of a "change-down" for the signal transmission means will be performed.

Figure 4:
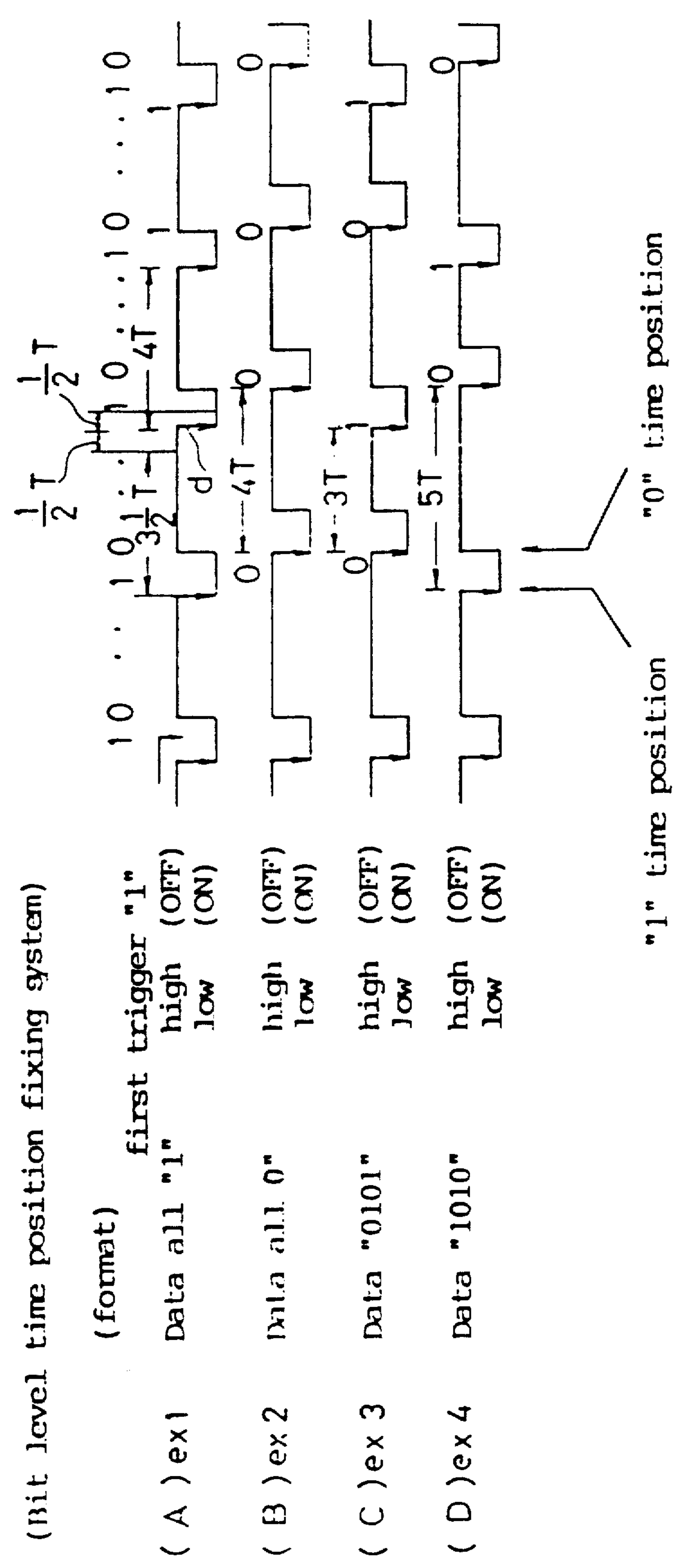
FIG. 4 (A)-(D) each illustrates a plurality of time charts each showing pulse variation under a "bit level time position fixing system"

A "bit level time position fixing system" for fixing "bit level time position" will now be explained with reference to the time chart of FIG. 4 and flow charts of FIGS. 10A, 10B, 11A and 11B.

According to the instant flow, noise pulse caused by external scattering light is detected if "change-down" occurs than the time range of "±½T" relative to the time period in which normal "change-down" of "1" or "0" is output. If a noise pulse is detected, the process will jump to the above "ERROR TREATMENT".

Figure 10A:
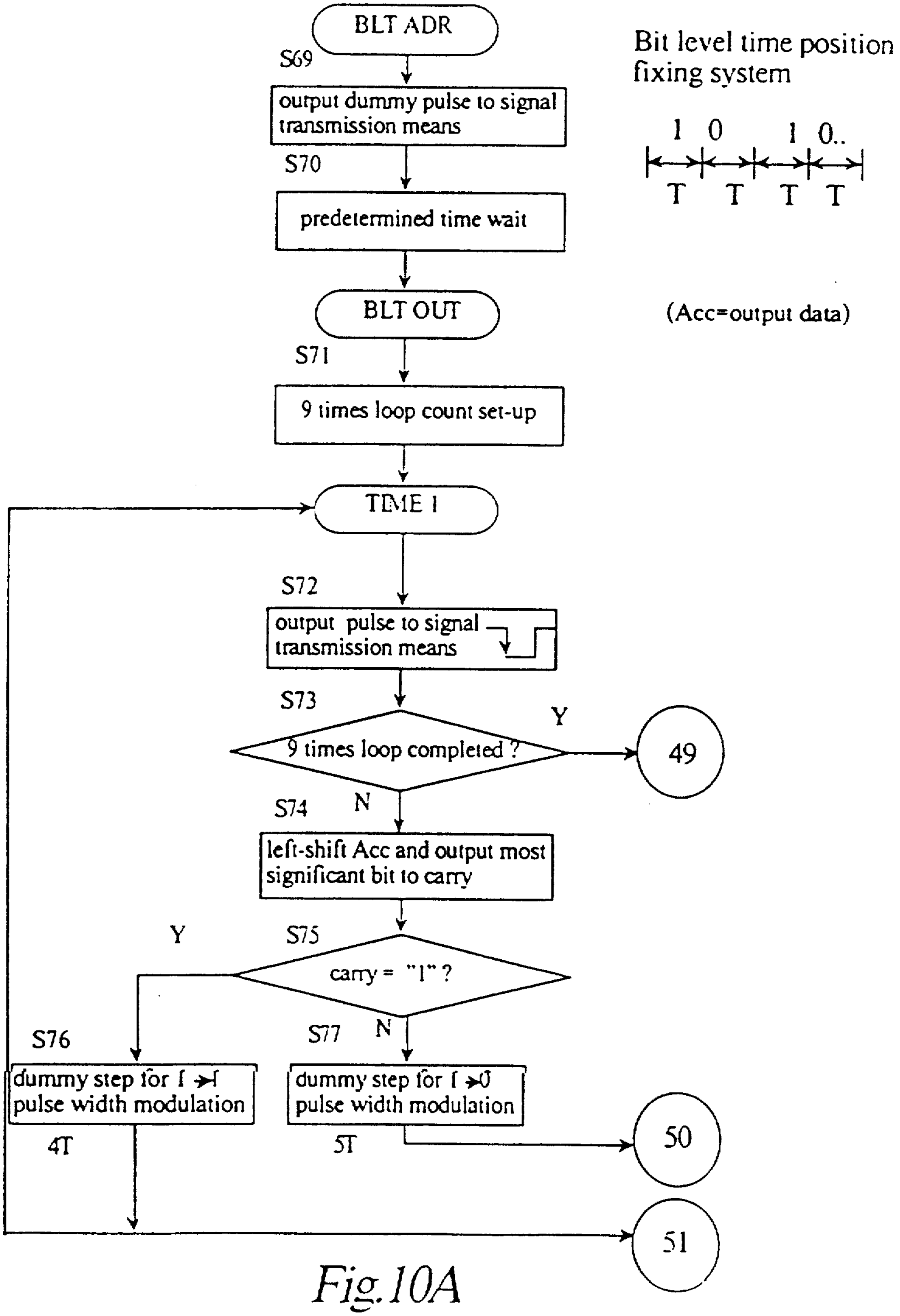
FIGS. 10A and 10B each illustrates a flow chart regarding operation of a "bit level time address" label.
Figure 10B:
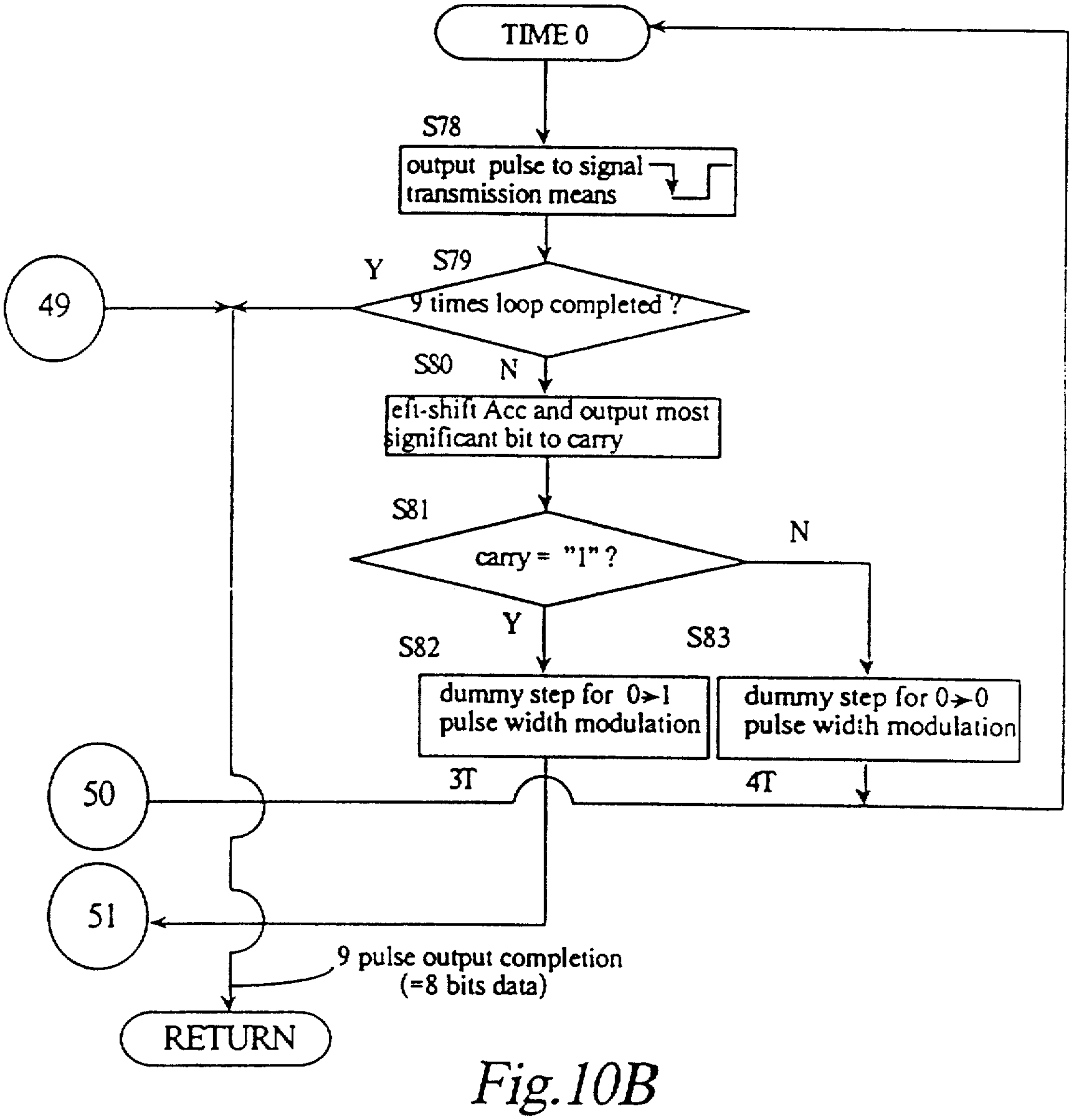

In FIG. 10A, the label of "BLT ADR" (bit level time address) is called when an address signal is output. If the receiver side is so constructed that it simply awaits an input signal, no other process might be performed. According to the invention, an addition of one pulse is made at the beginning of communication so as to jump the process to interruption treatment, thus making it possible to perform normal treatment except when the communication is being made.

In step S69, one dummy pulse is given to the signal transmission means so as to make the receiver side jump to "communication interruption treatment".

In step S70, a wait of a predetermined time period is performed. In this regard, it is noted that the time period requisite for the receiver side to enter the entry waiting condition with some allowance is estimated in the predetermined time period.

In the following steps, the data bits previously stored in the accumulator are output one bit at a time from the most significant one in sequence is accordance with the format of a "bit level time position fixing system."

It is necessary to output 9 pulses in total in order to transmit 8 bits of data, since on "trigger pulse" in addition to the 8 bits is output at the initial position. Accordingly, a 9 times loop count is set in step S71. u The process then proceeds to "TIME 1" and, in step S72, the first pulse of the data to be transmitted to the signal transmission means is output. The process will proceed to step S73.

In step S73, count down of the loop counter is checked to determine if the 9 times loop has been completed. If the 9 times loop has been completed, the process will return. If not completed, the process will proceed to step S74 and then make a left shift of the 8-bit "output data" stored in the accumulator so as to output them to the carry one bit at a time from the most significant one in sequence.

In step S75, a check is made of the carry. If it is a "1", the process will proceed to step S76 and then a dummy step will be performed for adjustment of the 4T (TIME) for setting a pulse interval requisite for the "1" to shift to the next "1" and returns to "TIME 1" so as to output "1" data. If the carry is "0" in step S75, the process proceeds to step S77 and then performs a dummy step for adjustment of 5T (TIME) for setting a pulse interval requisite for the "1" to shift to "0". Then, the process will proceed to "TIME 0" in order to output "0" data.

In "TIME 0", at step S78, one pulse is given to the signal transmission means so as to check if the 9 times loop in step S79 has been completed. If the 9 times loop has been completed (i.e., completion of a 9-pulse output, which means an output of 8 data bits has been completed), the process will return. Otherwise, the process will proceed to step S80.

In step 80, a left shift is made to the 8 bits of "Output data" stored in the accumulator so as to output them to the carry one bit at a time in sequence from the most significant.

In step 81, it is determined if the pulse which was output to the carry is a "1". If it is a "1", the process will proceed to step S82 and performs an adjustment dummy step of 3T for setting a pulse interval requisite for shifting the "0" to the next "1". The process will return to "TIME 1" so as to output "1" data bits.

In step S83, an adjustment dummy step of 4T for setting a pulse interval requisite for shifting the "0" to the next "0" is performed. The process will return to "TIME 0".

By repeating these steps, it is possible to achieve accurate transmission from a transmission side, (e.g., the body CPU 1), to a receiving side, (e.g., the flash CPU 12), with appropriate pulse time intervals for 8 bit data, while giving a definite distinction between "0" and "1" data bits according to the time interval.

Figure 11A:
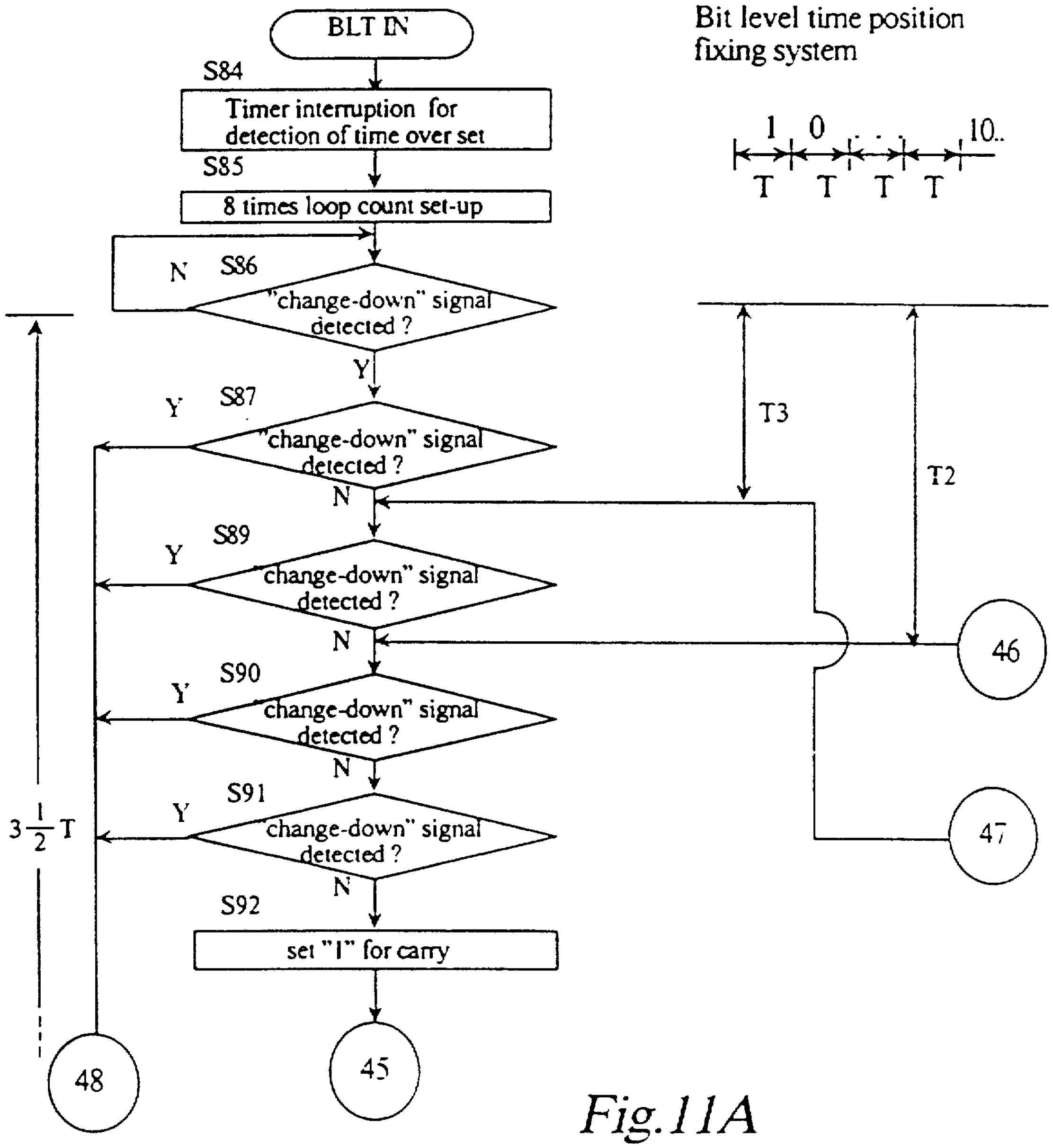
FIGS. 11A and 11B each illustrates a flow chart regarding operation of a "bit level time in" label.
Figure 11B:
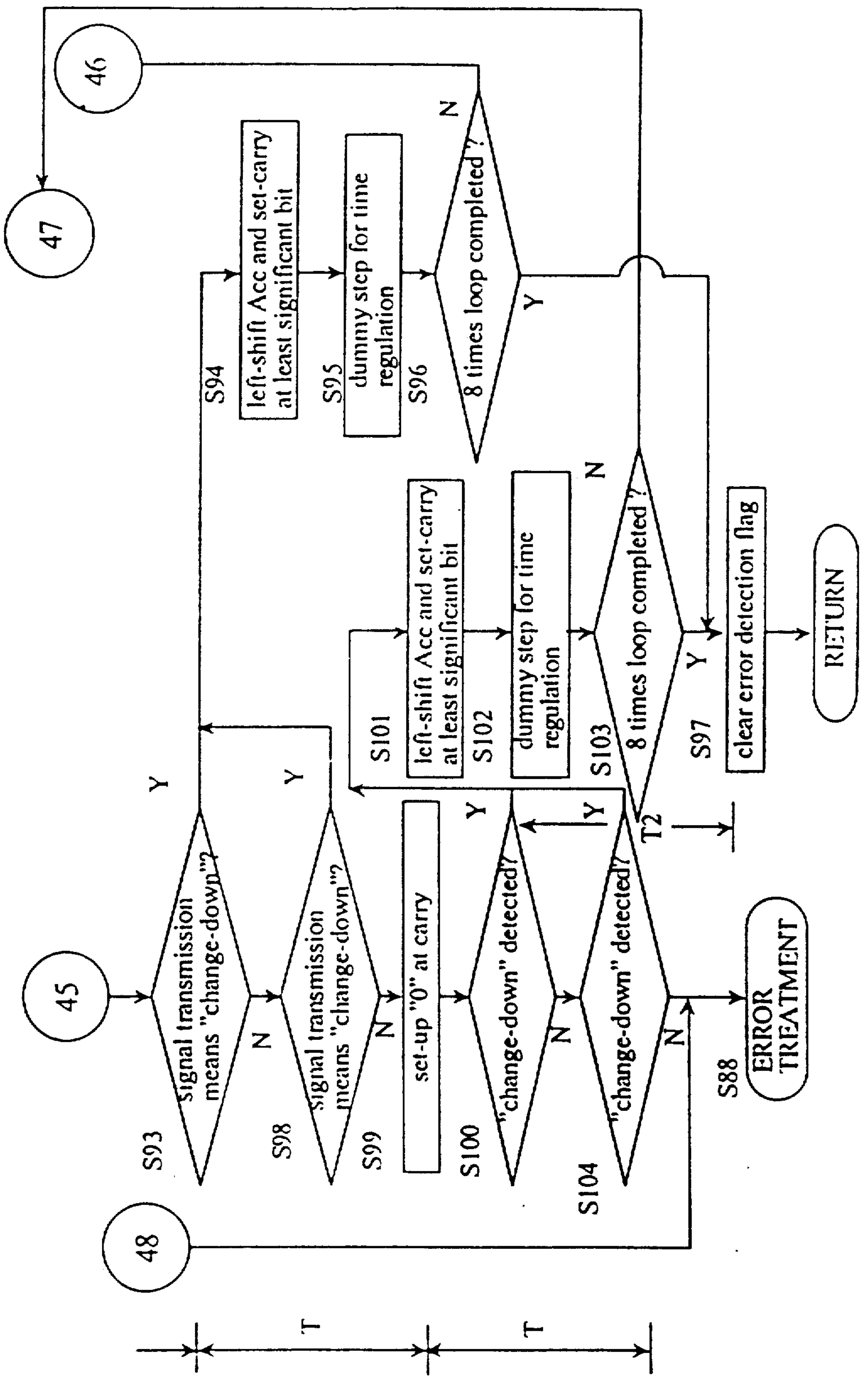

A processing of "BLT IN" (bit level time in) for use in receiving transmitted data will now be explained with reference to the flow charts of FIG. 11A and FIG. 11B.

In step S84, initialization is made of the "timer interruption for detection of time over" for checking if the receiving the series of pulses is completed within a given time in order to detect if normal communication is not being performed since, for example, only one pulse may be transmitted.

In step S86, determination is made of a "change-down", i.e., a first synchronization, is detected. If detected, the process will proceed to step S87, otherwise step S86 will be repeated.

In step 87, determination is made as to whether an additional "change down" of the signal transmission means is detected. If detected, the process skips to a routine beginning with a label of "ERROR TREATMENT"; otherwise it proceeds to step S89. In this regard, as shown in FIG. 4(A), it is noted that a time interval of "(½)T" is provided at both ends of the "change-down" representing a "1". Accordingly, it requires at least (3+½)T from a "change-down" representing the previous "1" to a "change-down" representing the next "1". Thus, pulses arriving within the "(3 and ½)T" will be regarded as noise pulses. In order to satisfy this, judgement similar to that of step S87 is performed in steps S89, S90, and S91.

If a "change-down" of the signal transmission means is not detected in step S91, a "1" will be set up in the carry in step S92.

In step S93, positioned at "(3 and ½)T" after completion of step S86, if a "change-down" of the signal transmission means is detected, the process will proceed to step S94 wherein the "input data" bits of the accumulator are left-shifted and the carry is set to the least significant bit. Then the process will proceed to step S95.

In step S95, a "dummy step" for regulating the time for the next pulse is performed, and thereafter the process proceeds to step S96. Then, judgement is made as to whether the 8 times loop has been completed. If completed, the process proceeds to step S97, so as to clear the "error detection flag," and thereafter returns. If not completed, the process will skip to step S89.

In the above step S93, if no "change-down" of the signal transmission means is detected, the process proceeds to step S98 so as to perform a judgement the same as that of the step S93. If no "change-down" of the signal transmission means is detected in the step S98, the process will proceed to step S99.

In step S99, a time period of 1T has passed from the step S93 to this step, S99. Accordingly, "0" is set up in the carry, and the process will proceed to step S100.

In step S100, judgement is made as to whether a "change-down" of the signal transmission means exists If a "change-down" is detected, the process proceeds to step S101 wherein a left-shift of "input data" of the accumulator is performed, while sequentially setting the carry to the least significant bit. Then the process proceeds to step S102. In step S102, a "dummy step" for conducting time adjustment for the next pulse is performed. Further, in step S103, judgement is made to whether the 8 times loop has been completed. If completed, the process proceeds to step S97 so as to clear "error detection flag" and then returns. If not completed, the process goes back to step S90.

In step S100, if a "change-down" from "high(OFF)" to "low(ON)" of the signal transmission means isn't detected, the process will proceed to step S104 wherein another judgement, the same as that of the step S100, is performed.

In step S104, if a "change-down" of the signal transmission means is detected, the process will proceed to step S101. If not detected, the process will proceed to step S88 wherein an "ERROR TREATMENT" routine is performed.

In this regard, each detection/judgement section is connected with dotted lines in the drawings, since the number of "change-down detection/judgement section" of the signal transmission means as between the steps S87-S91, steps S93-S98, and steps S100-S104 vary depending upon the kind of microcomputer and/or oscillation clock employed.

Operation will be explained hereinbelow, wherein data communication between the body CPU 1 and accessary CPU 13, or between the body CPU 1 and flash CPU 18 is performed by means of infrared light, or data communication between the body CPU 1 and flash CPU 12 is performed by means of communication line L.

Figure 27A:
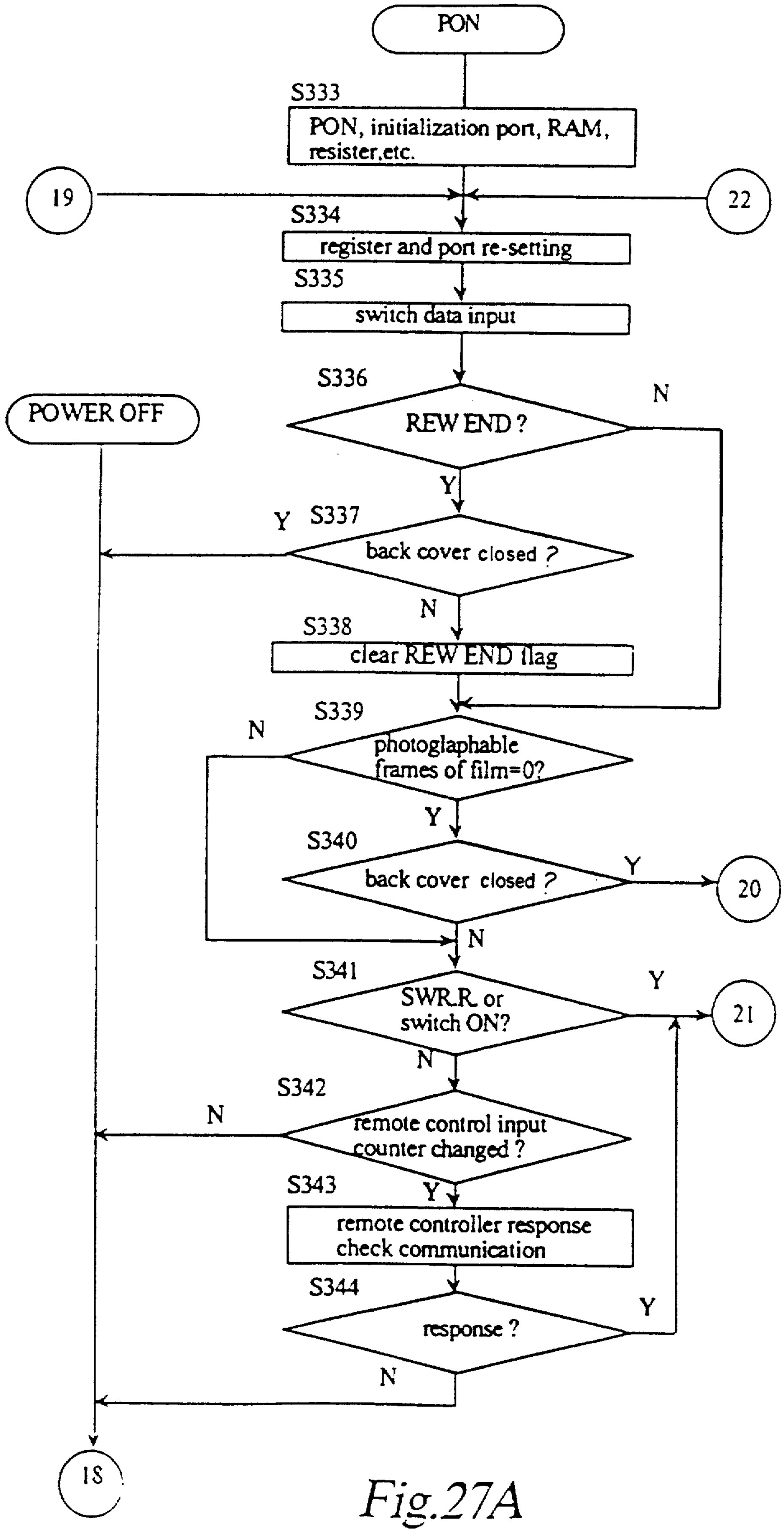
FIGS. 27A through 27C each illustrates a flow chart regarding operation of a "power on" label.
Figure 27B:
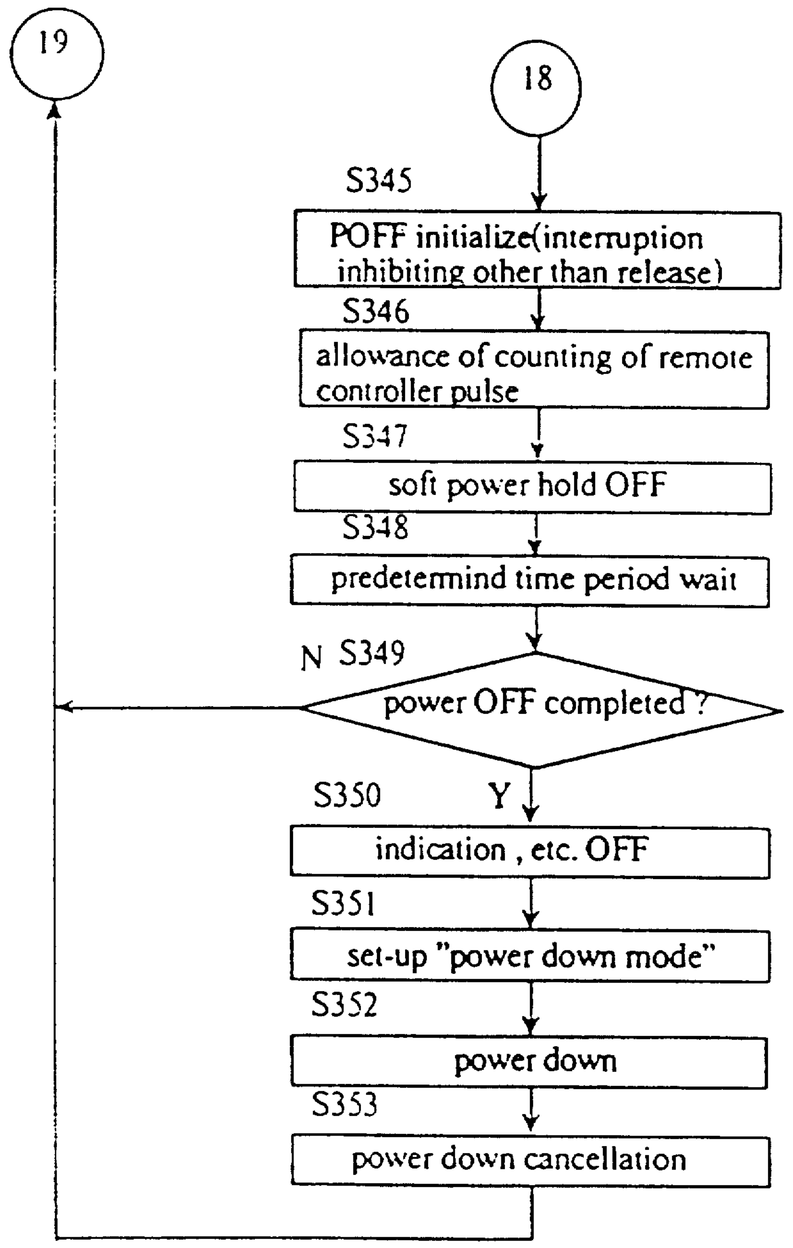
Figure 27C:
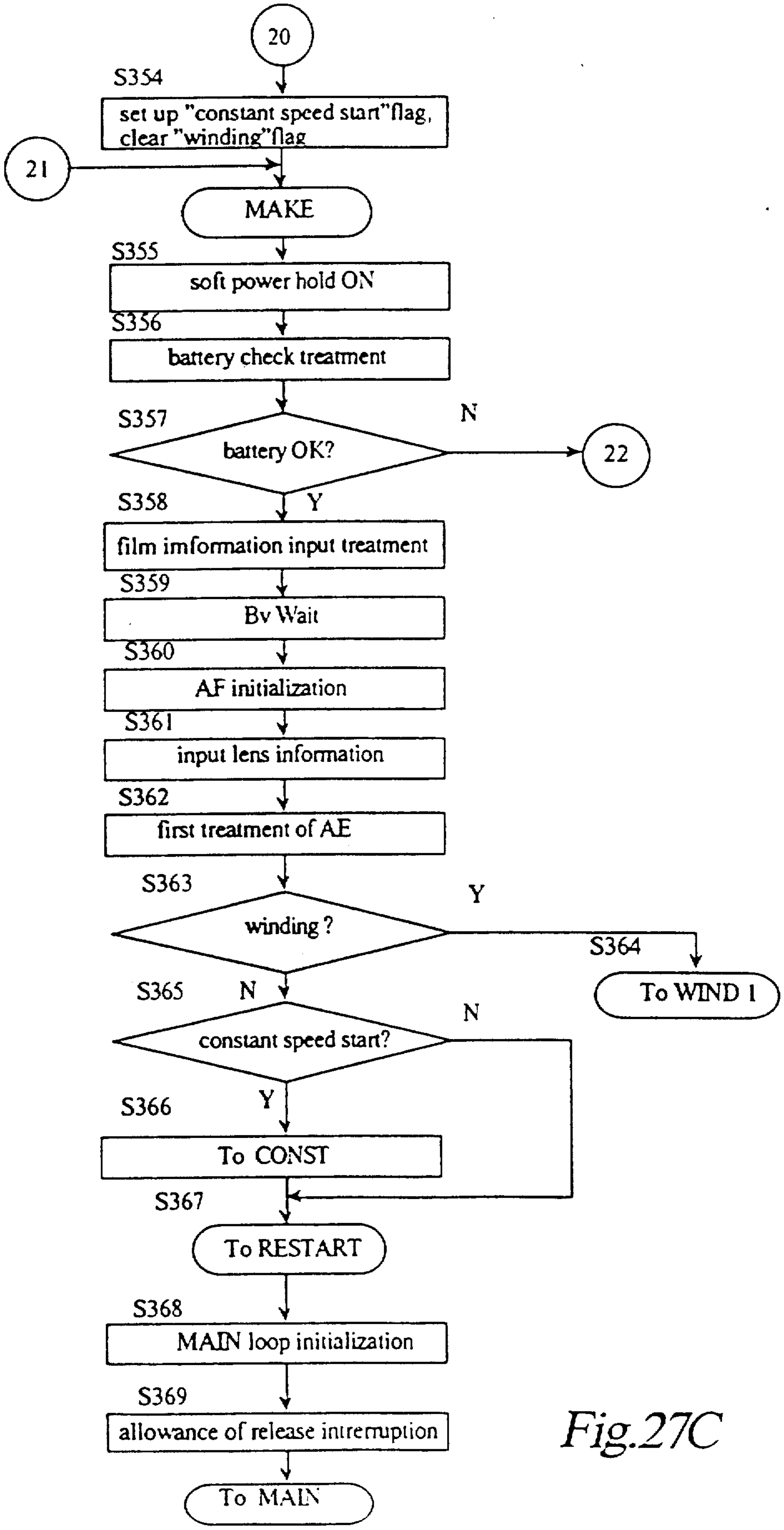

FIGS. 27A, 27B and 27C each illustrate a routine beginning with the "power on" label.

First, in step S333, initialization of the port, RAM, register, etc., is performed.

In step S334, resetting of the register and port is performed, and then the process proceeds to step S335, wherein input of "switch data" is conducted.

In step S336, judgement is made as to whether "rewind" has been completed. If rewind has not yet been completed, the process will jump to step S339. If "rewind" had been completed, the process will proceed to step S337 wherein judgement is performed as to whether the back cover is closed. If the back cover is closed, the process proceeds to step S345 wherein an initialization is performed which is necessary upon power OFF, such as inhibiting interruption other than release. If the back cover is not closed, the process proceeds to step S338 so as to clear a "rewind END flag". It then proceeds to step S339.

In step S339, judgement is made as to whether a number of photographable frames of the film is "0". If the number is not "0", the process jumps to step S341. If it is "0", judgement is performed as to whether the back cover is closed in step S340. If the back cover is closed, the process will proceed to step S354 wherein a "constant start flag" is set and a "winding flag" is cleared. If the back cover is not closed, the process proceeds to step S341, therein judgement is made as to whether the photometric switch or release switch is turned ON. If either one of the above switches is turned ON, the process proceeds to a treatment beginning with "WAKE" label. If neither of the switches is turned ON, the process will proceed to step S342.

In step S342, judgement is performed as to whether the value of the counter changes by means of an infrared signal from, for example, the remote controller. If no change is found with respect to the counter, the process proceeds to step S345. If a change is found with respect to the counter, a "remote controller response check communication" is performed in step S343. Thereafter, a judgement with respect to the response is performed in step S344 as to whether the change of the counter is caused by the remote controller. If a response is recognized, the process will proceed to treatment beginning with a "WAKE" label. If no response is recognized, the process will proceed to step S345, wherein initialization necessary for power OFF, such as inhibition of interruption other than the release, is performed.

In steps S346–S348, allowance of counting of a remote controller pulse and performance of a "soft power hold OFF" are conducted, together with wait for a predetermined time period, and then the process proceeds to step S349.

In step S349, judgement is made as to whether a "power OFF" has been completed. If not completed, the process goes back to step S334. If completed, the process proceeds to step S350, wherein indication on the LCD display is turned OFF.

In steps S351–S353, setting of a "power down mode", including setting of a resume time after power down, is performed, and a "power down" is performed after a predetermined time period. Then, the process returns to step S334.

In step S355, a "soft power hold" is turned ON, a "battery check treatment" is performed, and judgement is made as to whether the battery voltage is appropriate (steps S356, S357). If the battery voltage is not appropriate, the process goes back to the step S334; while, if appropriate, the process proceeds to step S358, wherein a "film information input treatment" routine is conducted.

In steps S359–S361, a "Bv wait treatment," for waiting until the output of a light acceptance element becomes stabilized. and an "AF initialization" are performed. "Lens information", such as focal length, aperture, and zoom information are input (S361), and then the process proceeds to step S362.

In step S362, a "first treatment of AE" is performed so as to judge if winding is being carried out. If winding is being carried out, "WIND 1" routine, the explanation of which has been omitted in this application, is performed. If winding is not being carried out, the process will proceed to step S365 so as to determined if the mode is "constant speed start". If the mode is not "constant speed start", the process jumps to step S367. If the mode is "constant speed start", the process will proceed to step S366 wherein a "CONST(searching treatment)" routine, the explanation of which is omitted in this application, is conducted. Then, the process will proceed to the "RESTART" routine.

In step S368, a "main loop initialization" is performed, and in step S369, an "allowance of release interruption" is performed. Then, the process proceeds to the "MAIN" routine.

Figure 28:
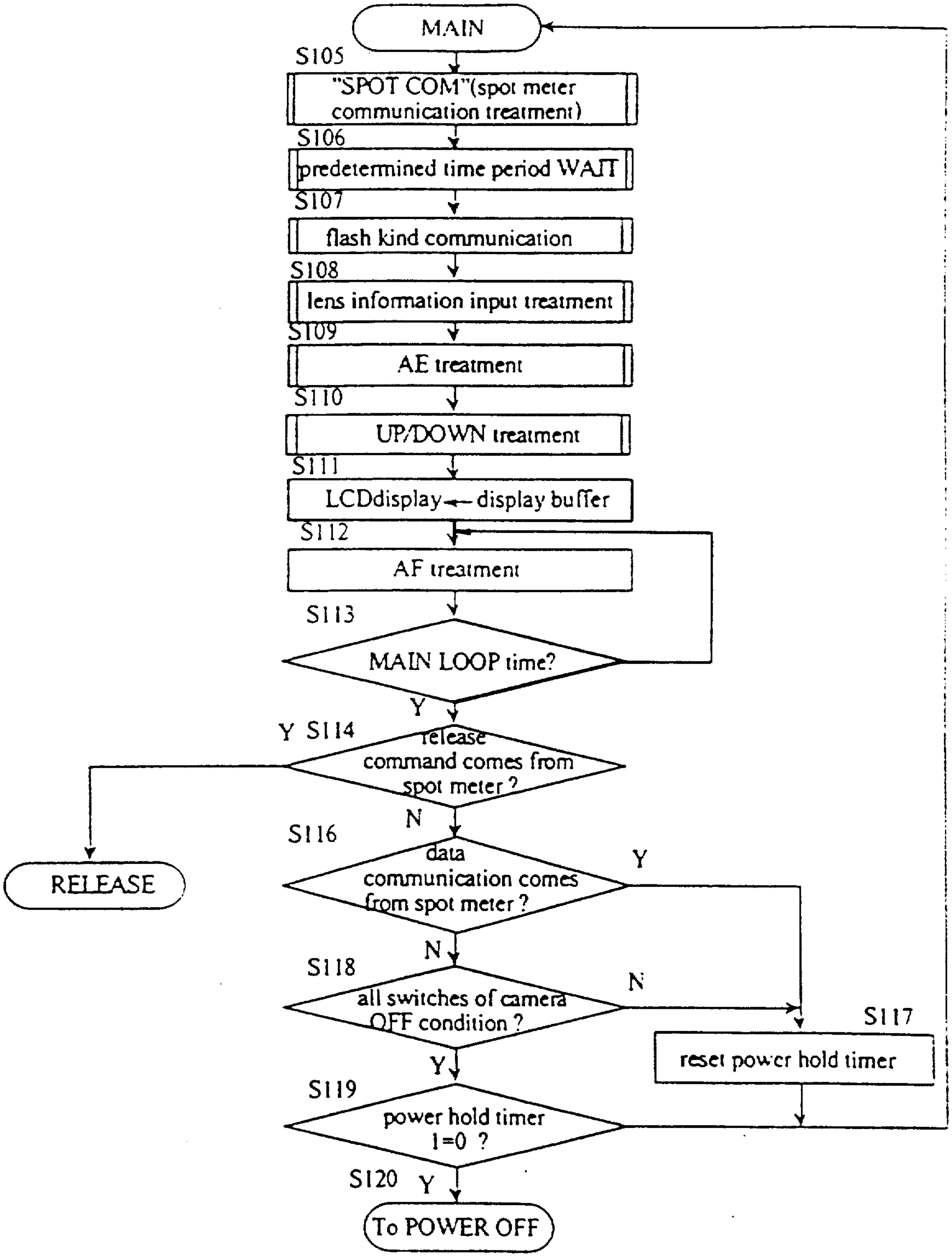
FIG. 28 illustrates a flow chart regarding operation of a main routine.
Figure 29A:
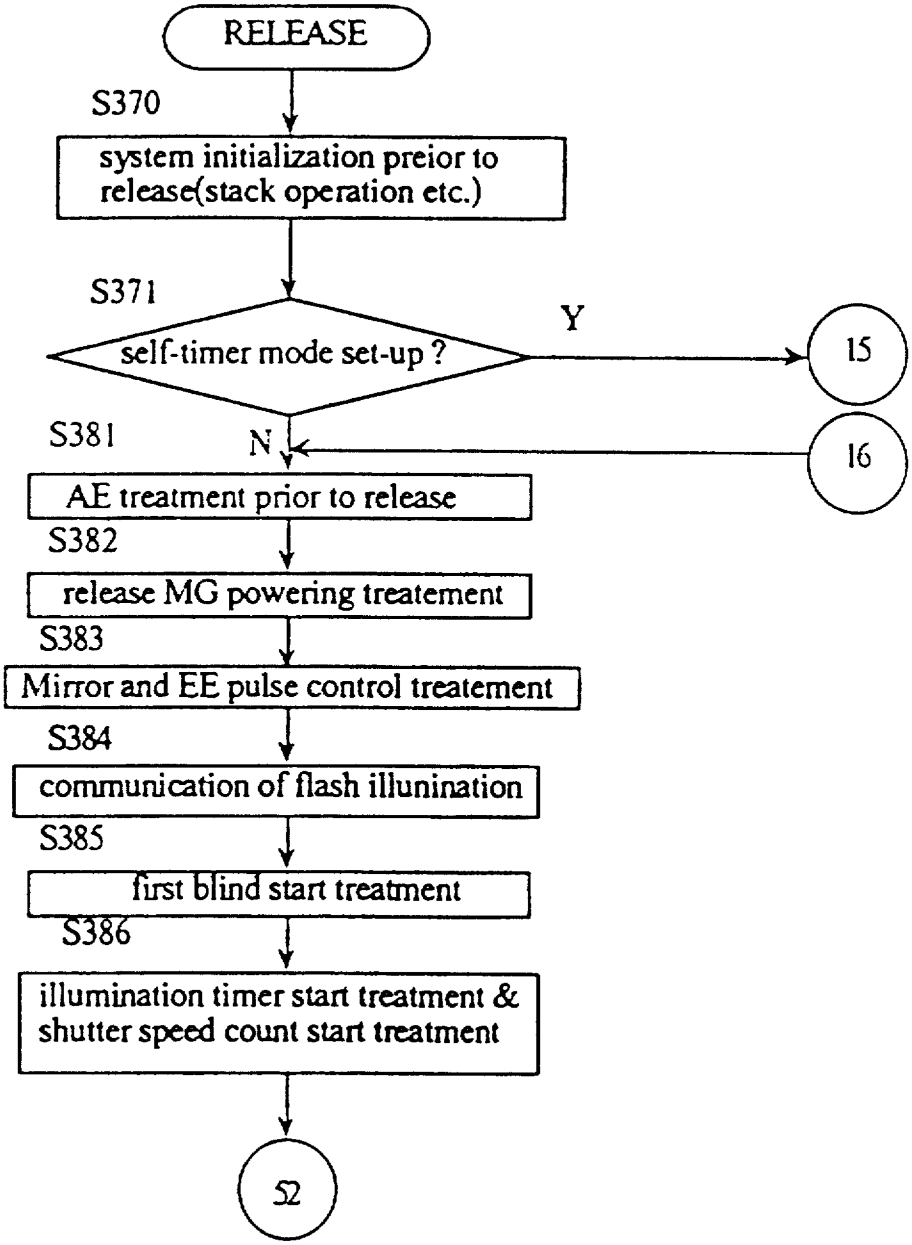
FIGS. 29A through 29D each illustrates a flow chart regarding operation of a "release" label.
Figure 29B:
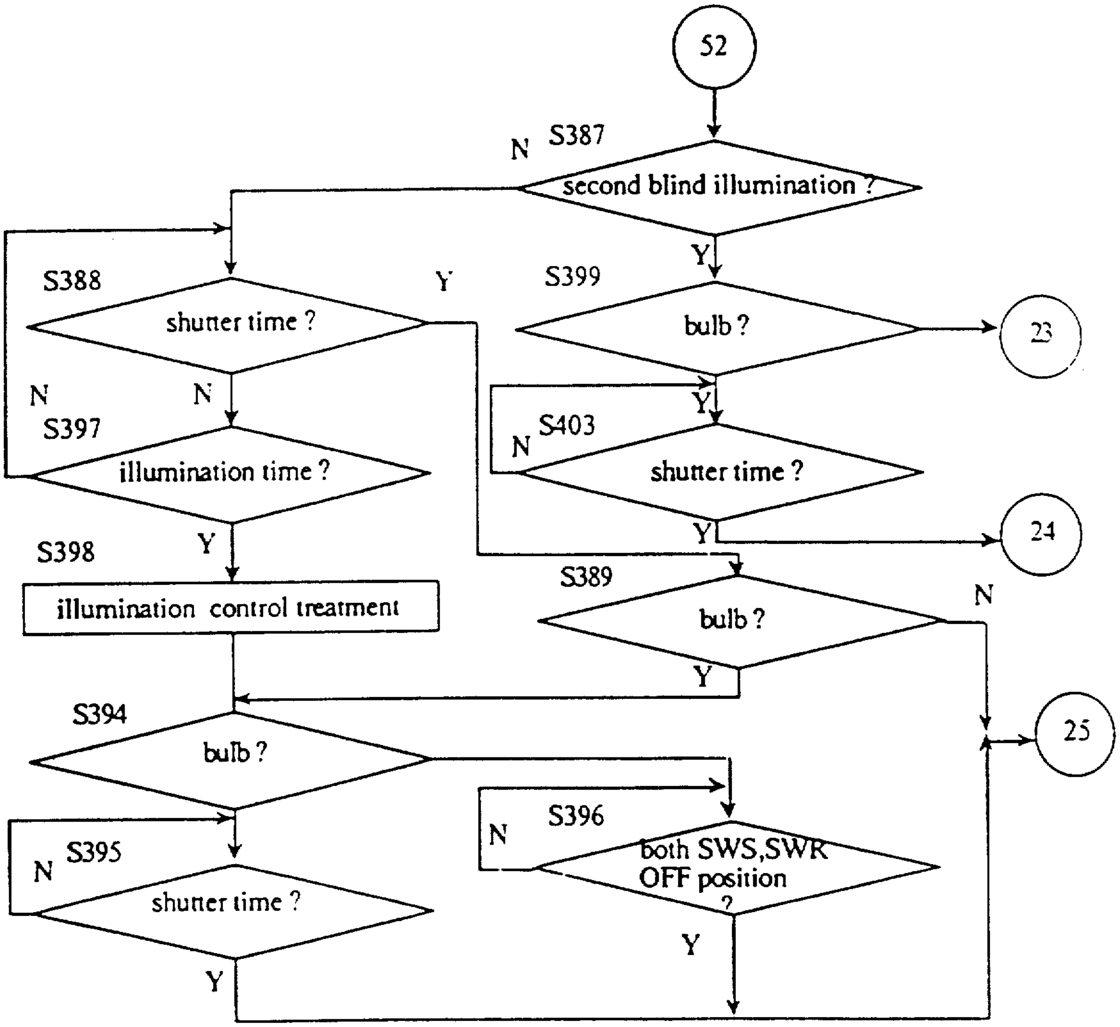
Figure 29C:
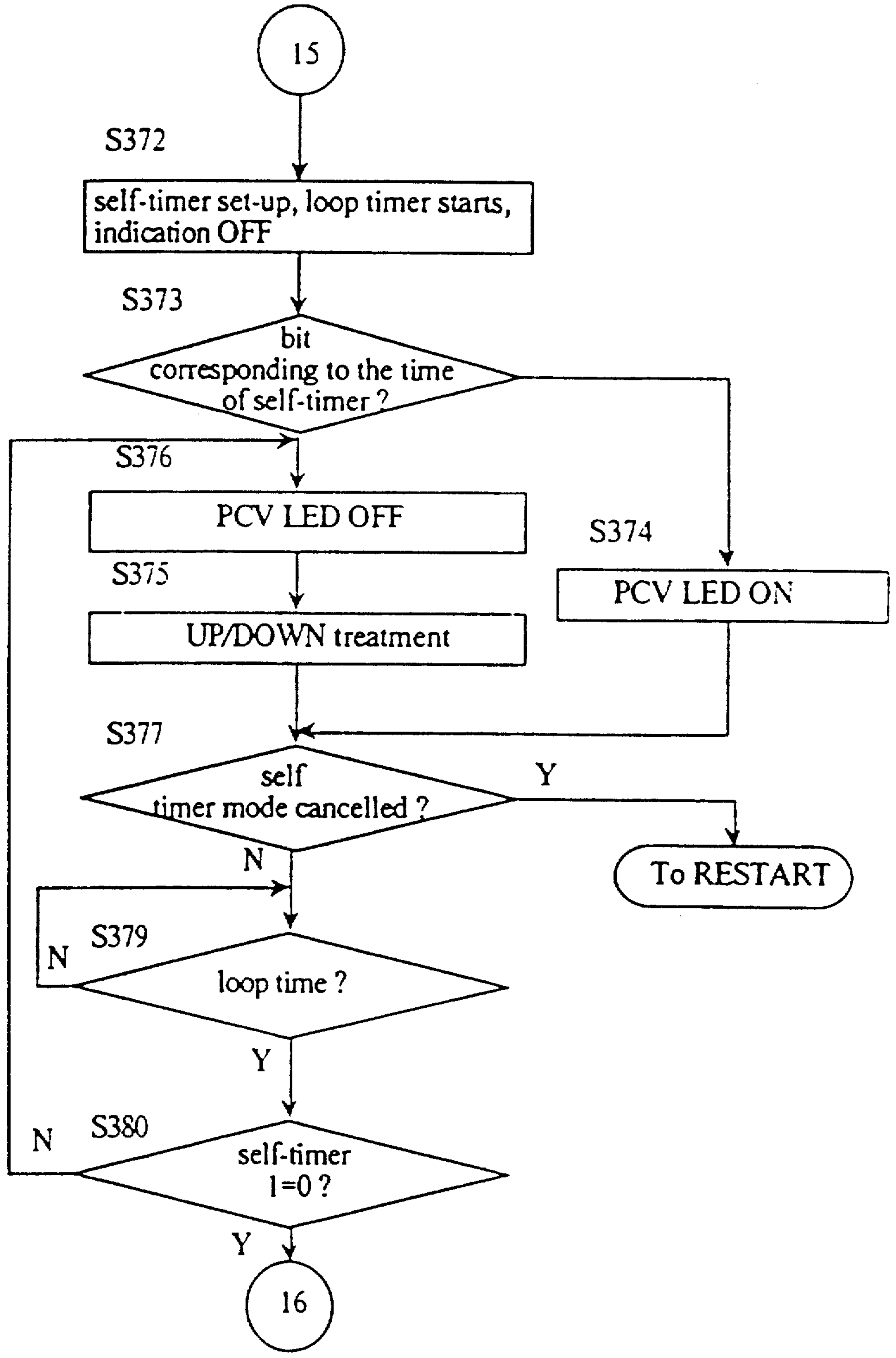
Figure 29D:
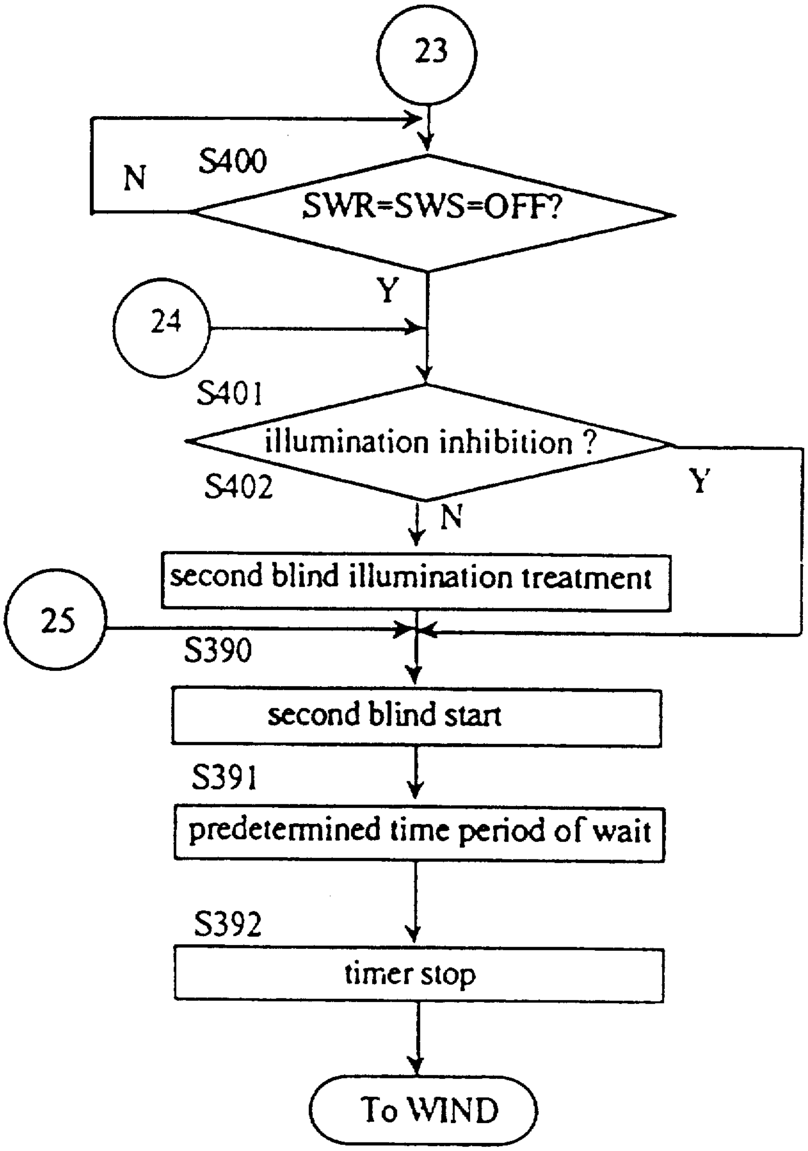

The operation of the body CPU 1 will be explained hereinbelow with reference to the main flow chart of FIG. 28.

In step S105, a sub-routine of "SPOT-COM"(spot meter communication treatment)" (shown in FIG. 31) is performed. "Predetermined time wait treatment" and "flash kind communication treatment" routines shown in FIGS. 32–34, which will be explained later, are performed in step S106 and step S107, respectively. In step S108, a "lens information input treatment" routine is performed, and then the process will proceed to step S109. In this regard, detail of the "lens information input treatment" is omitted from this embodiment. An "AE treatment" routine (as shown in FIG. 35), an "UP/DOWN treatment" routine (as shown in FIG. 36), and an LCD indication, relative to LCD display 27 of the camera 21 and the LCD display 56 of the spot meter 51, are performed in steps S109–S111.

In step S112, the "AF treatment" routine is conducted. In step S113, judgement is made as to whether a predetermined time period of the main loop has passed. If the predetermined time has not yet passed, the process returns to step S112. Otherwise, the process proceeds to step S114.

In step S114, judgement is made as to whether a release command is given by the spot meter 51. If a release command is given, a "release interruption treatment" routine is called to perform release treatment. If a release command is not given, the process will proceed to step S116.

In step S116, judgement is made as to whether data communication is given by the spot meter 51. If data communication is given, the process proceeds to step S117 to reset the "power hold timer". If no data communication is given, the process proceeds to step S118.

In step S118, judgement is made as to whether switches and keys of the camera 21, are all in an OFF condition. If any one of the switches, or the like, is not in the OFF condition, the process will proceed to step S117 to reset the "power hold timer". If all of the switches, and the like, are in the OFF condition, the process will proceed to step S119.

In step S119, judgement is made as to whether a "power hold timer" to be counted down is at "0". If it is not at "0", the process returns. If the "power hold timer" is at "0", a "POWER OFF treatment", which is not explained in the present embodiment, is performed.

Flow charts pertaining to "release interruption" will be explained hereinbelow with reference to FIGS. 29A through 29D.

In step S370, system initialization prior to release of the stack is performed.

In step S371, judgement is made as to whether a self-timer mode is set. If the self-timer mode has been set, the process will proceed to step S372; otherwise, it will proceed to step S381.

Then, "AE treatment" prior to release, "release MG powering treatment", and "mirror and EE pulse control treatment", are performed, together with a "communication of flash illumination mode", in steps S381–S384.

Further, "first blind start treatment", shutter speed count start treatment, illumination COM communication treatment and illumination timer start treatment are performed in steps S385–S386.

In step S387, judgement is made as to whether a "second blind illumination mode" is selected. If the "second blind illumination mode" is not selected, the process will proceed to step S388. Otherwise it proceeds to step S399.

In step S399, judgement is made as to whether a "bulb photography mode" is selected. If a "bulb photography mode" is selected, the process will proceed to step S400. Otherwise it will proceed to step S403.

In step S403, a counter for shutter speed is detected to wait until a time period for controlling the second blind has passed. After that, the process will proceed to step S401.

In step S388, judgement is made concerning the counter for shutter speed, which started simultaneously with starting of the first blind. The judgement is made to determine if a time period, corresponding to the shutter speed to be controlled, has passed. If the above time period has passed, the process will proceed to step S389; otherwise it proceeds to S397.

In step S397, judgement is made concerning the counter of illuminance timer in order to determine if running of the first blind has been completed and thus if illumination of the flash is available. If running of the first blind has been completed, the process will proceed to step S398; otherwise, the process will return to step S388.

In step S398, a flow of "illumination control treatment" is performed. Further, in step S394, judgement is made as to whether a "bulb photograph mode" is selected. If a "bulb photography mode" is selected, the process will proceed to S396, rather than step S395.

In step S395, judgement is made as to whether a predetermined "shutter time" has passed. If the "shutter time" has not passed, step S395 will be repeated, otherwise the process will proceed to the above step S390.

In the above step S389, judgement is made as to whether "bulb photography mode" is selected. If "bulb photography mode" is selected, the process will proceed to step S394, otherwise to step S390.

In the above step S396, judgement is made as to whether the photometric switch and release switch both are in the OFF position. If neither is in the OFF position, step S396 will be repeated; otherwise the process will proceed to step S390.

In step S372, setting of a self-timer and starting of a loop-timer are conducted, while the indication is turned OFF.

In step S373, a determination is made as to the value of a bit corresponding to the time of the self-timer. If the bit is "1", the process will proceed to step S374 to turn the PCV sound and LED ON. Then, the process will proceed to step S375. If the bit is "0", the process will proceed to step S376 to turn the PCV sound and LED OFF.

In step S375, an "up/down treatment" is performed, and then judgement is made as to whether a "self-timer mode" is cancelled. If the "self-timer mode" is cancelled, the process will jump to the treatment beginning with the "RESTART" label. Otherwise the process will proceed to step S379.

In step S379, a wait is made for a predetermined time period based on the judgement of loop time. If the predetermined time period has not passed, the step S379 will be repeated. Upon passage of the predetermined time period, the process will proceed to step S380.

In step S380, a count-down treatment is made to the self-timer. If the result of the count-down treatment is not "0", the process will return to step S376. Once "0" is obtained as a result of the count-down treatment, the count-down treatment is complete, and then the process will proceed to step S381.

In step S400, judgement is made as to whether the release switch and photometric switch both are in the OFF position. If neither switch is in the OFF position, step S400 will be repeated. If both switches are in the OFF position, the process will proceed to step S401. Then, judgement is made as to whether an "illumination inhibition" signal is given. If such signal is given, the process will proceed to step S390. Otherwise it will proceed to step S402 to perform a "second blind illumination treatment (processing from TTL label)".

After performing the "second blind start treatment", a predetermined waiting time period is made. Then, a "winding treatment", which is not explained in this application, is performed. Thereafter, the process jumps to the "RESTART" label.

Figure 30A:
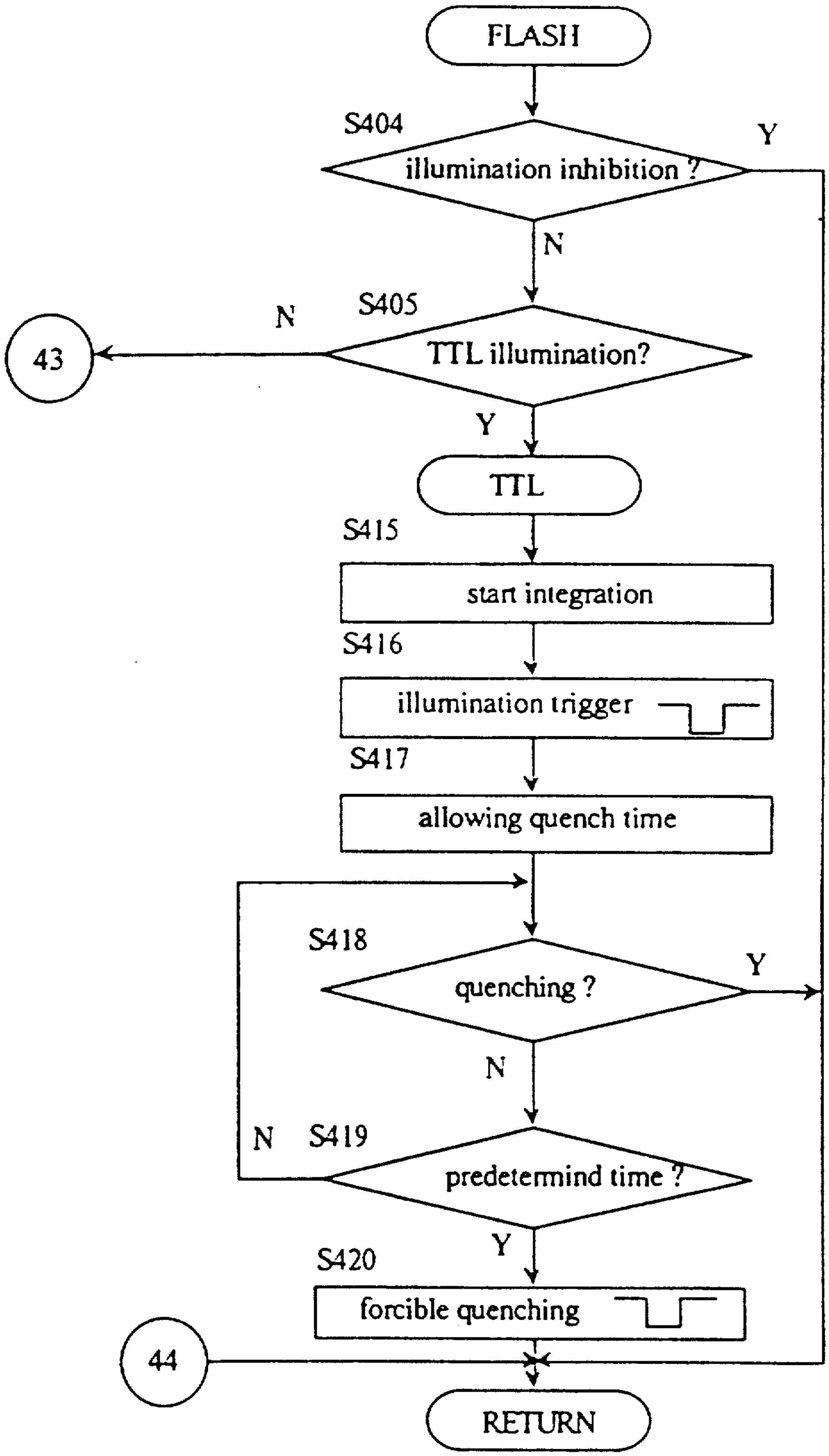
FIGS. 30A and 30B each illustrates a flow chart regarding operation of a "flash" label.
Figure 30B:
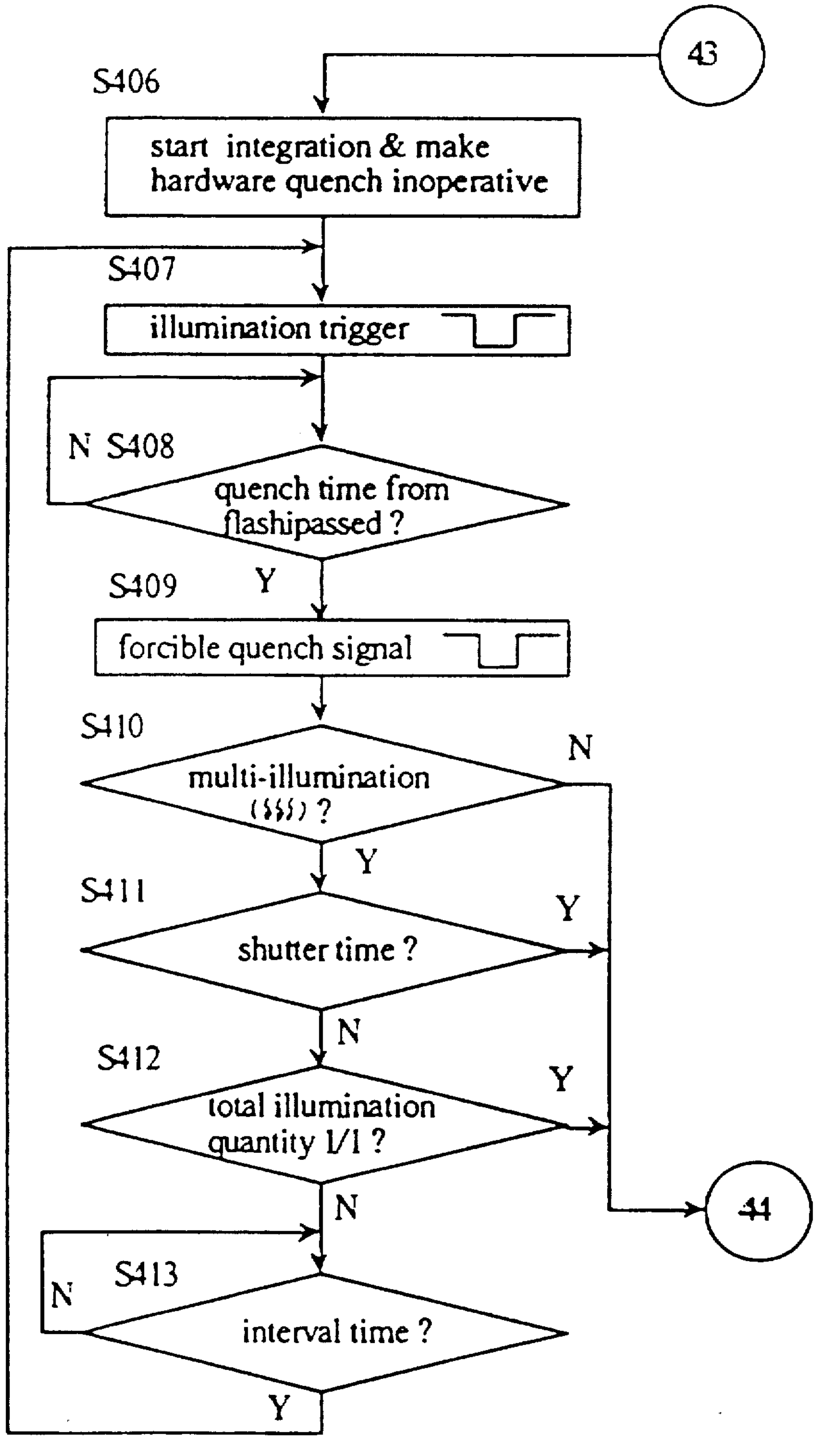

The "illumination control treatment" will be explained hereinbelow with reference to the flow chart of FIG. 30A.

In step S404, it is determined if a flash illumination inhibiting signal is given, which may be due to a flash charge signal, angle of view of lens, vignetting of lens or the like. If such signal is given, the process will return; otherwise the process will proceed to step S405.

In step S405, it is determined if a "TTL illumination" or "manual illumination" is selected. If the "TTL illumination" is selected, the process will proceed to the treatment beginning with the "TTL" label. If a "manual illumination" is selected, the process will proceed to step S406.

In step S406, treatment for starting integration of the illuminance of an object for photography input through the lens is performed so as to restrict "hardware quenching". That is to say, with reference to FIG. 1, the control line from the illuminance detection block 10 to the communication line L is made inoperative.

In step S407, an "illumination trigger signal output treatment" is performed. Further, in step S408, a "passage of quenching time" is judged. If the quenching time has not passed, the step S408 will be repeated. Alternatively, if the quenching time has passed, the process will proceed to step S409, to perform output treatment of a "forcible quenching signal".

In step S410, judgement is made as to whether a "multi-illuminance mode" is selected. If the "multi-illuminance mode" is selected, the process will proceed to step S411; otherwise it returns.

In step S411, the time of the shutter counter is judged. If a predetermined time has passed, the process returns; otherwise the process will proceed to step S412 so as to determine if the sum total of the illuminance is equal to the full illuminance. If a full illuminance is achieved, the process returns. Otherwise, the process proceeds to S413.

In step S413, judgement is made as to whether a time interval for illumination has passed. If the time interval has not passed, step S413 will be repeated so as to wait until the time interval has passed, and then the process will proceed to step S407.

The treatment from "TTL" label is such that "integration start treatment" and "illumination trigger signal output treatment" are performed in steps S415 and S416, respectively, and then the process will proceed to step S417.

Further, the process performs "setting treatment for allowing illumination quenching". Judgement is made as to whether a quenching signal is given. If a quenching signal is given, the process returns; otherwise it proceeds to step S419.

In step S419, judgement is made as to whether a predetermined time period has passed. If a predetermined time period has passed, the process proceeds to step S420 so as to perform "forcible quenching treatment;" and thereafter it returns. Otherwise, the process will return to step S418.

Figure 31:
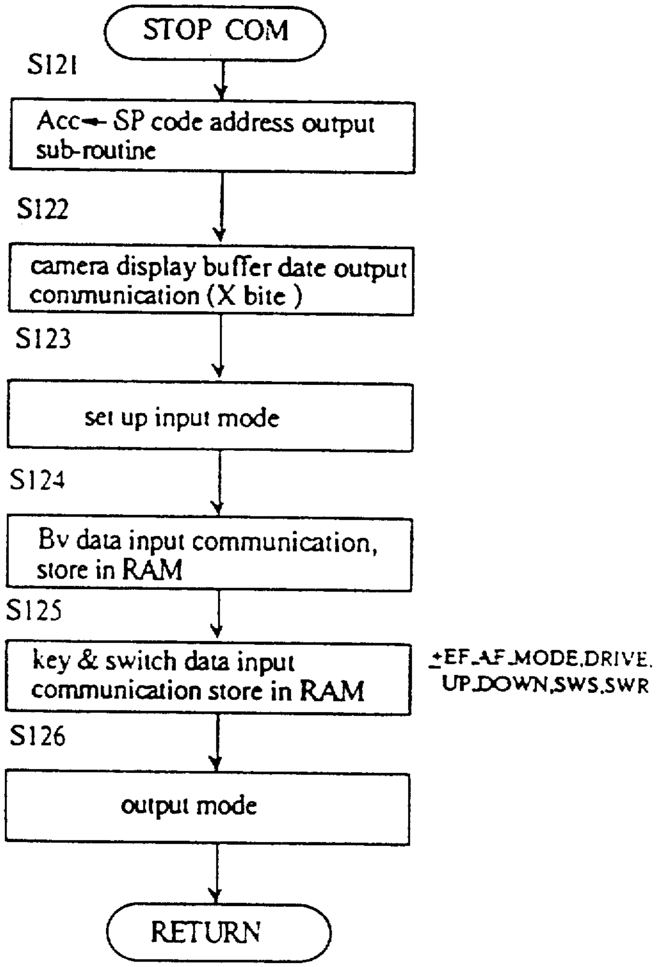
FIG. 31 illustrates a flow chart regarding operation of a "spot COM" label.

A sub-routine, "spot meter communication," in the above step S105 will be explained hereinbelow with reference to a flow chart of FIG. 31.

In step S121, a code is set up to the accumulator for communication with the spot meter, and then the address output sub-routine having been explained is called.

In step S122, treatment of outputting the data in the display buffer at the camera side 21 is performed, whereby indication is made on the LCD display 56 of the spot meter 51 shown in FIGS. 16A and 16B.

Further, the above output mode of the signal transmission means is changed over to the input mode. Furthermore, processing of input Bv data received by the light acceptance element of the spot meter 51 is performed. These data are stored in the RAM of the body CPU 1 as input information (steps S123-S124).

Then, processing of input communication data regarding the ±EF switch 60, AF switch 61, mode switch 62, drive switch 63, release switch 64, up-switch 66, down-switch 67, etc. mounted on the spot meter 51 is performed so as to store the data in the RAM of the body CPU 1. Further, the mode of communication is again returned to the output mode, and then the process will be returned to the main flow (steps S125-S126).

Figure 32A:
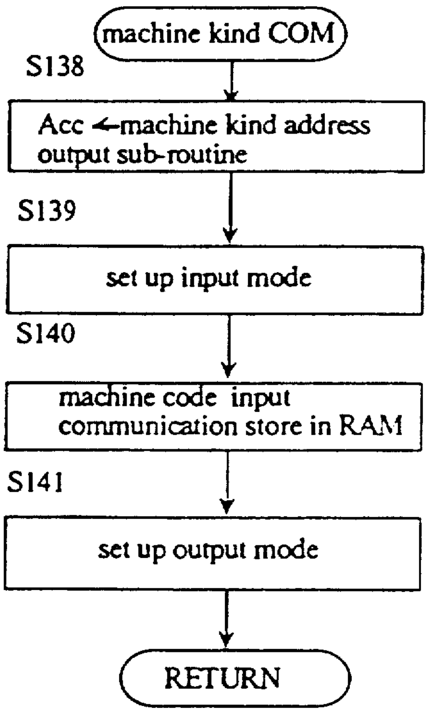
FIG. 32A illustrates a flow chart regarding operation of a "machine kind COM"

A sub-routine for "kind of flash transmission" of the above step S107 will be explained hereinbelow with reference to a flow chart of FIG. 32A.

First, in step S138, data regarding "kind of flash" are set in the accumulator and a subroutine for "address signal output" is performed.

Then, setting of "input mode" is performed, and data regarding "kind of flash code" is stored into the RAM of the body CPU 1 by means of data communication. Further, setting of an "output mode" is performed and the process returns (steps S139-S141).

Figure 35A:
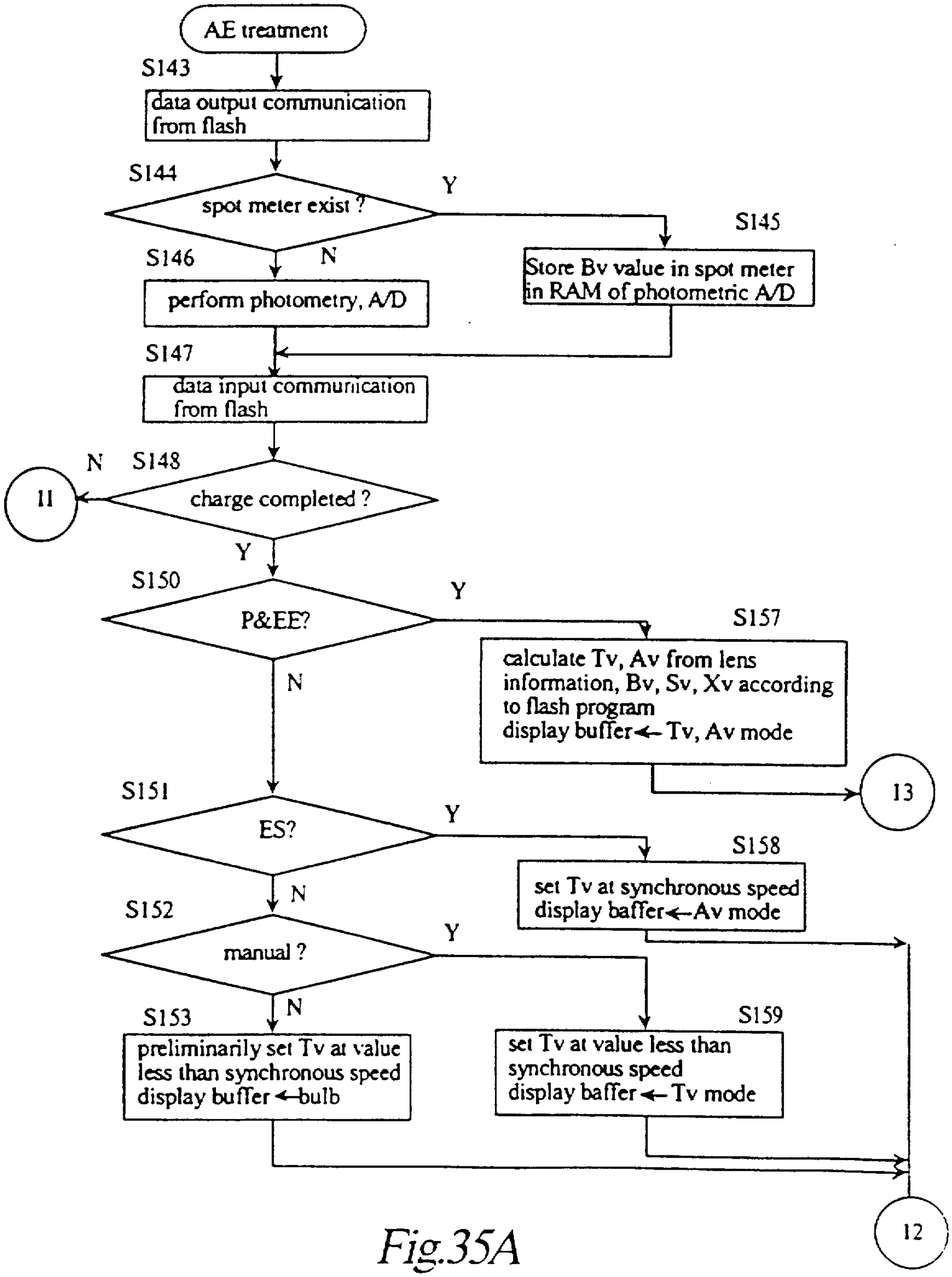
FIGS. 35A through 35C each illustrate a flow chart regarding operation of an "AE treatment" label.
Figure 35B:
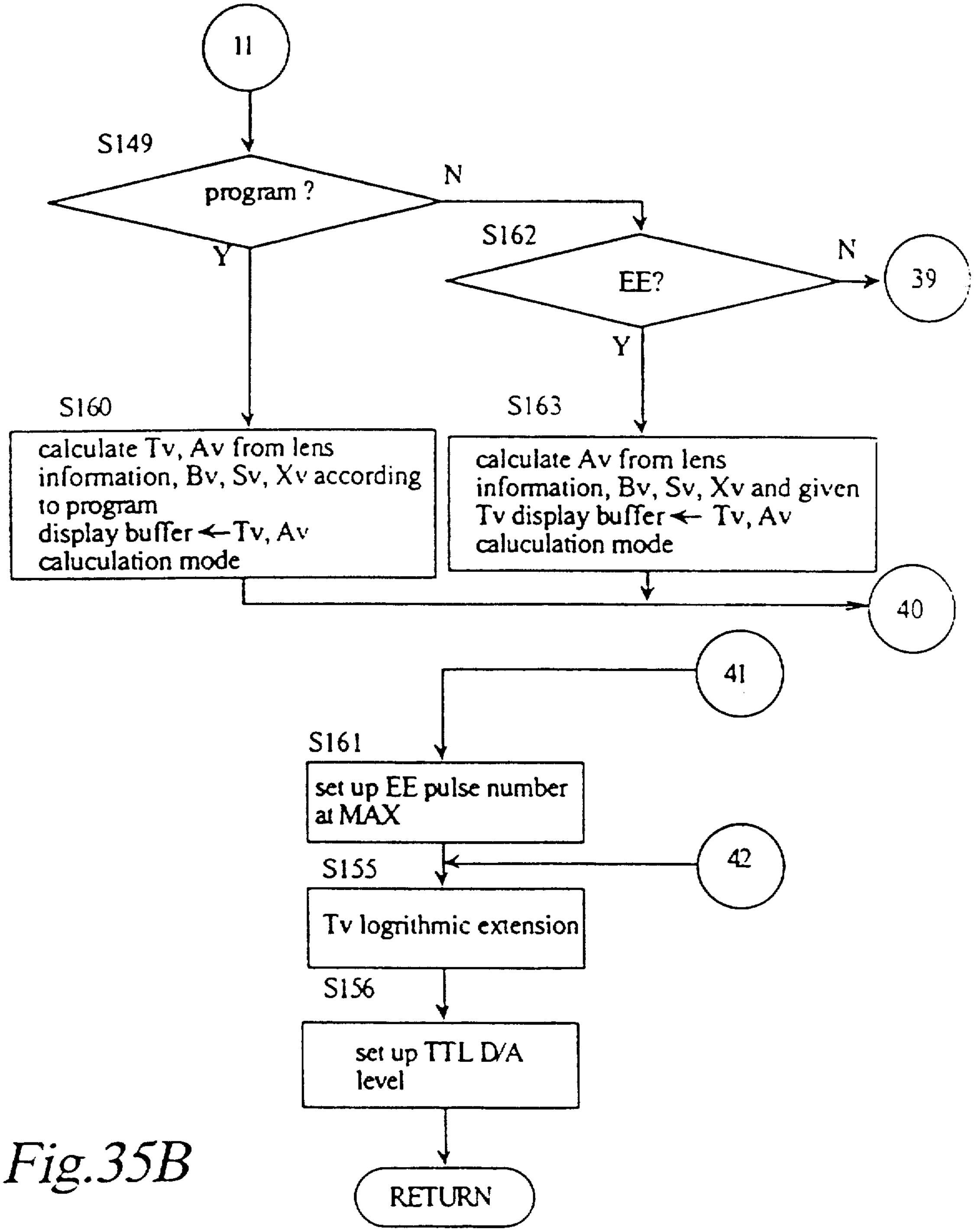
Figure 35C:
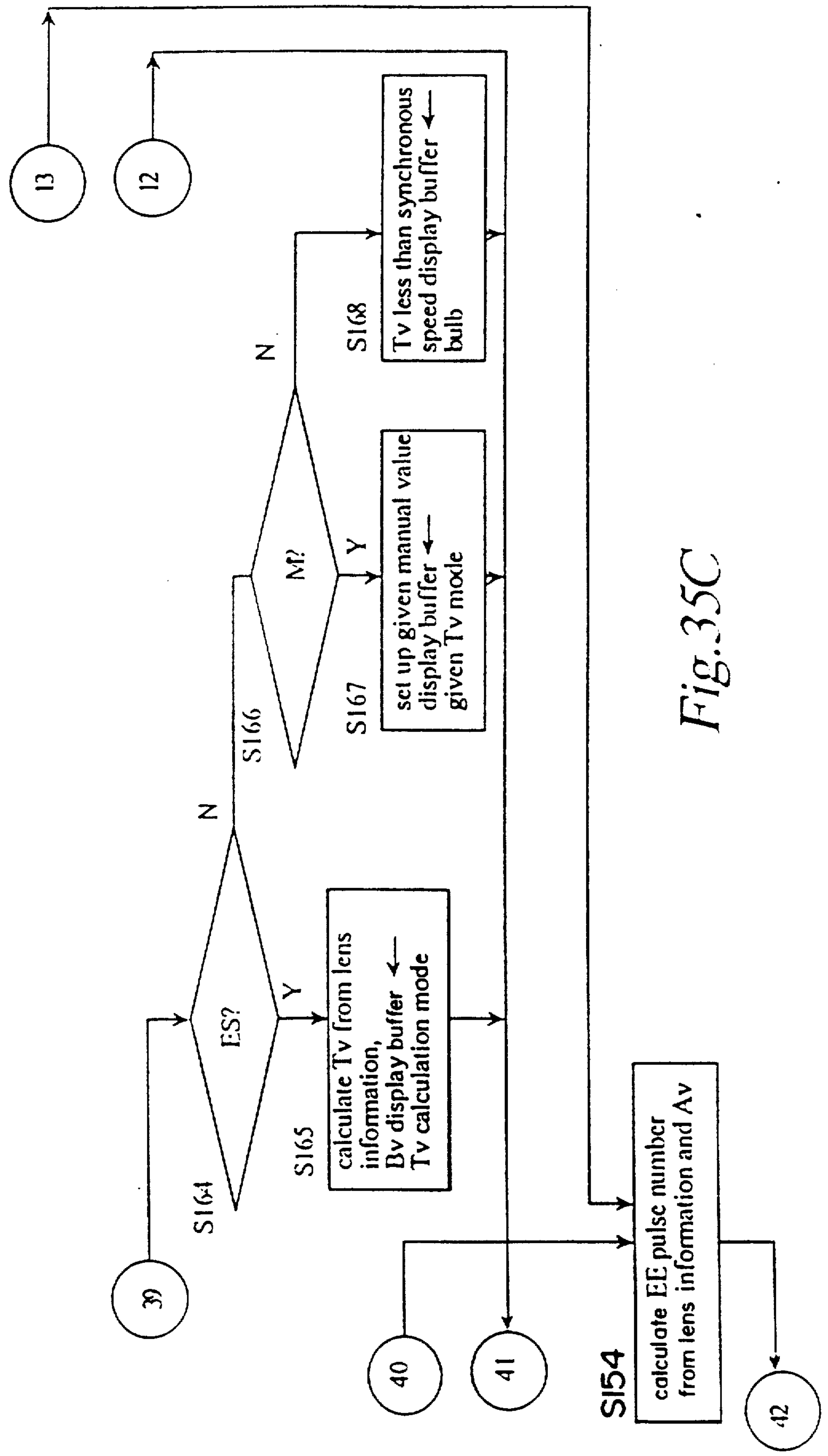

A sub-routine for "AE treatment" in the above step S109 will be explained hereinbelow with reference to flow charts of FIGS. 35A through 35C.

In step S143, various data are output by means of communication to the flash CPU 12 or 18 from the body CPU 1.

In step S144, judgement is made as to whether any data signal from the spot meter 51 is given. If any, the process proceeds to step S145 to store the Bv value of the spot meter 51 in the RAM for illumination A/D; and then the process proceeds to step S147. If, in step S144, no data signal is detected, the process proceeds to step S146 so as to perform A/D conversion of the illuminance output, together with storing the converted A/D value in the RAM for the illuminance A/D; and then proceeds to step S147.

In step S147, "flash data" is transmitted to the body CPU 1 from flash CPU 12 or 18; and then the process proceeds to step S148.

In step S148, judgement is made as to whether charge of the flash device 52 has been completed. if charge of the flash device has not yet been completed, the process proceeds to step S149, or otherwise to step S150.

In step 150, judgement is made as to whether the mode is selected to "program mode" and "EE mode". If neither mode is selected, the process proceeds to step S151, and then determines if "ES mode" is selected. if "program mode" and "EE mode" both are selected, the process proceeds to step S157 so as to calculate "Tv value" and "Av value" in accordance with the flash program utilizing "lens information", "Bv value", "Sv value" and "Xv value". Further, at step S157, the indication data of Tv and Av are set in the display buffer. Then the process performs output of the indication data to the LCD display, thereafter proceeding to step S154.

In step S151, if "ES mode" is not selected, the process proceeds to step S152 so as to determine if "manual mode" is selected. If it is judged that "ES mode" is selected, the process proceeds to step S158 so as to set Tv (TIME VALUE) at a synchronized speed and so as to set Tv and indication data of the mode in the display buffer for outputting thereof to the LCD display. Then, the process proceeds to step S161.

In step S152, if it is judged that "manual mode" is not selected, the process proceeds to step S153 so as to preliminarily set Tv at the value less than the synchronized speed, while setting indication data in the display buffer so as to indicate "bulb" on the LCD display. Then the process proceeds to step S161. In this connection, if, in the step S152, it is determined that "manual mode" is selected, the process proceeds to step S159 so as to set Tv at a value less than the synchronized speed in accordance with the Tv value which is manually set. Then indication data of Tv and the mode are set in the display buffer. The process proceeds to step S161 after performing output of the indication data to the LCD display so as to set "EE pulse number" at a maximum value. Then the process proceeds to step S155.

In the above step S149, if it is determined that "program mode" is selected, the process proceeds to step S160 to calculate "Tv value" and "Xv" value" (in accordance with the program utilizing "lens information"), "Bv value", "Sv value" and "Xv value" and also to set the calculated data of "Tv value" and "Av value" in the display buffer. The process proceeds to step S154 after outputting the data to the LCD display so as to calculate the pulse number of "EE" utilizing "lens information" and "Av (APERTURE VALUE)," and then the process proceeds to step S155.

In steps S155-S156, "Tv logarithmic extension" is calculated and "level set for TTL D/A" is performed utilizing "film information" and "film exposure compensation value". Then the process returns.

In the above step S149, if it is judged that "program mode" is not selected, the process proceeds to step S16 where judgment is made as to whether "EE mode" is selected. If "EE mode" is selected, the process proceeds to step S163; otherwise if proceeds to step S164.

In step S163, "Av value" is calculated utilizing "lens information", "Bv value", "Sv value", "Xv value" and "predetermined Tv value". Then data of "predetermined Tv value", "calculated Av value and mode" is set in the display buffer so as to output the data to the LCD display. Thereafter, the process proceeds to step S154.

In step S164, it is determined if "ES mode" is selected. If "ES mode", the process proceeds to step S165; otherwise it proceeds to step S166.

In step S165, "Tv value" is calculated utilizing "lens information", "Bv" and "Sv". Indication data of the calculated Tv and the Tv calculation mode are set in the display buffer for outputting the same to the LCD display. Then the process proceed to step S161.

In the parallel alternate step S166, judgement is made as to whether "manual mode" is selected. If "manual mode", the process proceeds to S167; otherwise it proceeds to step S168.

On step S167, "predetermined manual value" is set up and indication data of the Tv and mode is set up in the display buffer for indication thereof on the LCD display. Then the process proceeds to step S161.

In the above-mentioned step S168, "Tv value" is set up at a value less than the synchronized speed, and bulb indication data are set up in the display buffer. Then the process proceeds to step S161.

Figure 33:
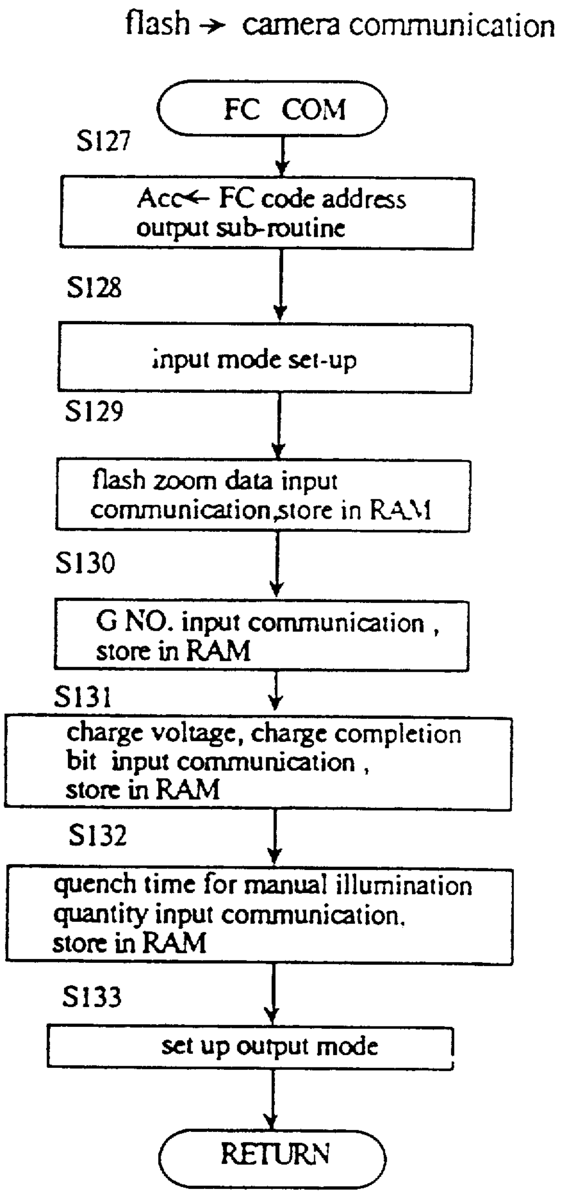
FIG. 33 illustrates a flow chart regarding operation when communication from the flash side to camera side is performed.

With regard to the flash data input communication of the above step S147, operation of data transmission from the flash CPU 12 or 18 to the body CPU 1 will be explained hereinbelow with reference to FIG. 33.

First, and FC (flash camera) code is set up in the accumulator so as to perform an address sub-routine. Further, setting of "input mode" and input transmission a flash zoom (zoom of illumination portion 70) are performed, and then the data are stored in the RAM of the body CPU 1 (steps S127-S129).

Input transmission of "G number" is performed so as to store the same in the RAM of the body CPU 1. Further, "charge voltage" and "charge completion bit" are input to the RAM of the body CPU 1 for storing therein (steps S130-S131).

Input transmission of the data regarding "quench time for manual illumination" is performed so as to store these data in the RAM of the body CPU 1. Further, a routine for "setting up for output mode" is performed (steps S132-S133), and then the process returns.

Figure 34:
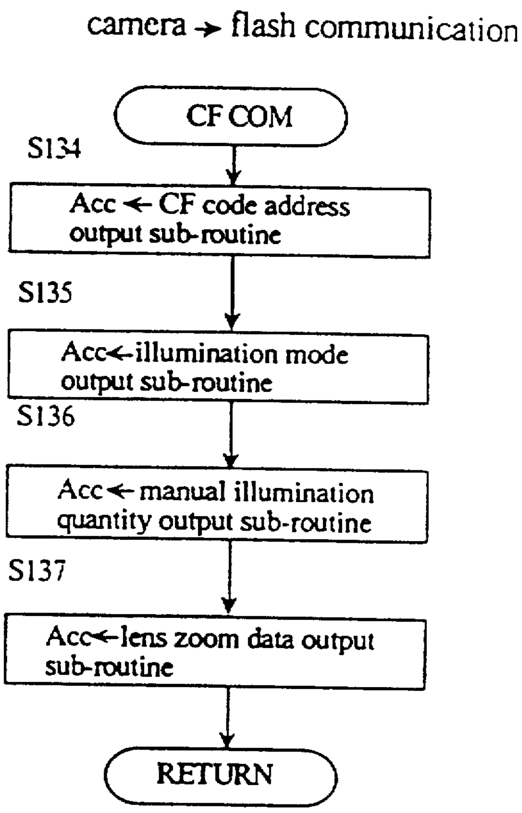
FIG. 34 illustrates a flow chart regarding operation when communication film camera side to flash side is performed.

The flash data output communication of the above step S143 will be explained hereinbelow with reference to FIG. 34, with respect to a case, for example, in which data transmission is achieved to the flash CPU 18 from the body CPU 1.

First, "CF (camera flash) code" is set up to the accumulator and "address signal output" routine is performed. Further, data regarding "illumination mode" are set up to the accumulator and "output sub-routine" is performed (steps S134-S135).

Data regarding "manual illumination" are set up to the accumulator and an output sub-routine is performed. Further, "lens zoom data" are set up to the accumulator and "output sub-routine" is performed (steps S136-S137). Then the process returns.

Figure 32B:
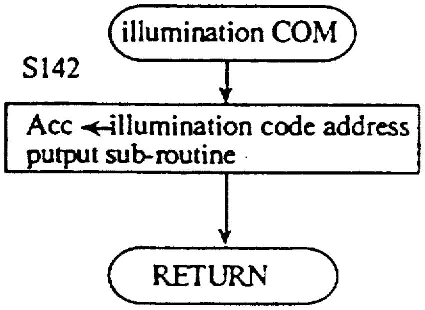
FIG. 32B illustrates a flow chart regarding operation of an "illumination COM"

The transmission sub-routine for "illumination COM" for setting the flash device at the illumination mode will be explained with reference to a flow chart of FIG. 32B.

In step S142, an illumination code is set up to the accumulator so as to perform an address output sub-routine. Then the process returns to "release interruption" routine which was the original calling routine.

Figure 36A:
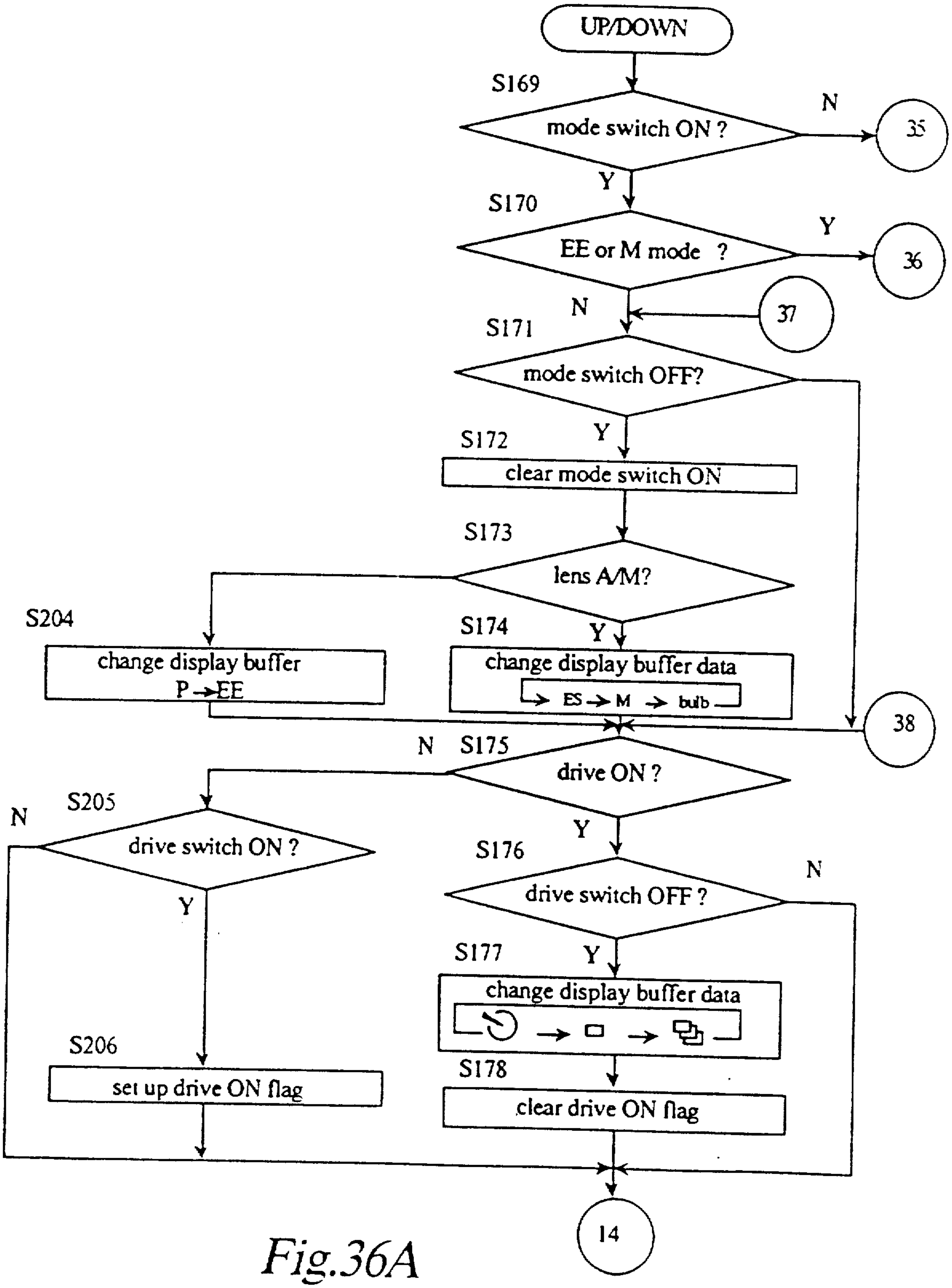
FIGS. 36A through 36C each illustrate a flow chart regarding operation when an UP/DOWN switch is operated.
Figure 36B:
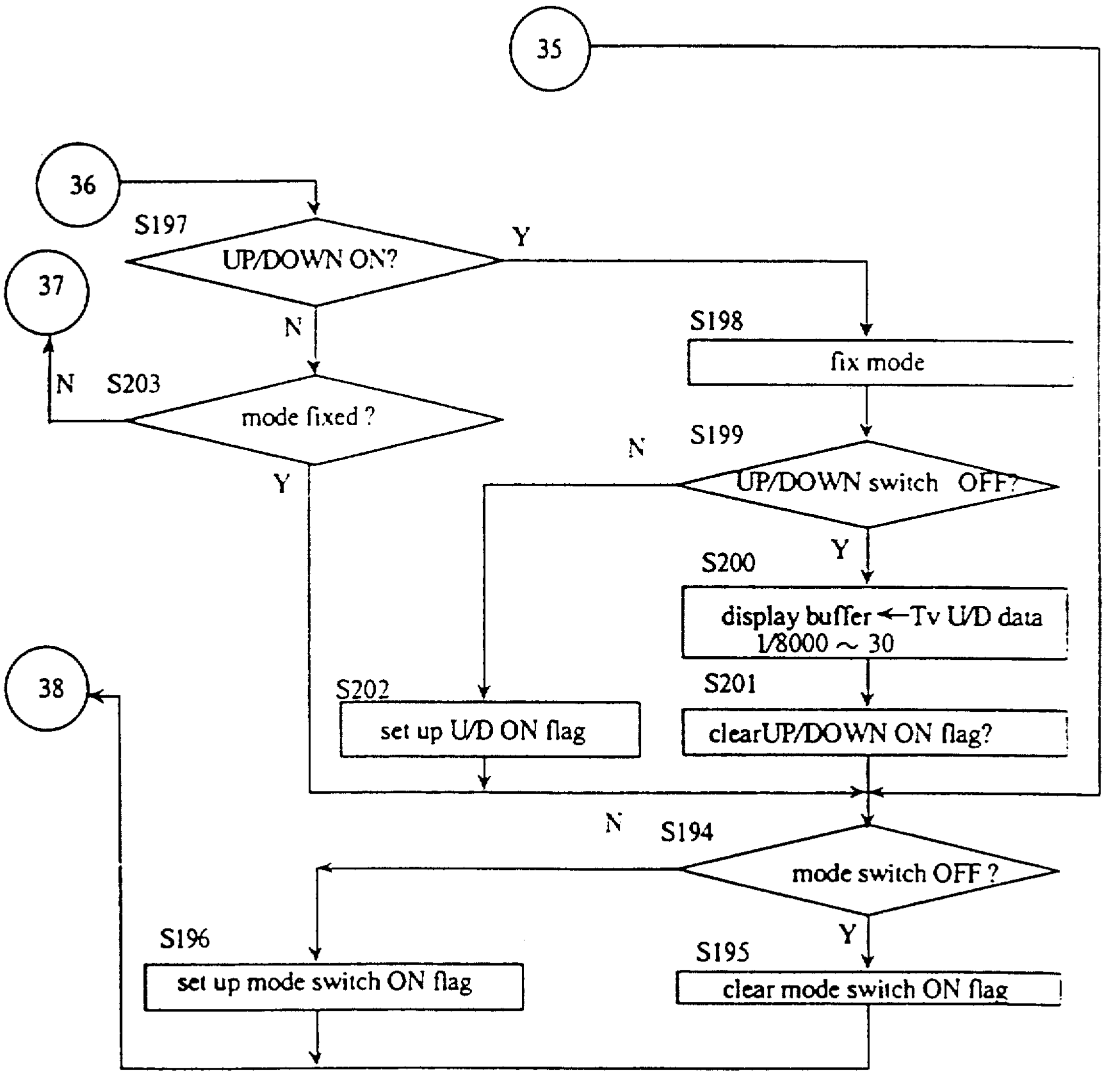
Figure 36C:
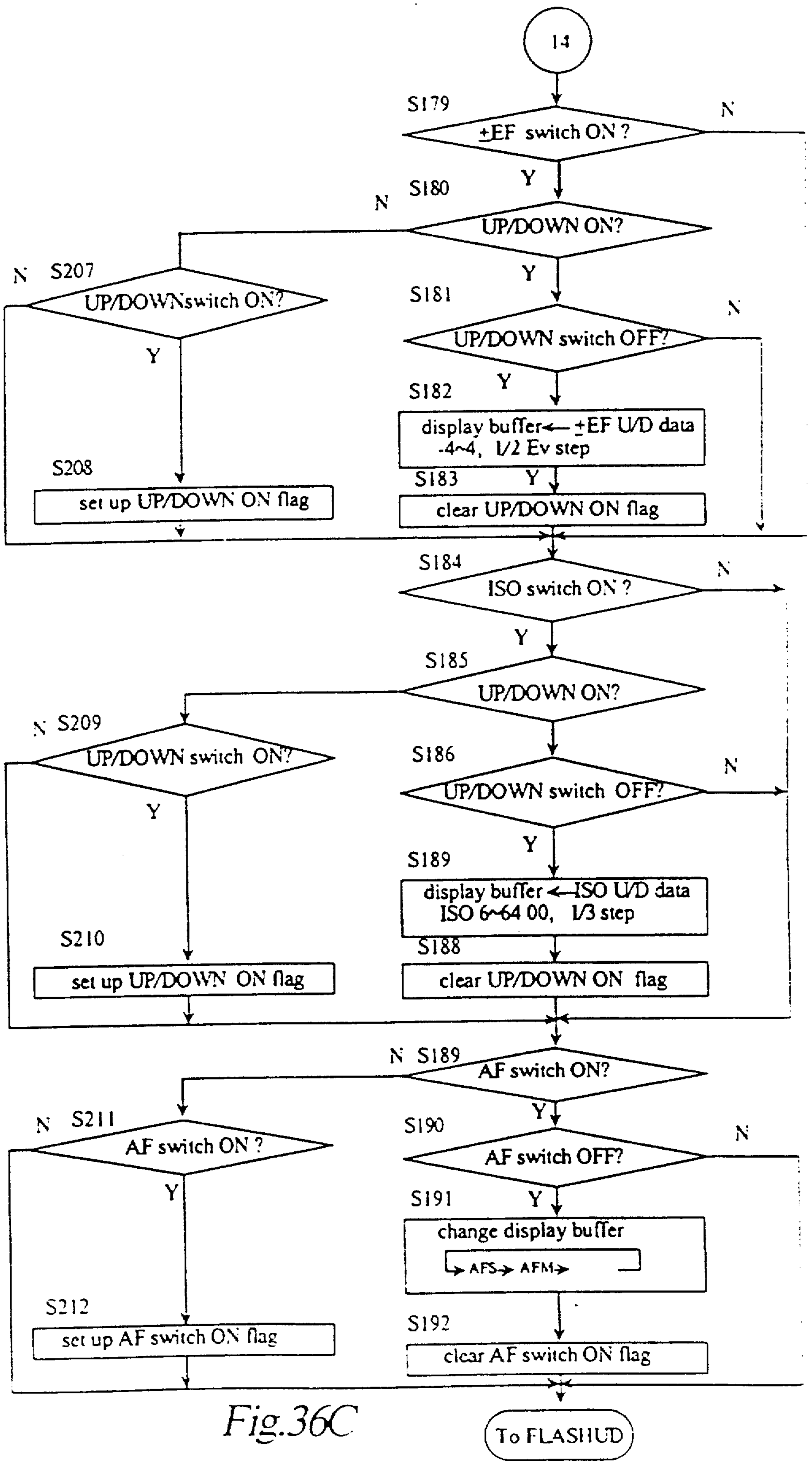

Operation of "UP/DOWN treatment" in step S110 of the main flow will be explained hereinbelow with reference to flow charts of FIGS. 36A through 36C.

First, judgement is made as to whether mode switch "ON" was previously detected. If "ON" was detected, the process proceeds to step S170; otherwise it proceeds to step S194.

In step S170, judgement is made as to whether "EE mode" or "manual mode" is selected. If neither mode is selected, the process proceeds to step S171. If either of the two modes is selected, the process proceeds to step S197.

In step S171, judgement is made as to whether the mode switch is in the OFF position. If in the OFF position, the process proceeds to step S172; otherwise it proceeds to step S175.

In step S172, "bit for indicating mode switch ON", which will be given when the mode switch is turned ON, is cleared, and then the process proceeds to step S173.

In step S173, judgement is made whether "auto" or "manual" mode is selected for the lens. If "manual" is selected, the process proceeds to step S174. If "auto" is selected, the process proceeds to step S204 so as to perform treatment of modifying the mode presently set up on the display buffer ("P" or "EE" in this embodiment). Then the process proceeds to step S175.

In step 174, since the fact that the mode switch was turned from OFF to ON has been detected in the above flow, the data in the display buffer is modified, i.e., "ES→M(manual) →bulb", in accordance with the one time detection. Then the process proceeds to step S175.

In step S175, judgement is made as to whether an ON signal of the drive switch has been detected. If an ON signal was previously detected, the process proceeds to step S176; otherwise it proceeds to step S205.

In step S176, judgement is made as to whether the drive switch once turned ON is turned OFF. If it is judged that the drive switch is turned OFF, the process proceeds to step S177 so as to modify the data of the display buffer to be indicated on the LCD display, and then the process proceeds to step S178. Further, "flag of drive ON", which is given when the drive switch is turned ON, is cleared. Then the process proceeds to step S179. If, in the step S176, it is determined that the drive switch is not turned OFF, the process proceeds to step S179.

In step S205, judgement is further made as to whether the drive switch is turned ON. If it is judged that the drive switch is turned ON, the process proceeds to step S206 so as to set up "flag of drive switch ON," and then the process proceeds to step S179. If it is judged in step S205 that the drive switch is not turned ON, the process proceeds to step S179.

In step S197, judgement is made as to whether an UP/DOWN switch ON signal is detected. If an ON signal was previously detected, the process proceeds to step S198; otherwise it proceeds to step S203.

In step S203, if "flag for mode fixing" is set up, this flag is reset, and the process proceeds to step S196 so as to set up "flag for mode switch ON." Then the process proceeds to step S175. If "flag for mode fixing" was not set up in the step S203, the process proceeds to step S171.

In step S198, "flag for mode fixing" is set up and the process proceeds to step S199.

In step S199, judgement is made as to whether the UP/DOWN switch is turned OFF. If it is turned OFF, the process proceeds to step S200; otherwise it proceeds to step S202 so as to set up "flag for UP/DOWN switch ON". Then the process proceeds to step S194.

In step S200, a treatment is performed of modifying the shutter speed data presently set up in the display buffer by counting up or down by "1Ev step" within the range of "1/8000-30". Then the process proceeds to step S201.

In step S201, "flag for UP/DOWN switch ON" is cleared, and the process proceeds to step S194.

In step S194, judgement is made as to whether the mode switch is turned OFF. If it is turned OFF, the process proceeds to step S195 so as to clear "flag for mode switch ON," and then it proceeds to step S175. If it is judged in step S194 that the mode switch is not turned OFF, the process proceeds to step S196 so as to set up "flag for mode switch ON," and then the process proceeds to S175.

In the above step S179, it is judged whether "±EF switch" is turned ON. If it is turned ON, the process proceeds to step S180; otherwise it proceeds to step S184.

In step S180, judgement is made as to whether an ON signal of the UP/DOWN switch has been detected. If an ON signal was previously detected, the process proceeds to step S181; otherwise it proceeds to step S207.

In step S181, judgement is made as to whether the UP/DOWN switch is turned OFF. If it is turned OFF, the process proceeds to step S182; otherwise it proceeds to step S184.

In step S182, exposure compensation data presently set up in the display buffer are modified by counting up or down by steps of ½ Ev within the range of "+4Ev to −4Ev". "Flag for UP/DOWN switch ON" is cleared and then the process proceeds to step S184.

In step S184, judgement is made as to whether the ISO switch is turned ON. If it is turned ON, the process proceeds to step S185; otherwise it proceeds to step S189.

In step S185, it is judged as to whether the UP/DOWN switch ON signal has been detected. If the ON signal was previously detected, the process proceeds to step S186; otherwise it proceeds to step S209.

In step S186, it is judged as to whether the UP/DOWN switch is turned OFF. If it is turned OFF, the process proceeds to step S187; otherwise it jumps to step S189.

In step S187, a treatment of modifying ISO sensitivity data presently set up in the display buffer, by counting up or by steps of ⅓Ev within the range of ISO 06-IDO 6400, is performed.

In step S188, "flag for UP/DOWN switch ON" is cleared, and then the process proceeds to step S189.

In step S189, judgement is made as to whether the "AF switch" ON signal has been detected. If the ON signal was previously detected, the process proceeds to step S190; otherwise it proceeds to step S211.

In step S191, a treatment of modifying the AF drive mode ("AFS" or "AFM" in the instant embodiment) presently set up in the display buffer is performed.

Figure 38A:
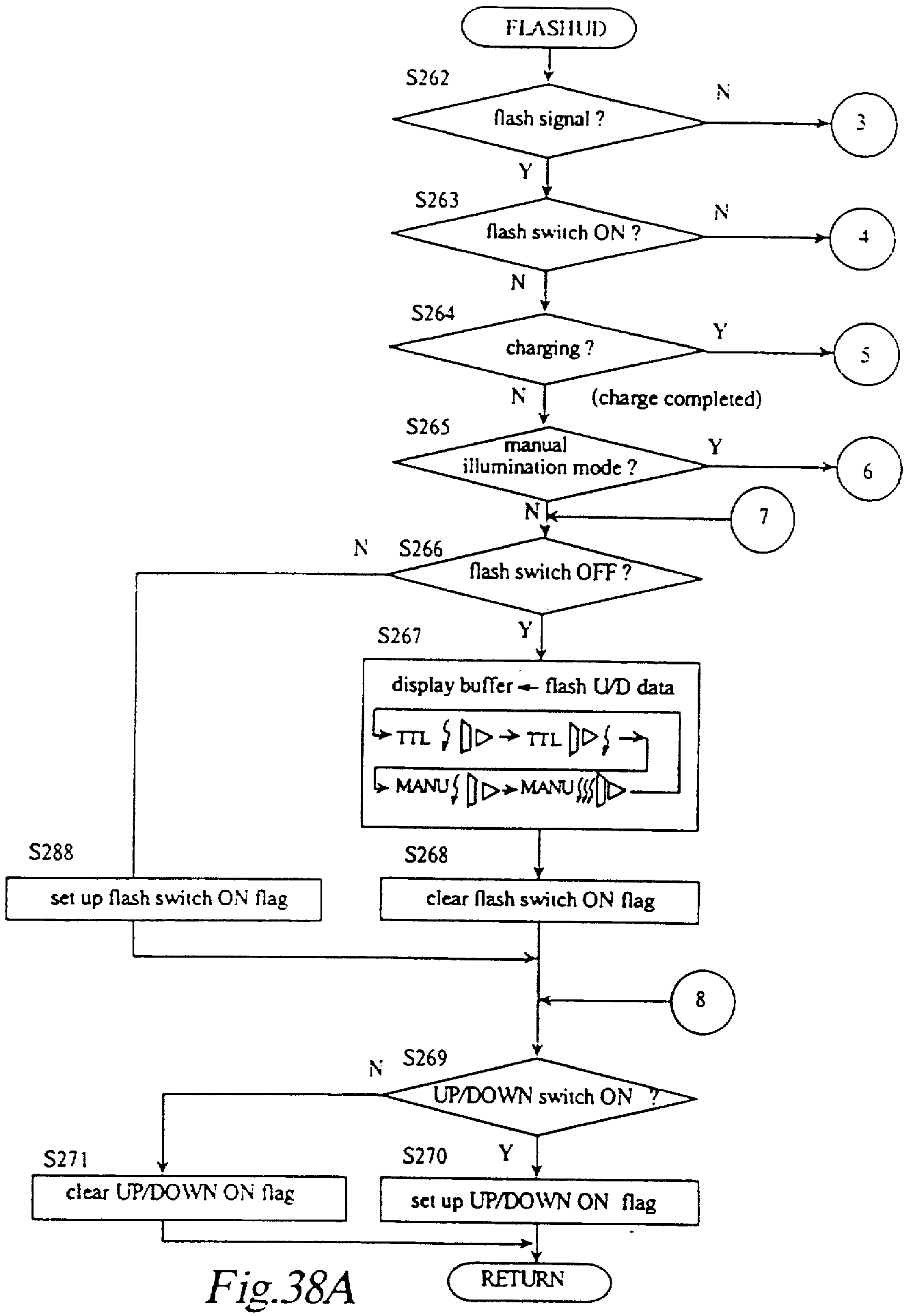
FIGS. 38A and 38B each illustrate a flow chart regarding operation of a "FLASH UD" label.

In step S192, "flag for AF switch ON" is cleared and the process proceeds to the "FLASH UD" label shown in FIG. 38A.

In step S207, judgement is made as to whether the UP/DOWN switch is turned ON. If the switch is turned ON, the process proceeds to step S208 so as to set up "flag for UP/DOWN switch ON," and then it proceeds to step S184. If UP/DOWN switch is not turned ON as determined in step S207, the process proceeds directly to step S184.

In step S209, judgement is made as to whether an UP/DOWN switch is turned ON. If it is turned ON, the process proceeds to step S210 so as to set up "flag for UP/DOWN switch ON". In step S209, if the UP/DOWN switch was not turned ON, the process proceeds to step S189.

In step S211, judgement is made as to whether an AF switch is turned ON. If it is turned ON, the process proceeds to step S212 so as to set up "flag for AF switch ON," and then a sub-routine beginning with "FLASH UD" label is performed. In step S211, if the AF switch was not turned ON, the process simply performs the routine beginning with "FLASH US" label.

Figure 37A:
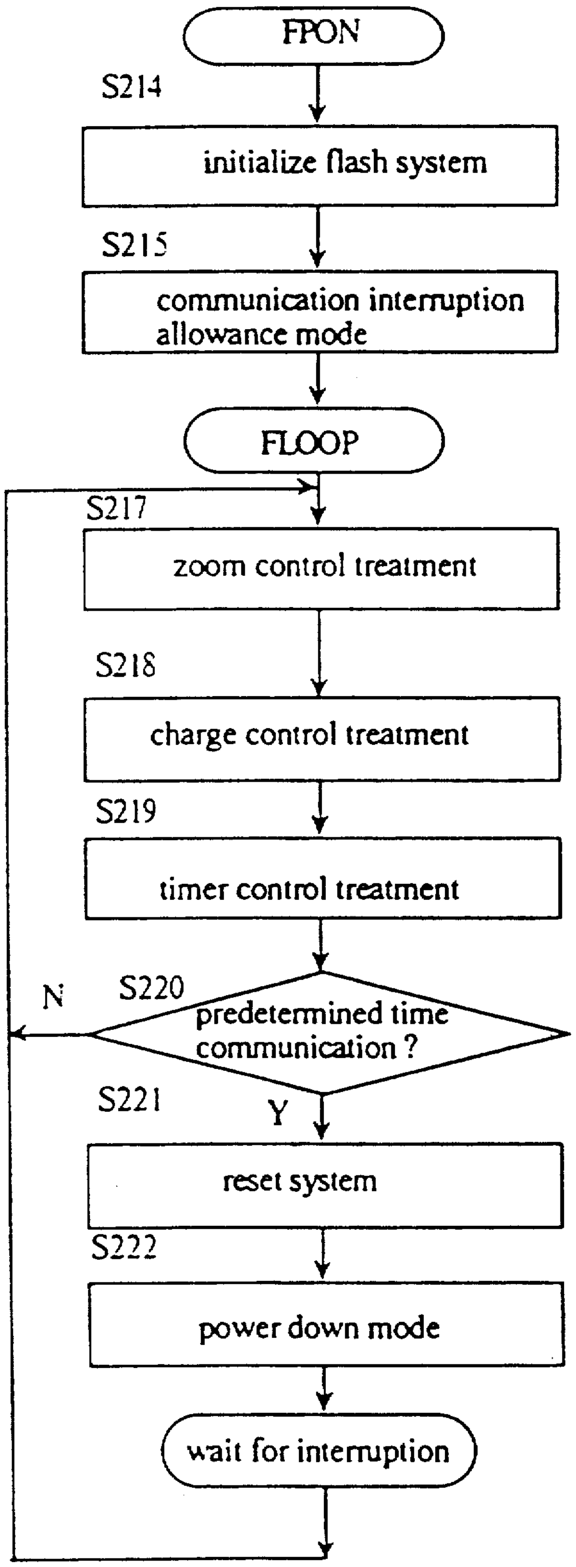
FIG. 37A illustrates a flow chart regarding a "flash power on" label.
Figure 37B:
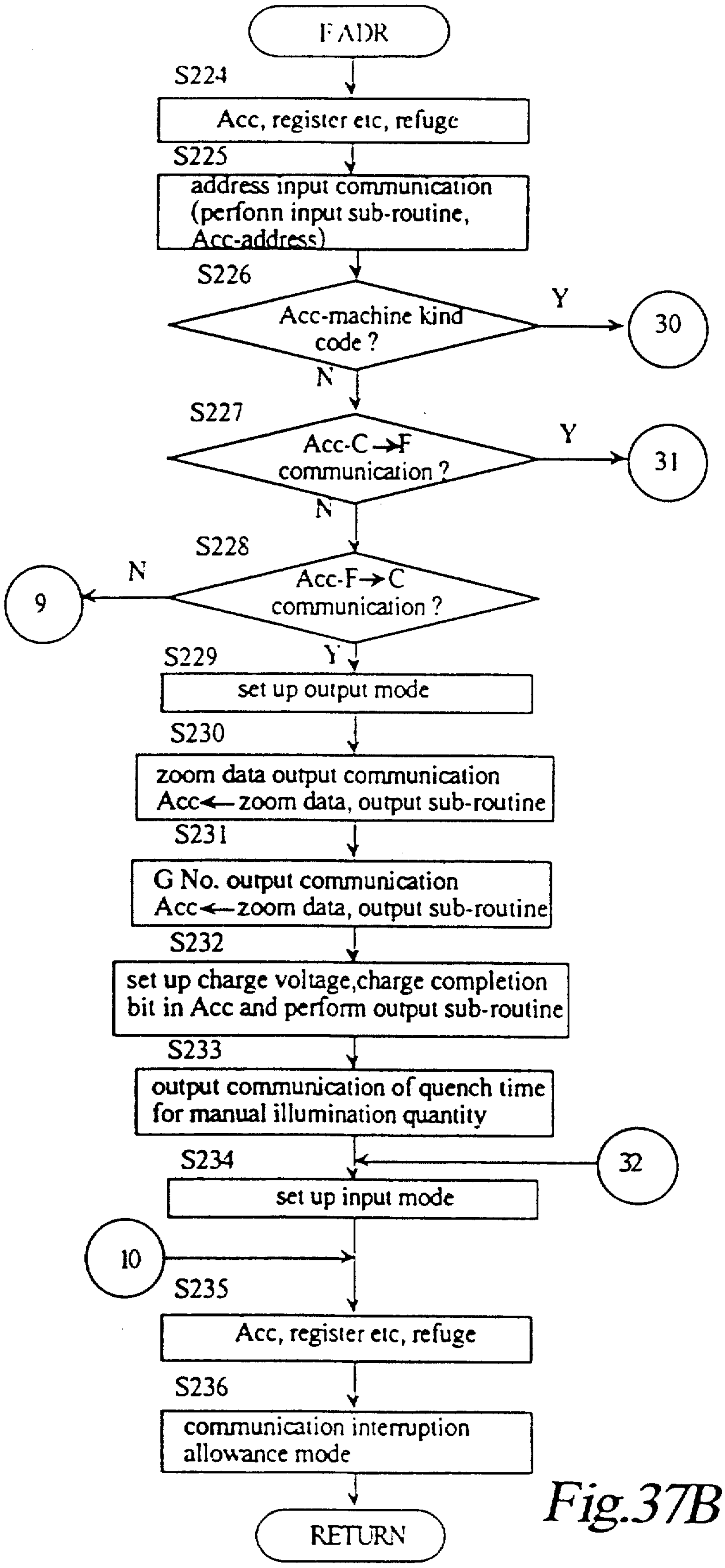
FIGS. 37B through 37E each illustrate a flow chart regarding operation of a "flash address" label.
Figure 37C:
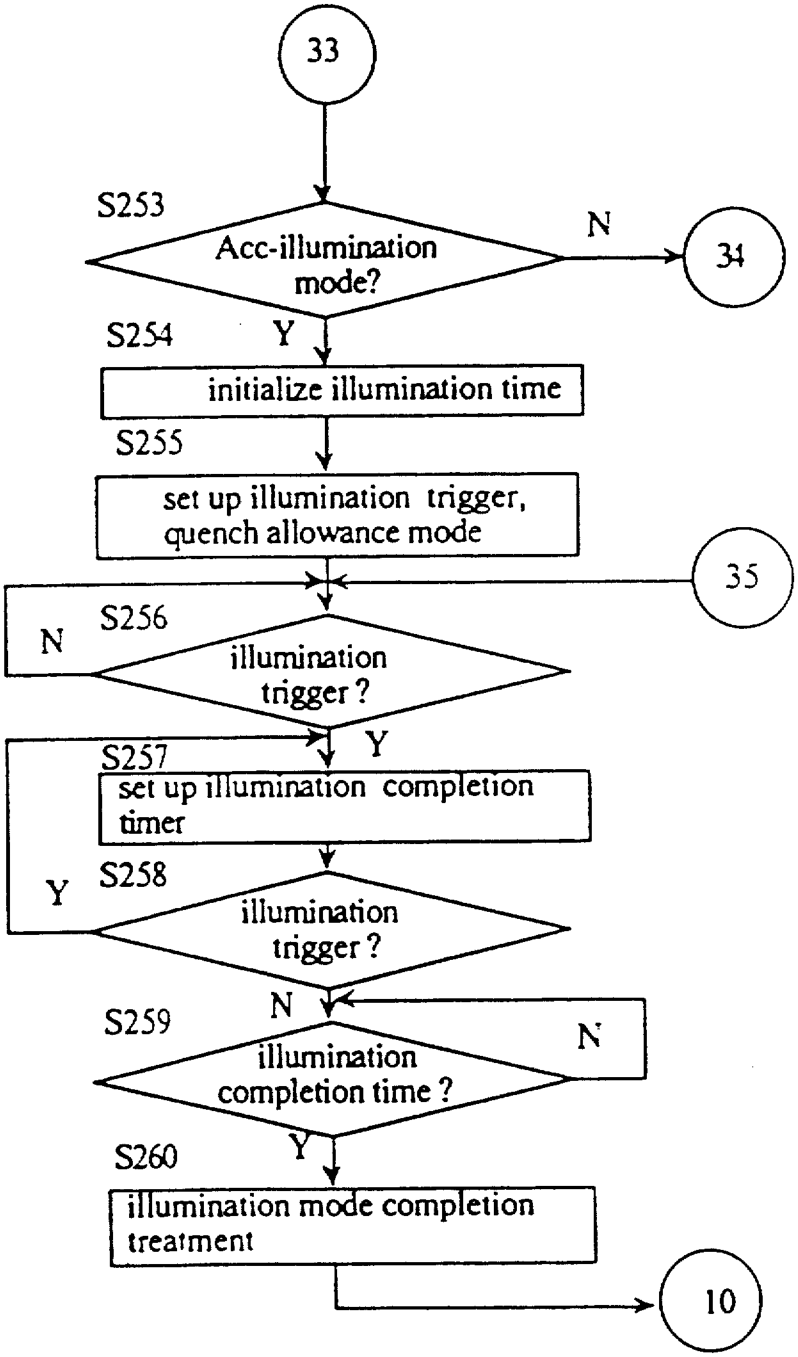
Figure 37D:
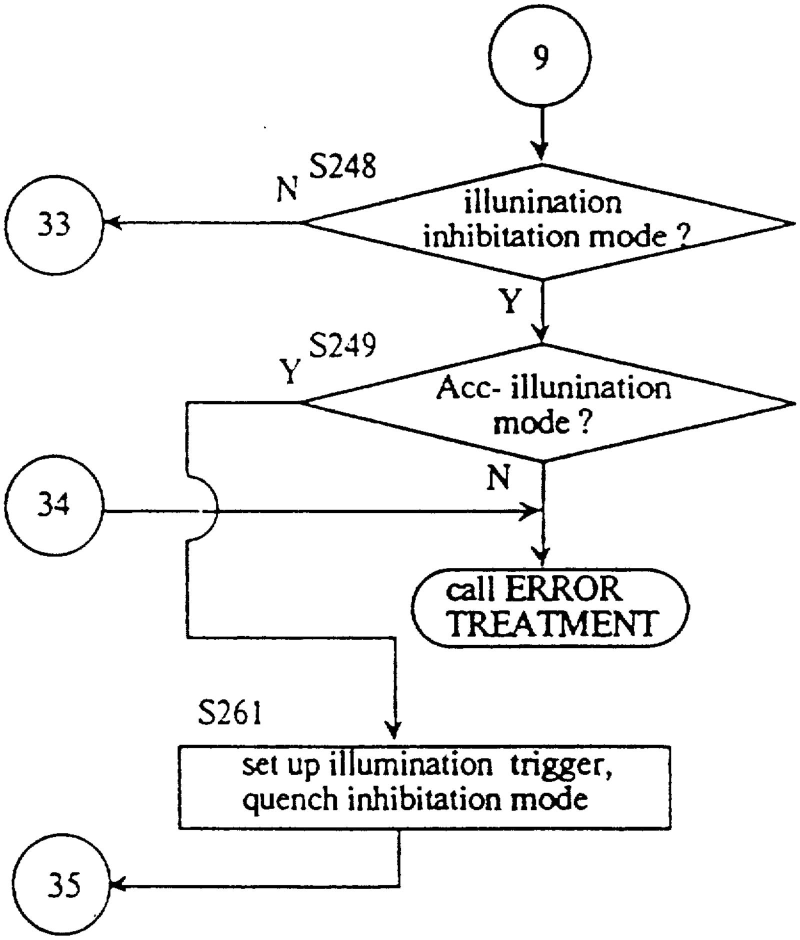
Figure 37E:
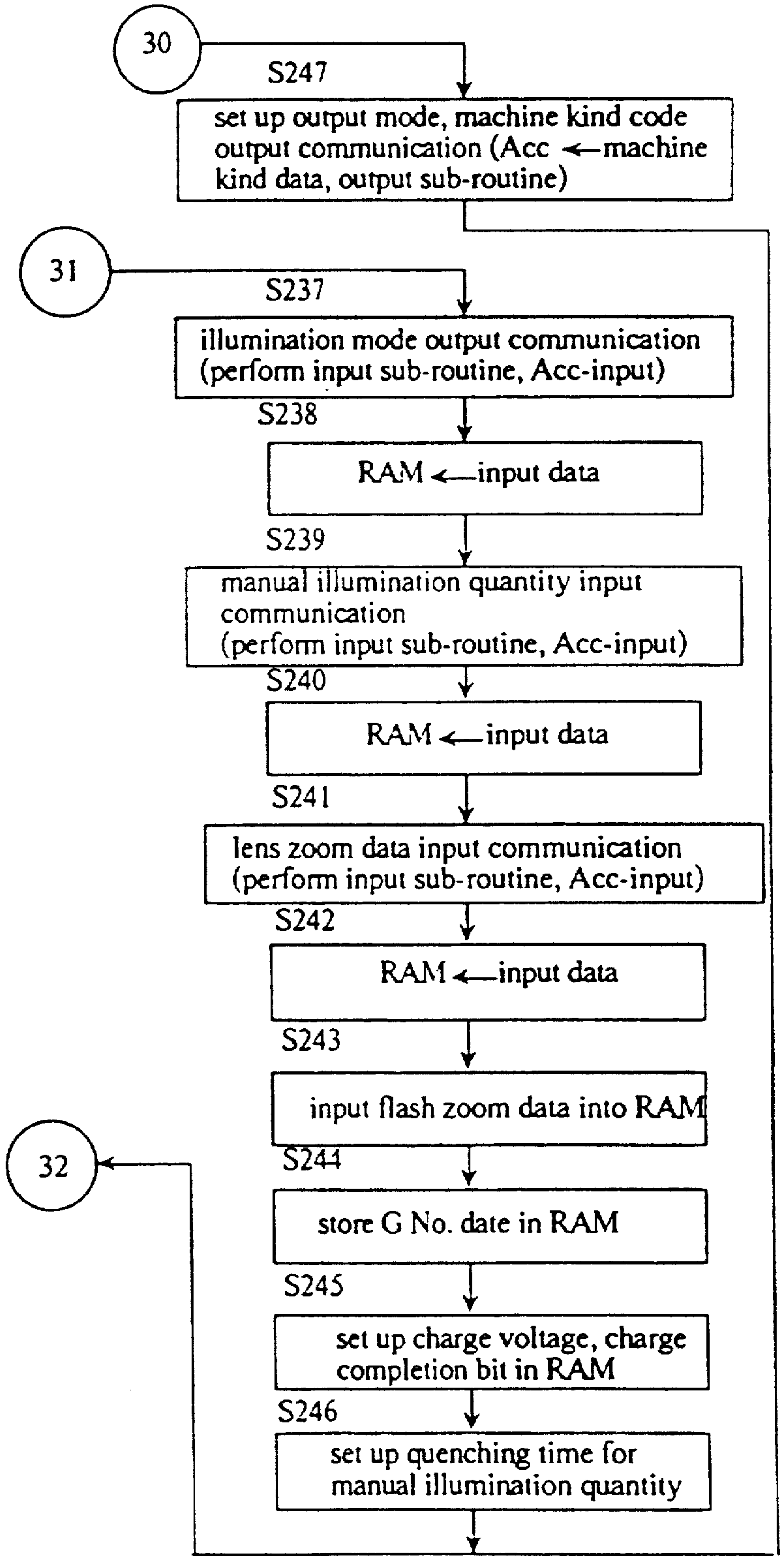

"Flash main program" will be explained hereinbelow with reference to the flow chart of FIG. 37A.

The process performs initialization of "flash system" and "mode for allowing communication interruption," and then proceeds to a treatment beginning with the "FLOOP" label (steps S214–S215).

Then the process performs treatment of "zoom control", "charge control" and "timer control" (steps S217–S219).

In step S220, judgement is made as to whether communication from the body CPU 1 has been interrupted for a predetermined time period. If the communication has been interrupted for a predetermined time period, the process proceeds to step S221 so as to reset the system. Contrariwise, if the communication has not been interrupted, the process returns to step S216 so as to again perform the routine beginning with the "FLOOP" label.

In step S222, the process performs "power down mode" so as to enter the power down mode, and then awaits communication interruption from the body CPU 1. If communication interruption is given, the process again performs the treatment beginning with the "FLOOP" label.

"Interruption treatment for flash communication" will be explained hereinbelow with reference to flow charts of FIGS. 37B through 37E.

In step S224, "refuge for accumulator, register, etc." is performed. In step S225, the address signal transmitted from the body CPU 1 is input into the accumulator so as to perform the input sub-routine having been explained.

In step S226, judgement is made to the data input into the accumulator. If the communication address data is "machine kind code", the process proceeds to step S247; otherwise it proceeds to step S227.

In step S247, the process performs setting of output mode and setting of "machine kind code" so as to call the output sub-routine, and then the process proceeds to step S234.

In step S227, if communication address data is C→F communication (i.e., data transmission from the camera to the flash), the process proceeds to step S237; otherwise it proceeds to step S228.

In step S228, if communication address data is F→C communication (data communication from the flash to the camera, i.e., if the data is taken into the camera 21 side from the flash 52 side, namely into the flash CPU 12 or 18 side from the body CPU 1 side) the process proceeds to step S229; otherwise it proceed to step S248.

In step S229, an output mode for outputting data from the flash is set up.

Zoom data is set up in the accumulator in order to achieve communication output of zoom data, and then the output sub-routine is called. Further, "G number" is set up in the accumulator in order to achieve communication output of the guide number of the flash device, and then the output sub-routine is called (steps S230–S231).

Data regarding "charge voltage" and "charge completion bit" are set up in the accumulator so as to perform the output sub-routine. Further, data is set up in the accumulator in order to achieve output communication of quenching time data of the manual illuminance, and then the output sub-routine is called (steps S232–S233).

Furthermore, setting of "input mode" is performed, together with return of the accumulator, register, etc. Then, reset of "mode for allowing communication interruption" is performed. Then the process returns (steps S234–S236).

In step S237, the input sub-routine is performed so as to input to the accumulator data of "illumination inhibiting", "TTL", "manual mode", etc.

The above input data are stored in RAM of the flash CPU 18. The data regarding "manual illuminance" is input into the RAM of the flash CPU 18 by means of communication for storing the rein (steps S238–S240).

The data regarding "zoom lens data" is input into the flash CPU 18 by means of communication for storing the same in the RAM of the flash CPU 18. The data regarding "G number" is also set up in the RAM of the flash CPU 18 (steps S241–S244).

The data regarding "charge voltage" and "charge completion bit" are also set up in the RAM, and quenching time relative to "manual illuminance" is set up. Then the process proceeds to set S248 (steps S245–S246).

In step S248, judgement is made if "illumination inhibiting mode" is selected. If "illumination inhibiting mode" is selected, the process proceeds to step S249; otherwise it proceeds to step S253.

In step S249, judgement is made as to whether the communication address data set up in the accumulator is in "illumination mode". If the data is in "illumination mode", the process proceeds to step S261; otherwise it jumps to the "ERROR TREATMENT" routine which has already been explained.

In step S261, the process performs setting of "illumination trigger quenching inhibiting mode" and then proceeds to step S256.

In step S253, judgement is made as to whether the communication address data is in "illumination mode". If it is in the "illumination mode", the process proceeds to step S254; otherwise it proceeds to step S250.

Further, initialization for illumination is performed so as to set up "illumination trigger" and "quenching allowance mode", and then the process proceeds to step S256 (steps S254–S255).

In step S256, detection of "illumination trigger signal" is performed. After inputting "illumination trigger signal" the process proceeds to step S257; otherwise it repeats step S256.

In step S257, the process performs "illumination completion timer" and then proceeds to step S258 so as to judge if "illumination trigger" was given prior to completion of counting in the illumination completion timer. If "illumination trigger" was already given, the process returns to step S257 so as again to set up "illumination completion timer". If no "illumination trigger" has been given, the process proceeds to step S259 so as to count-down "illumination completion time". In this connection, control for actual illumination and illumination quenching is performed by the illumination control block 11 or 19 in accordance with the signal from the camera.

If "illumination completion time" has been passed, the process proceeds to step S260 so as to perform "illumination mode completion treatment", and then proceeds to step S235.

Figure 38B:
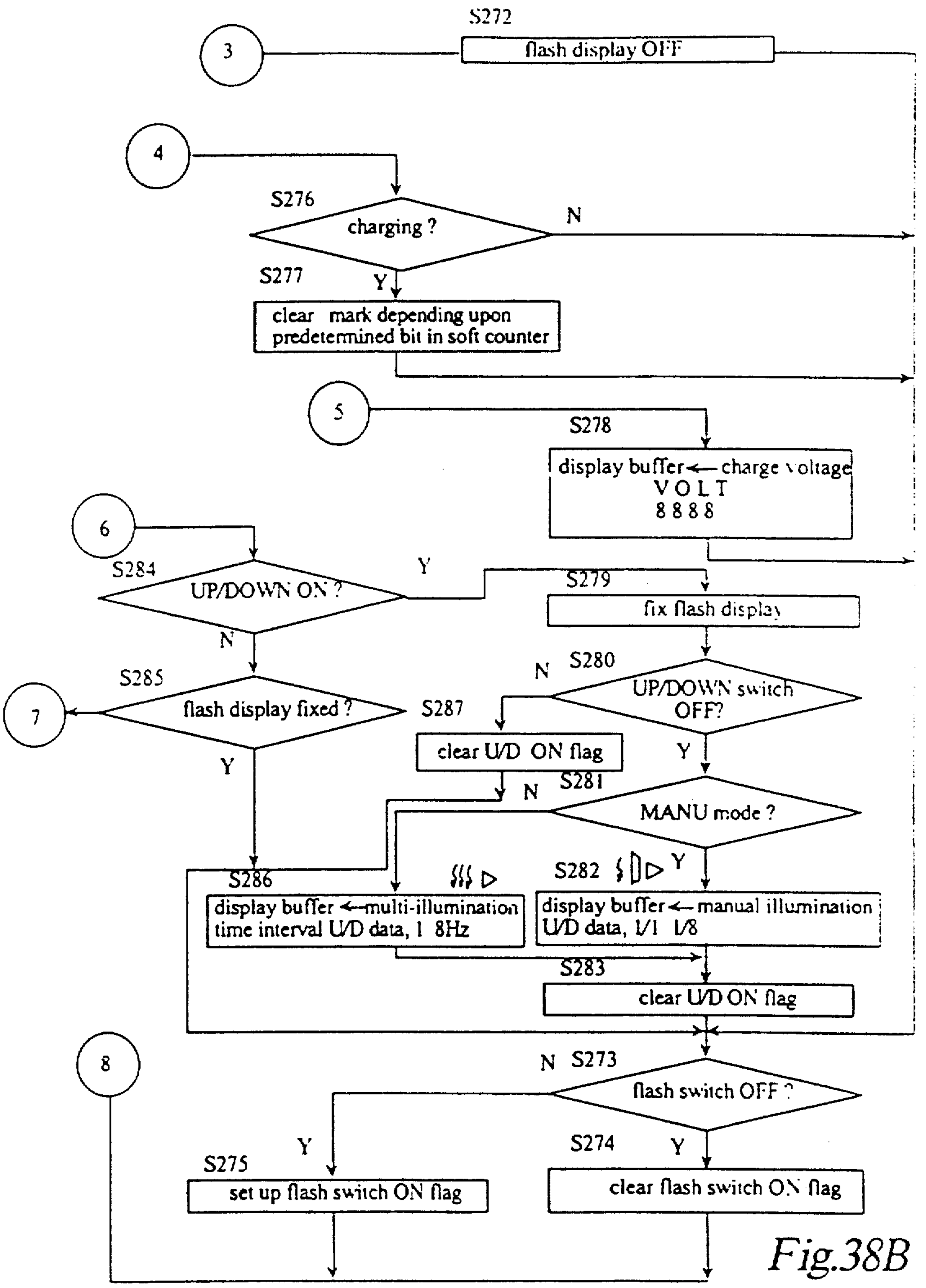

Operation regarding treatment of "FLASH UD (flash up or down) will be explained hereinbelow with reference to the flow chart of FIGS. 38A and 38B.

In step S262, judgement is made as to whether "flash signal" is given. If flash signal is given, the process proceeds to step S263. Otherwise it proceeds to step S272 so as to turn OFF flash indication of the LCD display 27. Then the process proceeds to step S273.

In step S263, judgement is made as to whether an ON signal of the flash switch is detected. If an ON signal of the flash switch is detected, the process proceeds to step S264; otherwise it proceeds to step S276.

In step S264, judgement is made as to whether the flash is being charged. If charge has been completed, the process proceeds to step S265; otherwise it proceeds to step S278.

In step S265, judgement is made as to whether "manual illumination mode" is assigned. If "manual illumination mode" is not assigned, the process proceeds to step S266; otherwise it proceeds to step S284.

In step S266, judgement is made as to whether the flash switch was turned OFF. If it is turned OFF, the process proceeds to step S267. Otherwise it proceeds to step S288 so as to set up "flag for flash switch ON", and then proceeds to step S269.

In step S267, an UP/DOWN modification is made to the flash mode data in the display buffer, and "flag for flash switch ON" is cleared. Then the process proceeds to step S269.

In step S269, judgement is made as to whether the UP/DOWN switch is turned ON. If it is turned ON, the process proceeds to step S270 so as to set up "flag for UP/DOWN ON", and then returns. In step S269, if the UP/DOWN switch is not turned ON, the process proceeds to step S271 so as to clear "flag for UP/DOWN ON", and then it returns.

In step S276, judgement is made as to whether the flash is being charged. If it is being charged, the process proceeds to step S277; otherwise it proceeds to step S273. Since an on/off indication of "ϟ" mark is carried out in step S277, the "ϟ" mark is cleared is in accordance with a predetermine bit of a soft counter. The process then jumps to step S273.

In step S278, charge voltage data is set up in the display buffer and then the process jumps to step S273.

In step S284, judgement is made as to whether an ON signal of either one of the UP/DOWN switches has been detected. If such signal has been detected, the process proceeds to step S279; otherwise it proceeds to step S285.

In step S285, judgement is made as to whether flash indication of the LCD display 27 is to be fixed. if it is intended not to fix the flash indication, the process proceeds to step S266; otherwise it proceeds to step S273.

In step S279, a fixed flag for flash indication is set up, and then the process proceeds to step S280.

In step S280, judgement is made as to whether the UP/DOWN switch is turned OFF. If it is turned OFF, the process proceeds to step S281; otherwise it proceeds to step S287 so as to clear the flag for detecting an ON signal of the UP/DOWN switch. Then the process proceeds to step S273.

In step S281, judgement is made as to whether "manual mode" is selected. If "manual mode" is selected, the process proceeds to step S282; otherwise it proceeds to step S286 so as to perform treatment of modifying multi-illumination interval data of the display buffer by counting them up or down within the range of 1Hz–8Hz. Thereafter the process proceeds to step S283.

In step S282, treatment of modifying manual illumination data of the display buffer, by counting them up or down within the range of between full-illumination and one-eighth thereof, is performed, and "flag for UP/DOWN switch ON" is cleared. The process then proceeds to step S273, In step S273, judgement is made as to whether the flash switch is turned OFF. If it is turned OFF, the process proceeds to step S274 so as to clear "flag for flash switch ON", and then proceeds to step S269. If the flash switch is turned ON, the process proceeds to step S275 so as to set up "flag for flash switch ON", and then proceeds to step S269.

Figure 39A:
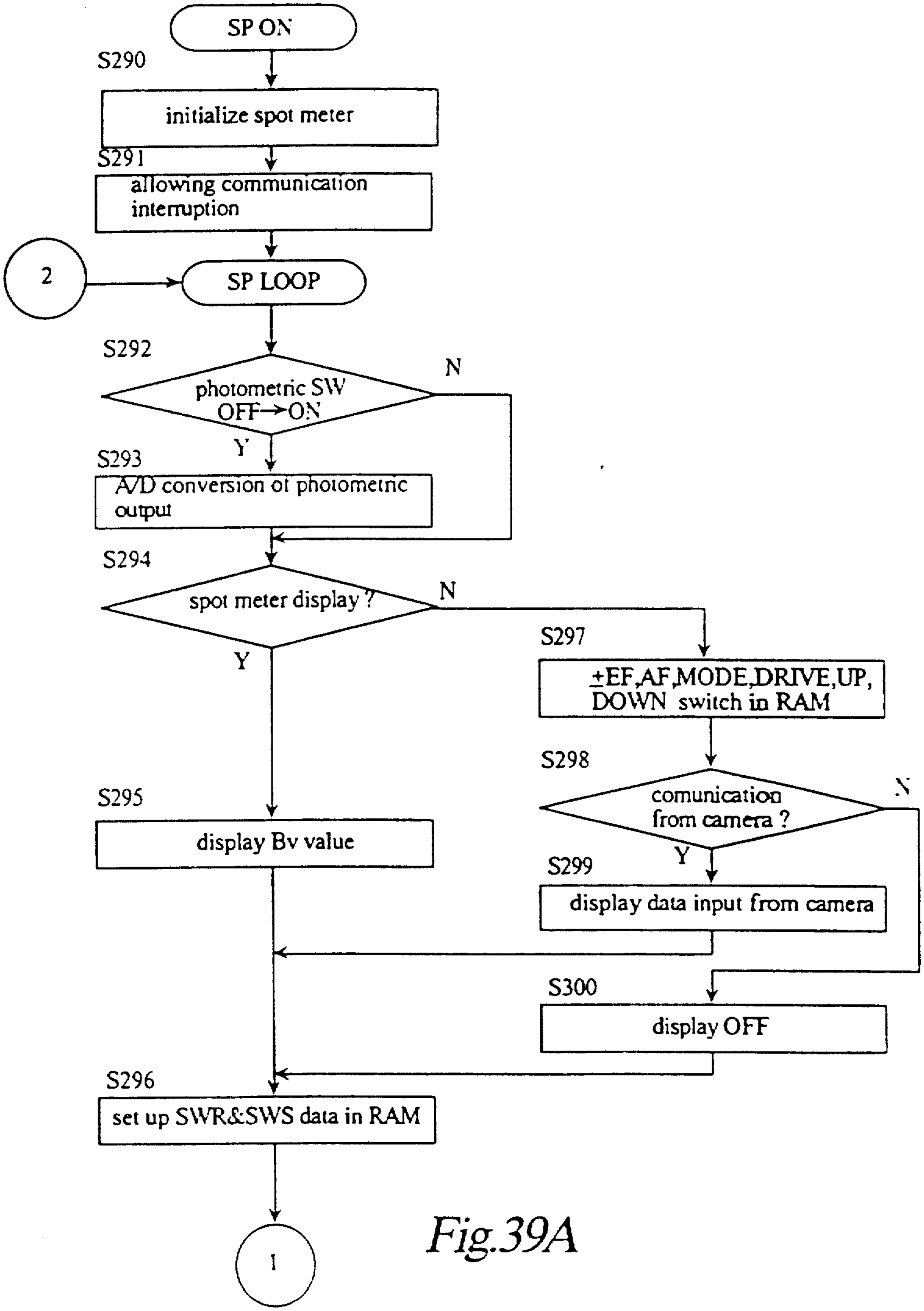
FIGS. 39A and 39B each illustrate a flow chart regarding operation when the spot meter is controlled.
Figure 39B:
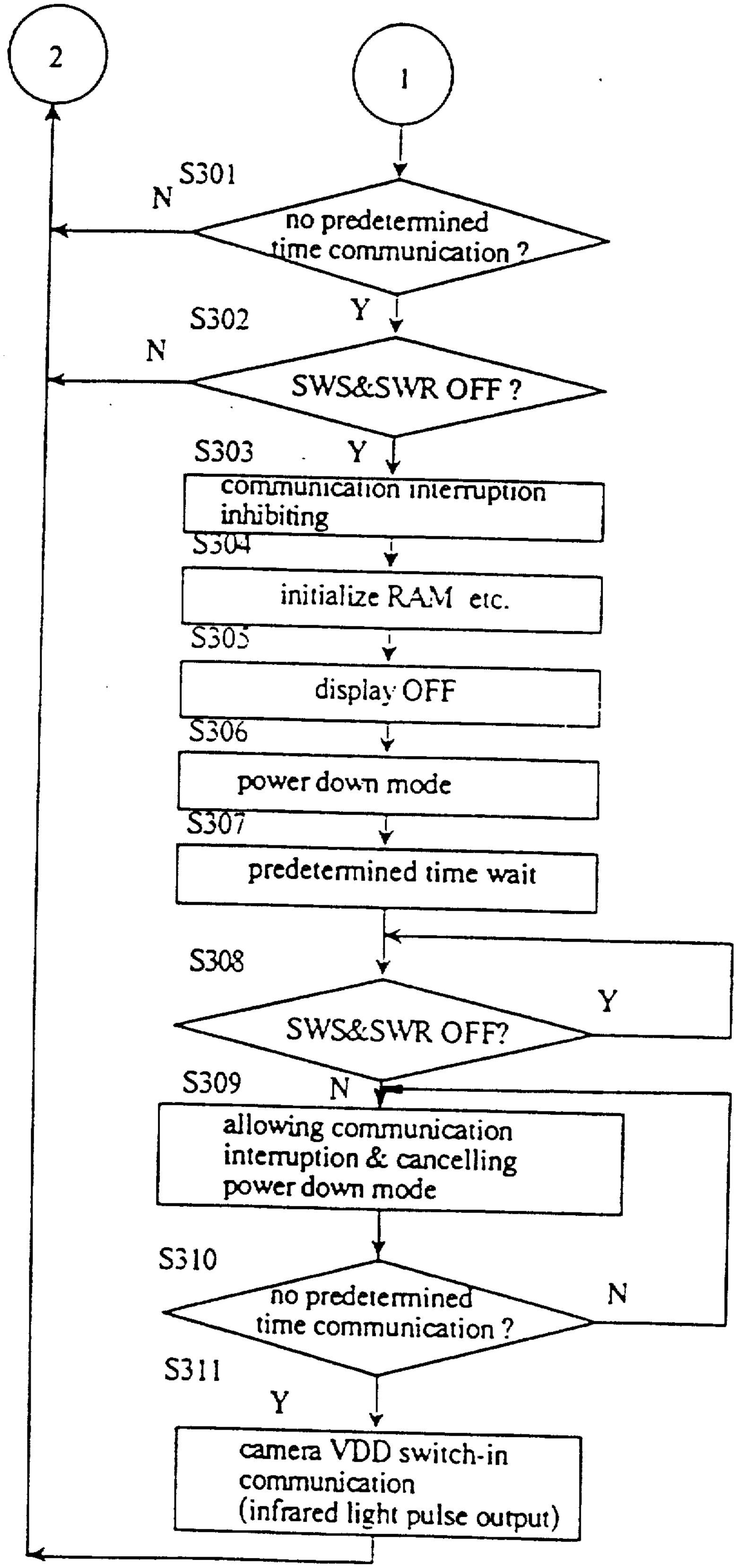

Operation regarding "spot meter" will be explained hereinbelow with reference to the flow charts of FIGS. 39A and 39B.

The process performs initialization at the spot meter 51 side, while allowing communication interruption. Then the process proceeds to a treatment beginning with "SP LOOP" label (steps S290–S291).

In "SP LOOP", judgement is made in step S292 so as to determine if the photometric switch was turned ON from the OFF position thereof. If the switch was turned ON from its OFF position, the process proceeds to step S293; otherwise it skips to step S294.

In step S293, A/D conversion of the photometric output is performed. In step S294, judgement is made as to the indication mode of the spot meter 51. If the mode for indicating spot photometric value is assigned, the process proceeds to step S295; otherwise it proceeds to step S297.

The process also performs treatment of indicating a spot photometric value on the LCD display 56, and setting up the data regarding the release switch and photometric switch in the RAM (steps S295–S296). Then the process proceeds to step S301.

In step S297, the data regarding ON/OFF signals of the ±EF switch, mode switch, drive switch and UP/DOWN switch are set up in the RAM.

In step S298, judgement is made as to whether data communication from the camera 21 side is performed. If such data communication is performed, the process performs in step S299 indication of the input data from the camera 21 side on the LCD display 56, and then proceeds to step S296. If, in the above step S298, no communication from the camera 21 side was detected, the process skips to step S300 so as to turn OFF the indication on the LCD display 56, and then proceeds to step S296.

In step S301, judgement is made as to whether a predetermined time of communication has continued. If such communication has not been performed, the process proceeds to step S302; otherwise it skips to "SP LOOP".

In step S302, judgement is made as to whether the photometric switch and release switch are turned OFF. If they are turned OFF, the process proceeds to step S303; otherwise it skips to "SP LOOP".

In steps S303–S305, setting of "communication interruption inhibiting is performed, together with initialization of the RAM, etc. Further, the indication of the LCD display 56 is turned OFF.

In steps S306–S307, "power down mode" is performed, and the process proceeds to step S308 after performing a predetermined time of wait.

In step S308, judgement is made as to whether the photometric switch and release switch are turned OFF. If they are turned OFF, the step S308 will be repeated. If they are not turned OFF, the process proceeds to step S309.

In step S309, communication interruption is allowed and "power down mode" is cancelled. The process then proceeds to step S310.

In step S310, judgement is made as to whether a predetermined time of communication has been performed so as to initiate the communication after noisy pulses have been eliminated. If a predetermined time of communication is not performed, the process repeats step S310. If a predetermined time of communication is actually performed, the process proceeds to step S11.

In step S311, camera Vdd light emitting communication is performed, and then the process skips to "SP LOOP".

Figure 39C:
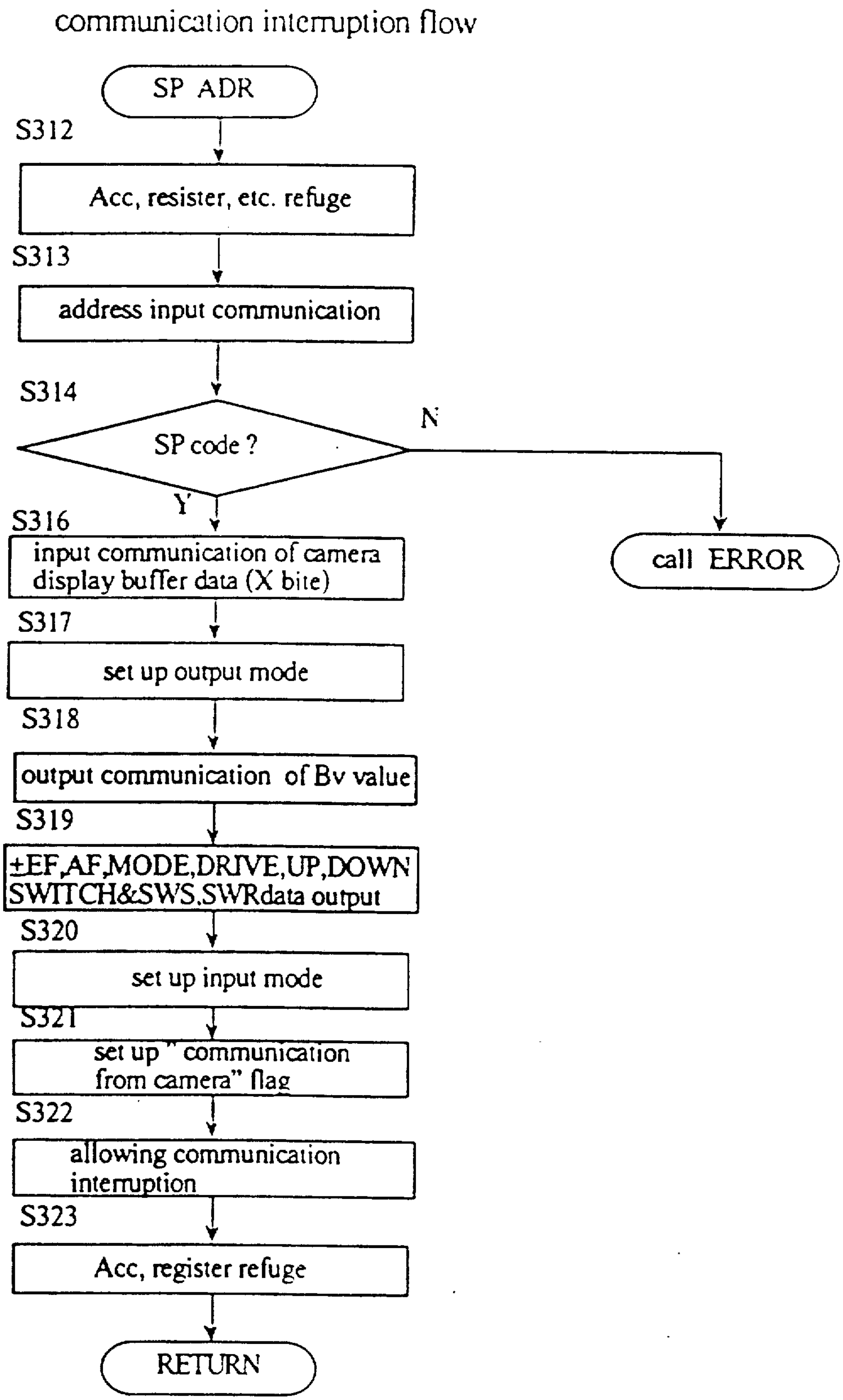
FIG. 39C illustrates a flow chart regarding operation of communication interruption.

Operation regarding "communication interruption" of the spot meter will be explained hereinafter with reference to the flow chart of FIG. 39C.

First, refuge of the accumulator and register is performed and then the address signal is input (steps S312-313); thereafter the process proceeds to step S314.

In step S314, judgement is made as to whether the data code of the spot meter 51 is input. If the data code is not input, the process skips to "error treatment"; otherwise it proceeds to step S316.

Camera indication buffer data is input as, for example, $\chi$ bites, and "output mode" is set up. Further, output communication of "Bv value" is performed (steps S316–S318).

The data regarding the ±EF switch, AF switch, mode switch, drive switch, UP/DOWN switch, photometric switch, and release switch are output so as to set up "input mode" and so as set up "flag for communication from camera" (steps S319–S321).

The process further performs setting of "allowance for communication interruption", resumes "accumulator, register", and then returns (steps S322–S323).

The communication system according to the embodiment obviates use of a carrier wave, thus achieving ultra-high communication speed. Accordingly, it is possible to shorten the time period in which infrared light is turned ON, while reducing current consumption, thus prolonging the life of a battery to be used.

Figure 17:
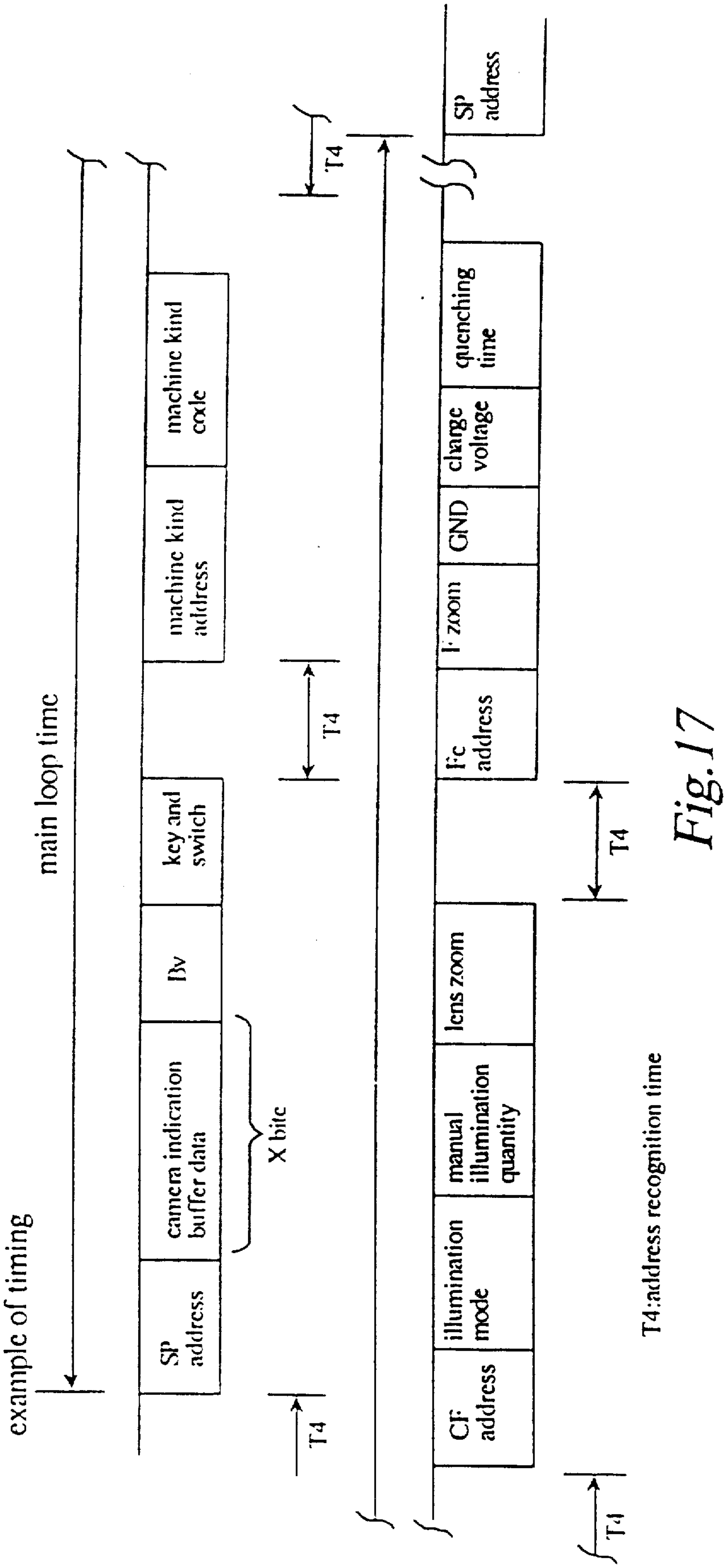
FIG. 17 illustrates an example of data timing according to one embodiment of the invention.

Communication timing of the data to be transmitted or received between the flash CPU 12 and body CPU 1, the accessary CPU 13 and body CPU 1, and the flash CPU 18 and body CPU 1, according to the present embodiment, is schematically illustrated in FIG. 17.

In FIG. 17, T4 indicated a time required for recognition of the address output subsequent to each data group (for example, "camera indication buffer data", "Bv data", "switch input data"). This address recognition time T4 is held in "1 (high)", and a first format signal transmitted immediately thereafter is treated as address data of "SP address" etc. A second format of the direction of transmission on the communication line, content of the data and communication time is determined on the basis of the address data.

Figure 40:
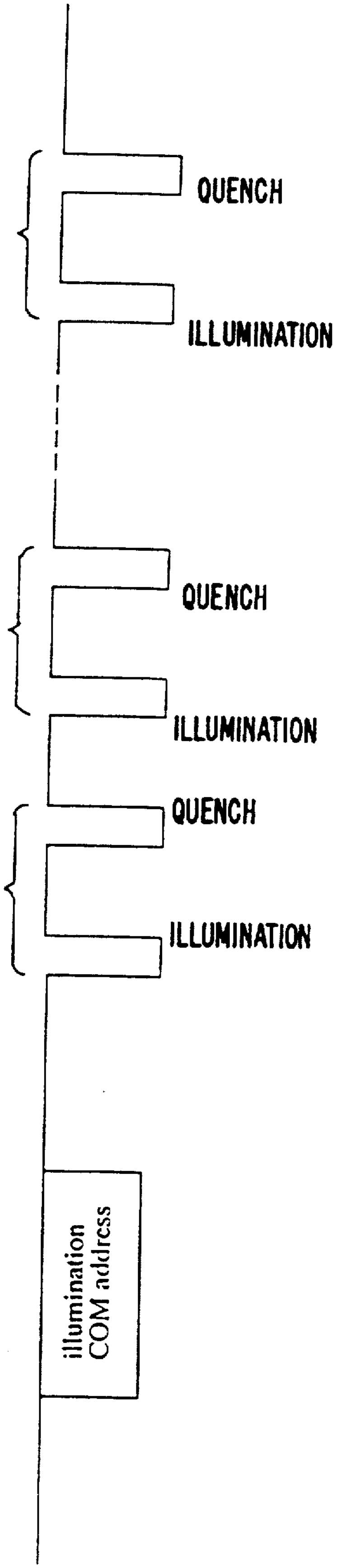
FIG. 40 illustrates an example of timing and content of communication of a data communication between the flash device and camera.

FIG. 40 illustrates an example of communication timing in case the flash device 52 controls first blind illumination, second blind illumination and multi-illumination.

The present invention has been explained hereinabove in relation to several embodiments in which the communication system according to the invention is applied to a camera 21. It should, however, be noted that the present invention is not limited to the above embodiments and that the present invention is, of course, applicable to any equipment or apparatus in which serial communication is achieved between circuits.

We claim:

1. A method for performing data communication between a pair of circuits, in which a first circuit of the pair of circuits is located in a first device and a second circuit of the pair of circuits is located in a second device that is selectively attachable to the first device, the data communication being established by serially transmitting information which comprises pulse signals, the method comprising serially transmitting the pulse signals, and performing the steps of:

(a) determining a reference time in response to an occurrence of a first level change in a pulse signal outputted from one of the pair of circuits to the other, the determining step being performed by at least one of the first and second devices;

(b) judging whether a bit of a data is a "1" or a "0" in accordance with a time period extending from the reference time to a subsequent level change in the pulse signal following the reference time, the judging step being performed by one of the first and second devices that receives the outputted pulse signal;

(c) determining a new reference time in response to the occurrence of the subsequent level change in the pulse signal relative to a next bit of data in the pulse signal, the new reference time determining step being performed by at least one of the first and second devices; and (d) returning to step (b) and repeating steps (b), (c) and (d), whereby data of a predetermined number of bits are continuously transmitted in the pulse signal.

2. A method according to claim 1, wherein said pair of circuits comprise a body CPU mounted on a camera body and flash CPU mounted on a flash device, and wherein pulse signals are serially transmitted between said pair through a single communication line.

3. A method according to claim 2, wherein the pulse signals comprise pulses which are "high" or "low" in electric potential level.

4. A method according to claim 1, wherein said pair of circuits comprise a body CPU mounted on a camera body and a multi-accessary CPU mounted on a spot meter which measures brightness of the object to be taken, and wherein pulse signals of infrared light are transmitted between said pair of circuits through a signal transmission path including an infrared light transmission interface and an infrared light receiving interface.

5. A method according to claim 4, wherein the pulse signals comprise pulses of infrared light which are represented by "ON" on "OFF" states of infrared light.

6. A method according to claim 1, wherein said pair of circuits comprise a body CPU mounted on a camera body and a flash CPU mounted on a flash device, and wherein pulse signals of infrared light are transmitted between said pair of circuits through a signal transmission path including an infrared light transmission interface and an infrared light receiving interface.

7. A method according to claim 6, wherein the pulse signals comprise pulses of infrared light which are represented by "ON" or "OFF" states of infrared light.

8. A method according to claim 1, wherein each of the circuits includes a light emitting element for emitting infrared light, a light receiving element for receiving infrared light, a control circuit for controlling the light emitting element, and a processing circuit for processing signals received in the light receiving element, wherein the reference time is determined when a first level change of infrared light output from one of the two circuits to the other occurs, and a data bit value of "1" or "0" is determined based on the amount of time between the reference time and the occurrence of a second level change of infrared light, the occurrence of said second level change being used as a reference time for the next data bit value determination, whereby data of a predetermined number of bits are continuously transmitted in the signals.

9. A method for serially transferring a data pulse signal between a first cpu and a selectively attachable second cpu, comprising the steps of:

(a) establishing one of the first cpu and the selectively attachable second cpu as a data transmitting device, the other being established as a data receiving device;

(b) determining when a first level change of the pulse signal occurs to establish a reference time, the determining step being performed by one of the data transmitting device and the data receiving device;

(c) judging whether a binary value of a received bit of data represents a "1" or a "0" in accordance with a time that elapses from when the reference time is established to when a second level change of the pulse signal occurs, the judging step being performed by the receiving device;

(d) setting a time of occurrence of the second level change of the pulse signal as the reference time with respect to a next bit of data in the pulse signal, the setting step being performed by one of the data transmitting device and the data receiving device; and (e) repeating steps (c) through (e) until a predetermined number of bits are transmitted in said pulse signal.

10. The method of claim 9, comprising locating the selectively attachable element cpu in a flash device.

11. The method of claim 9, comprising locating the selectively attachable element cpu in a multi-accessary device.

12. The method of claim 9, wherein the serial data pulse signal is transmitted over a single communication line.

13. The method of claim 9, wherein the transferred data pulse signal comprises transmitting pulse signals of infrared light.

14. The method of claim 13, wherein the step of transmitting infrared light pulse signals comprises transmitting the infrared light pulse signals using an infrared light transmission interface and an infrared light receiving interface.

15. A method for serially exchanging a data pulse signal between a first cpu and a second cpu, comprising the steps of:

(a) determining when a first level change of the pulse signal occurs to establish a reference time, the determining step being performed by one of the first cpu and the second cpu;

(b) judging whether a binary value of a received bit of data represents a "1" or a "0" in accordance with a time that elapses from when the reference time is established to when a second level change of the pulse signal occurs;

(c) setting a time of occurrence of the second level change of the pulse signal as the reference time with respect to a next bit of data in the pulse signal, the setting step being performed by one of the first cpu and the second cpu; and (d) repeating steps (b) through (d) until a predetermined number of bits are transmitted in said pulse signal, wherein the data pulse signal is exchanged between the first cpu and the second cpu over a single communication line.

16. The method of claim 15, comprising associating the second cpu with a selectively attachable flash device.

17. The method of claim 15, comprising associating the second cpu with a selectively attachable multi-accessary device.

18. The method of claim 15, comprising associating the first cpu with a camera body.

* * * * *

UNITED STATES PATENT AND TRADEMARK OFFICE

CERTIFICATE OF CORRECTION

PATENT NO. : 5,283,663

DATED : Feb. 1, 1994

INVENTOR(S) : M. KAWASAKI et al.

It is certified that error appears in the above-indentified patent and that said Letters Patent is hereby corrected as shown below:

At column 33, line 33 (claim 1, line 15)
delete "a" after "of".

At column 34, line 3 (claim 5, line 3)
change "on" to ---or---.

Signed and Sealed this

Twenty-fifth Day of February, 1997

Attest:

BRUCE LEHMAN

Attesting Officer

Commissioner of Patents and Trademarks